US012628207B2

(12) United States Patent
Wang et al.

(10) Patent No.: US 12,628,207 B2
(45) Date of Patent: May 12, 2026

(54) PARAMETER TRANSMISSION METHOD AND APPARATUS

(71) Applicant: HUAWEI TECHNOLOGIES CO., LTD., Shenzhen (CN)

(72) Inventors: Xiaolu Wang, Hangzhou (CN); Hejia Luo, Hangzhou (CN); Yinggang Du, Shenzhen (CN); Rong Li, Hangzhou (CN); Jun Wang, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 319 days.

(21) Appl. No.: 18/352,883

(22) Filed: Jul. 14, 2023

(65) Prior Publication Data

US 2024/0032116 A1     Jan. 25, 2024

Related U.S. Application Data

(63) Continuation of application No. PCT/CN2022/071412, filed on Jan. 11, 2022.

(30) Foreign Application Priority Data

Jan. 15, 2021   (CN) ......................... 202110055050.X

(51) Int. Cl.
*H04W 74/08*     (2024.01)
*H04W 56/00*     (2009.01)
*H04W 74/0833*     (2024.01)
*H04W 74/0836*     (2024.01)

(52) U.S. Cl.
CPC ..... *H04W 74/085* (2013.01); *H04W 56/0045* (2013.01); *H04W 74/0833* (2013.01); *H04W 74/0836* (2024.01)

(58) Field of Classification Search
CPC ............. H04W 24/02; H04W 56/0045; H04W 74/085; H04W 72/23; H04W 74/0836;
(Continued)

(56) References Cited

U.S. PATENT DOCUMENTS 10,554,293 B1     2/2020   Chin et al.
10,893,543 B2 *   1/2021   Li ..................... H04L 27/26132
(Continued)

FOREIGN PATENT DOCUMENTS

CN     105704807 A     6/2016
CN     110535677 A     12/2019
(Continued)

OTHER PUBLICATIONS

CMCC et al., "Discussion on timing relationship enhancements for NTN," 3GPP TSG RAN WG1 #102-e, R1-2006210, e-Meeting, Aug. 17-28, 2020, 6 pages.
(Continued)

*Primary Examiner* — Bailor C Hsu
(74) *Attorney, Agent, or Firm* — Fish & Richardson P.C.

(57) ABSTRACT

Embodiments of this application provide a parameter transmission method and an apparatus, and relate to the field of wireless communication technologies. In the method, the terminal device may receive first information. The first information may include a time parameter. The time parameter may be used to determine a timing offset. The timing offset includes a second timing offset, and the second timing offset indicates a delay of activation of configuration information. The terminal device determines a delay start duration of a random access response (RAR) window based on the second timing offset.

29 Claims, 24 Drawing Sheets

(58) Field of Classification Search
CPC ......... H04W 72/1268; H04W 74/0833; H04W 84/06; H04B 7/18513; H04B 7/1853
See application file for complete search history.

(56) References Cited

U.S. PATENT DOCUMENTS

| | | | | |
|---|---|---|---|---|
| 11,540,324 B2 * | 12/2022 | Sakhnini | .............. | H04B 7/1851 |
| 11,723,055 B2 * | 8/2023 | Yang | ................... | H04W 72/535 |
| | | | | 370/329 |
| 11,917,572 B2 * | 2/2024 | Miao | .................... | H04B 7/1853 |
| 12,004,217 B2 * | 6/2024 | Zhang | ................. | H04W 74/004 |
| 2021/0006328 A1 | 1/2021 | Kim | | |
| 2021/0321460 A1 * | 10/2021 | Taherzadeh Boroujeni | ................ | |
| | | | | H04L 5/0048 |
| 2022/0110163 A1 * | 4/2022 | Kwak | .............. | H04W 74/0833 |
| 2023/0011025 A1 * | 1/2023 | Moon | ................. | H04W 74/006 |
| 2023/0043620 A1 * | 2/2023 | Khoshkholgh Dashtaki | .............. | |
| | | | | H04W 74/0833 |
| 2023/0074439 A1 * | 3/2023 | Lin | ................... | H04W 74/0833 |
| 2023/0209386 A1 * | 6/2023 | Khoshkholgh Dashtaki | .............. | |
| | | | | H04W 24/10 |
| | | | | 370/350 |

FOREIGN PATENT DOCUMENTS

| | | |
|---|---|---|
| CN | 110547021 A | 12/2019 |
| CN | 112075107 A | 12/2020 |
| WO | 2019161044 A1 | 8/2019 |
| WO | 2021164579 A1 | 8/2021 |

OTHER PUBLICATIONS

3GPP TS 38.213 V1.3.0, "3rd Generation Partnership Project; Technical Specification Group Radio Access Network; NR; Physical layer procedures for control (Release 15)," Dec. 2017, 58 pages.
International Search Report and Written Opinion in International Appln. No. PCT/CN2022/071412, mailed on Mar. 18, 2022, 17 pages (with English translation).
OPPO, "NTN control procedure for physical layer," 3GPP TSG RAN WG1 #98bis, R1-1910386, Chongqing, China, Oct. 14-20, 2019, 3 pages.
Moderator(Ericsson), "Feature lead summary#4 on timing relationship enhancements," 3GPP TSG-RAN WG1 Meeting #103-e, R1-2009733, e-Meeting, Oct. 26-Nov. 13, 2020, 76 pages.
ZTE et al., "Report of Email Discussion [107#60][NR/NTN] RACH capacity evaluation and procedures," 3GPP TSG-RAN WG2 Meeting #107bis, R2-1912664, Chongqing, China; Oct. 14-18, 2019, 29 pages.
Extended European Search Report in European Appln No. 22739011.9, dated Jun. 12, 2024, 10 pages.
Huawei et al., "Discussion on timing relationship enhancements for NTN," 3GPP TSG RAN WG1 Meeting #103-e, R1-2007569, E-meeting, Oct. 26-Nov. 13, 2020, 6 pages.

* cited by examiner

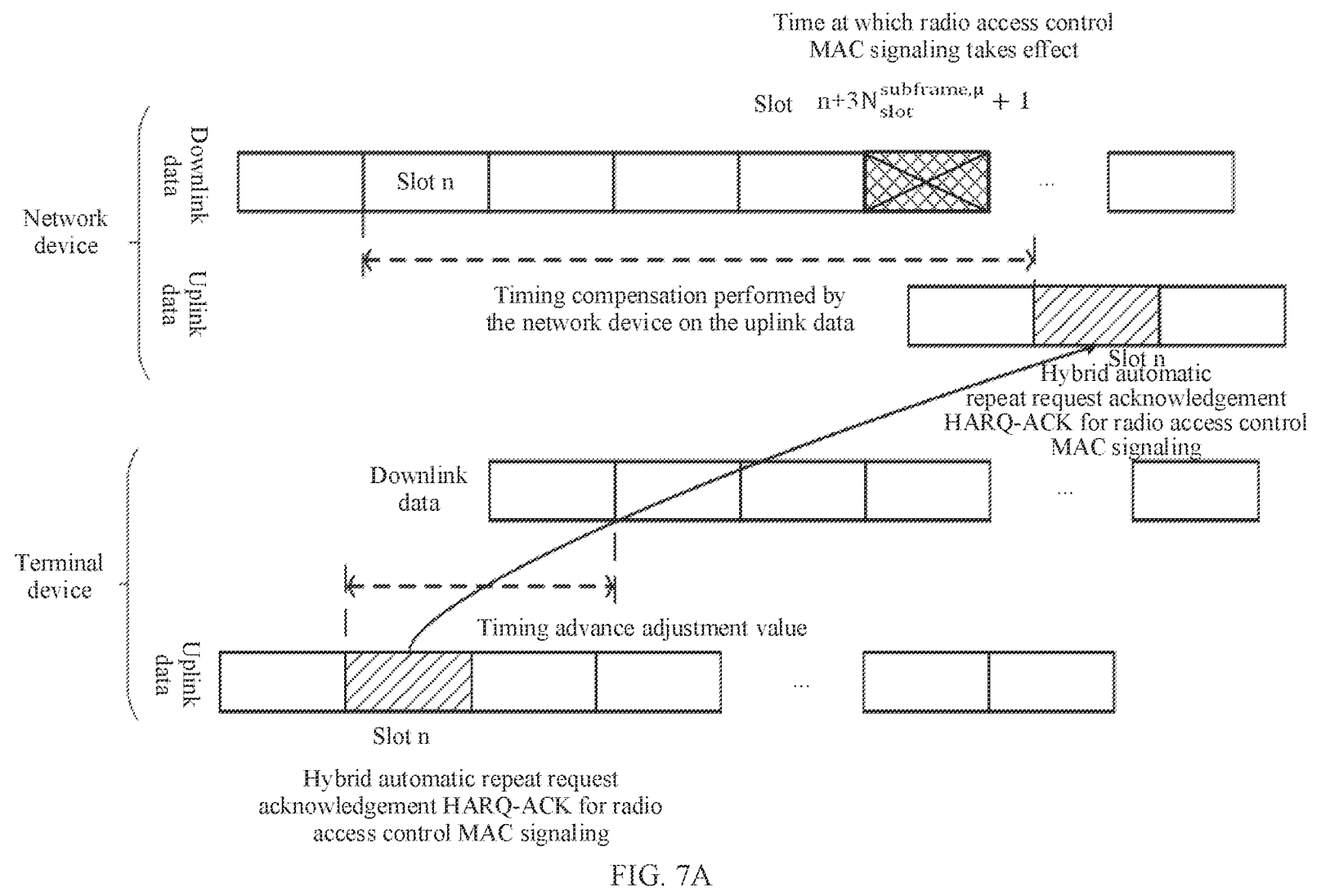

Time at which radio access control MAC signaling takes effect

Slot $n+3N_{slot}^{subframe,\mu}+1$

Timing compensation performed by the network device on the uplink data

Slot n

Hybrid automatic repeat request acknowledgement HARQ-ACK for radio access control MAC signaling Downlink data Slot n Uplink data Timing advance adjustment value Hybrid automatic repeat request acknowledgement HARQ-ACK for radio access control MAC signaling Downlink data Uplink data Network device Terminal device Uplink data Slot n

FIG. 7A

Apparatus 1800

PARAMETER TRANSMISSION METHOD AND APPARATUS

CROSS-REFERENCE TO RELATED APPLICATIONS

This application is a continuation of International Application No. PCT/CN2022/071412, filed on Jan. 11, 2022, which claims priority to Chinese Patent Application No. 202110055050.X, filed on Jan. 15, 2021. The disclosures of the aforementioned applications are hereby incorporated by reference in their entireties.

TECHNICAL FIELD

This application relates to the field of wireless communication technologies, and in particular, to a parameter transmission method and an apparatus.

BACKGROUND

With development of terrestrial communication, convenient data and voice services have been provided for urban, suburban, and rural users. However, some sparsely populated areas or areas that are not suitable for living are not covered by a communication network, and voice and data services cannot be provided for users in these areas. Non-terrestrial network (NTN) communication has features such as a large coverage area and flexible networking. The NTN communication includes satellite communication, high altitude platform station communication, and air-to-ground (ATG) communication. If terrestrial and non-terrestrial networks are combined, a communication service of seamless coverage can be provided globally. Therefore, research is under way to adapt a 5G new radio (NR) technology to the NTN communication, to build a unified communication network for sky-air-ground communication.

In the non-terrestrial network, a network device and a terminal device are far away from each other, and an altitude difference between the network device and the terminal device is tremendously large. As a result, a large round-trip delay exists between the terminal device and the network device. In the NTN communication, due to impact of a large delay and large delay compensation on a network side, a problem occurs, for example, an insufficient scheduling delay for uplink data on the network side, an insufficient feedback delay configured by the network side for the terminal device, or an insufficient timing delay for a downlink configuration to take effect. Therefore, the network device can indicate a timing-related parameter to the terminal device, to resolve the foregoing problem. For example, when the feedback delay configured by the network side for the terminal device is insufficient, the network side may indicate a timing-related parameter to the terminal device, to adjust a slot in which the terminal device sends feedback information, and increase a scheduling delay fed back by the terminal device, so as to provide a sufficient time length for the terminal device to perform timing advance adjustment.

However, when the network device indicates the timing-related parameter to the terminal device, additional signaling overheads are required. In addition, to resolve the problem, for example, the insufficient scheduling delay for the uplink data on the network side, the insufficient feedback delay configured by the network side for the terminal device, or the insufficient timing delay for the downlink configuration to take effect, the network device needs to send a plurality of timing-related parameters to the terminal device, and signaling overheads are high.

SUMMARY

This application provides a parameter transmission method and an apparatus, to send a timing-related parameter to a terminal device, thereby reducing signaling overheads.

According to a first aspect, a parameter transmission method is provided. The method may be performed by a terminal device, or may be performed by a chip having a function similar to that of a terminal device. In the method, the terminal device may receive first information. The first information may include a time parameter. The time parameter may be used to determine a timing offset. The timing offset herein includes at least one of a first timing offset and a second timing offset. The first timing offset may be used to determine a delay degree of sending information by the terminal device, or the first timing offset may be used to determine an advance degree of receiving information by the terminal device, and the second timing offset may be used to determine a delay degree of taking effect of configuration information received by the terminal device.

Based on the foregoing solution, the terminal device can determine one of the first timing offset and the second timing offset based on the time parameter sent by a network device. This can resolve an insufficient scheduling delay for uplink data on a network side, an insufficient feedback delay configured by the network side for the terminal device, or an insufficient timing delay for a downlink configuration to take effect. In addition, the terminal device can determine the first timing offset and the second timing offset based on the time parameter, to reduce signaling overheads.

In a possible implementation, the time parameter is further used to determine delay start duration of a random access RAR window. The delay start duration of the RAR window is used to determine a delay degree of starting the RAR window by the terminal device.

Based on the foregoing solution, the terminal device can determine the delay start duration of the RAR window based on the time parameter, and can start the RAR window in a delayed manner. In addition, the terminal device can determine the first timing offset, the second timing offset, and the delay start duration of the RAR window based on the time parameter. The delay start duration of the RAR window can be indicated without additional signaling overheads, to reduce signaling overheads.

In a possible implementation, the time parameter may include a difference of the first timing offset and a common timing advance value TA_common. The TA_common is a parameter determined based on a round-trip delay between a satellite and a reference point. The terminal device may determine the first timing offset based on the difference of the first timing offset and the TA_common. The first timing offset may satisfy the following formula:

$$K\text{offset} = \lceil TA\_\text{common/slot\_duration} \rceil + \Delta K\text{offset},$$
where slot_duration indicates a time unit, ⌈ ⌉ indicates a rounding up operation, and $\Delta K$offset indicates the difference of the first timing offset.

In a possible implementation, the time parameter includes a minimum round-trip delay parameter Service_RTD_min of a service link between a satellite and an area covered by the satellite, a common timing advance value TA_common, and duration of the RAR window. The TA_common is a parameter determined based on a round-trip delay between the satellite and a reference point. The terminal device may determine the first timing offset based on the Service_RTD_min, the TA_common, and the duration of the RAR window. The first timing offset satisfies the following formula:

$$K\text{offset}=\lceil(\text{Service}\_RTD\_\text{min}+RAR\_\text{window}+TA\_\text{common})/\text{slot\_duration}\rceil,\text{ where}$$

slot_duration indicates a time unit, and $\lceil\ \rceil$ indicates a rounding up operation.

In a possible implementation, the time parameter may include a maximum round-trip delay parameter Service_RTD_max of a service link between a satellite and an area covered by the satellite and a common timing advance value TA_common, and the TA_common is a parameter determined based on a round-trip delay between the satellite and a reference point. The terminal device may determine the first timing offset based on the Service_RTD_max and the TA_common. The first timing offset may satisfy the following formula:

$$K\text{offset}=\lceil(\text{Service}\_RTD\_\text{max}+TA\_\text{common})/\text{slot\_duration}\rceil,\text{ where}$$

slot_duration indicates a time unit, and $\lceil\ \rceil$ indicates a rounding up operation.

In a possible implementation, the time parameter may include duration of the RAR window, the delay start duration of the RAR window, and a round-trip delay parameter Delay_compensated between a reference point and the network device. The terminal device may determine the first timing offset based on the duration of the RAR window, the delay start duration of the RAR window, and the Delay_compensated. The first timing offset may satisfy the following formula:

$$K\text{offset}=\lceil(RAR\_\text{window}+RAR\_\text{window\_delay}-\text{Delay}\_\text{compensated})/\text{slot\_duration}\rceil,\text{ where}$$

slot_duration indicates a time unit, and $\lceil\ \rceil$ indicates a rounding up operation.

In a possible implementation, the time parameter may include duration of the RAR window and the delay start duration of the RAR window. The terminal device may determine the first timing offset based on the duration of the RAR window and the delay start duration of the RAR window. The first timing offset may satisfy the following formula:

$$K\text{offset}=\lceil(RAR\_\text{window}+RAR\_\text{window\_delay})/\text{slot\_duration}\rceil,\text{ where}$$

slot_duration indicates a time unit, and $\lceil\ \rceil$ indicates a rounding up operation.

In a possible implementation, the time parameter may include duration of the RAR window, the delay start duration of the RAR window, and the second timing offset. The terminal device may determine the first timing offset based on the duration of the RAR window, the delay start duration of the RAR window, and the second timing offset. The first timing offset may satisfy the following formula:

$$K\text{offset}=\lceil(RAR\_\text{window}+RAR\_\text{window\_delay})/\text{slot\_duration}\rceil-K\_\text{mac},\text{ where}$$

slot_duration indicates a time unit, $\lceil\ \rceil$ indicates a rounding up operation, and K_mac indicates the second timing offset.

Based on the foregoing possible implementations, the terminal device can determine the first timing offset based on the time parameter from the network device and a corresponding calculation relationship.

In a possible implementation, the terminal device may determine the first timing offset based on the time parameter and an adjustment parameter of the first timing offset. The adjustment parameter of the first timing offset is preset or is indicated by the network device.

Based on the foregoing solution, the terminal device can determine the first timing offset based on the adjustment parameter of the first timing offset and the time parameter. This can reduce impact of factors such as a positioning error on the time parameter, and make the first timing offset more accurate.

In a possible implementation, the time parameter may include a round-trip delay parameter Delay_compensated between a reference point and the network device. The terminal device may determine the second timing offset based on the Delay_compensated. The second timing offset may satisfy the following formula:

$$K\_\text{mac}=\lceil\text{Delay\_compensated}/\text{slot\_duration}\rceil,\text{ where}$$

slot_duration indicates a time unit, and $\lceil\ \rceil$ indicates a rounding up operation.

In a possible implementation, the time parameter may include a round-trip delay parameter Feeder_RTD between a satellite and the network device and a common timing advance value TA_common, and the TA_common is determined based on a round-trip delay parameter between the satellite and a reference point. The terminal device may determine the second timing offset based on the Feeder_RTD and the TA_common. The second timing offset may satisfy the following formula:

$$K\_\text{mac}=\lceil(\text{Feeder}\_RTD-TA\_\text{common})/\text{slot\_duration}\rceil,\text{ where}$$

slot_duration indicates a time unit, and $\lceil\ \rceil$ indicates a rounding up operation.

In a possible implementation, the time parameter may include duration of the RAR window, the delay start duration of the RAR window, and the first timing offset. The terminal device may determine the second timing offset of the terminal device based on the duration of the RAR window, the delay start duration of the RAR window, and the first timing offset. The second timing offset satisfies the following formula:

$$K\_\text{mac}=\lceil(RAR\_\text{window}+RAR\_\text{window\_delay})/\text{slot\_duration}\rceil-K\text{offset},\text{ where}$$

slot_duration indicates a time unit, $\lceil\ \rceil$ indicates a rounding up operation, and Koffset indicates the first timing offset.

In a possible implementation, the time parameter may include the first timing offset and a common timing advance value TA_common, and the TA_common is determined based on a round-trip delay parameter between a satellite and a reference point. The terminal device may determine a round-trip delay parameter TA_cal of a service link of the terminal device based on location information of the satellite. The terminal device may determine the second timing offset of the terminal device based on the first timing offset, the TA_cal, and the TA_common. The second timing offset may satisfy the following formula:

$$K\_\text{mac}=K\text{offset}-\lceil(TA\_\text{cal}+TA\_\text{common})/\text{slot\_duration}\rceil,\text{ where}$$

slot_duration indicates a time unit, $\lceil\ \rceil$ indicates a rounding up operation, and Koffset indicates the first timing offset.

In a possible implementation, the time parameter may include duration of the RAR window, the delay start duration of the RAR window, and a common timing advance value TA_common, and the TA_common is determined based on a round-trip delay parameter between a satellite and a reference point. The terminal device may determine a round-trip delay parameter TA_cal of a service link of the terminal device based on location information of the satellite. The terminal device may determine the second timing offset based on the duration of the RAR window, the delay start duration of the RAR window, the TA_cal, and the TA_common. The second timing offset satisfies the following formula:

$$K\_mac=[(RAR\_window+RAR\_window\_delay)/slot\_duration]-[(TA\_cal+TA\_common)/slot\_duration], \text{ where}$$

slot_duration indicates a time unit, and $\lceil\ \rceil$ indicates a rounding up operation.

Based on the foregoing possible implementations, the terminal device can determine the second timing offset based on the time parameter from the network device and a calculation relationship.

In a possible implementation, the terminal device may determine the second timing offset based on the time parameter and an adjustment parameter of the second timing offset. The adjustment parameter of the second timing offset is preset or is indicated by the network device.

Based on the foregoing solution, the terminal device can determine the second timing offset based on the time parameter and the adjustment parameter of the second timing offset. This can reduce impact of factors such as a positioning error on the time parameter, and make the second timing offset more accurate.

In a possible implementation, the delay start duration of the RAR window includes first delay start duration of the RAR window, and the time parameter may include the round-trip delay parameter Delay_compensated between the reference point and the network device and the common timing advance value TA_common. The TA_common is determined based on the round-trip delay parameter between the satellite and the reference point. The terminal device may determine the round-trip delay parameter TA_cal of the service link of the terminal device based on the location information of the satellite. The terminal device may determine the first delay start duration of the RAR window based on the TA_cal, the TA_common, and the Delay_compensated. The first delay start duration of the RAR window satisfies the following formula:

$$RAR\_window\_delay1=TA\_cal+Delay\_compensated+TA\_common.$$

In a possible implementation, the delay start duration of the RAR window includes first delay start duration of the RAR window, and the time parameter may include the second timing offset and the common timing advance value TA_common. The TA_common is determined based on the round-trip delay parameter between the satellite and the reference point. The terminal device may determine the round-trip delay parameter TA_cal of the service link of the terminal device based on the location information of the satellite. The terminal device may determine the first delay start duration of the RAR window based on the TA_cal, the TA_common, and the second timing offset. The first delay start duration of the RAR window satisfies the following formula:

$$RAR\_window\_delay1=TA\_cal+TA\_common+K\_mac*slot\_duration, \text{ where}$$

slot_duration indicates a time unit, and K_mac indicates the second timing offset.

In a possible implementation, the delay start duration of the RAR window includes first delay start duration of the RAR window, and the time parameter includes the round-trip delay parameter Feeder_RTD between the satellite and the network device. The terminal device may determine the round-trip delay parameter TA_cal of the service link of the terminal device based on the location information of the satellite. The terminal device may determine the first delay start duration of the RAR window based on the TA_cal and the Feeder_RTD. The first delay start duration of the RAR window satisfies the following formula:

$$RAR\_window\_delay1=TA\_cal+Feeder\_RTD.$$

In a possible implementation, the delay start duration of the RAR window includes first delay start duration of the RAR window, and the time parameter includes the first timing offset and the duration of the RAR window. The terminal device may determine the first delay start duration of the RAR window based on the first timing offset and the duration of the RAR window. The first delay start duration of the RAR window may satisfy the following formula:

$$RAR\_window\_delay1=Koffset*slot\_duration-RAR\_window, \text{ where}$$

Koffset indicates the first timing offset, and slot_duration indicates a time unit.

In a possible implementation, the delay start duration of the RAR window includes first delay start duration of the RAR window, and the time parameter may include the minimum round-trip delay parameter Service_RTD_min of the service link between the satellite and the area covered by the satellite and the round-trip delay parameter Delay_compensated between the reference point and the network device. The terminal device may determine the first delay start duration of the RAR window based on the Service_RTD_min and the Delay_compensated. The first delay start duration of the RAR window may satisfy the following formula:

$$RAR\_window\_delay1=Service\_RTD\_min+Delay\_compensated+TA\_common.$$

Based on the foregoing possible implementations, the terminal device can determine the first delay start duration of the RAR window based on the time parameter from the network device.

In a possible implementation, the terminal device may determine the first delay start duration of the RAR window based on the time parameter and an adjustment parameter of the delay start duration of the RAR window. The adjustment parameter of the delay start duration of the RAR window is preset or is indicated by the network device.

Based on the foregoing solution, the terminal device can determine the first delay start duration of the RAR window based on the time parameter and the adjustment parameter of the delay start duration of the RAR window. This can reduce impact of factors such as a positioning error on the time parameter, and make the first delay start duration of the RAR window more accurate.

In a possible implementation, the delay start duration of the RAR window includes second delay start duration of the RAR window. The terminal device may determine the second delay start duration of the RAR window based on the first delay start duration of the RAR window and a timing advance value used by the terminal device. Alternatively, the terminal device may determine the second delay start duration of the RAR window based on the first delay start duration of the RAR window, a timing advance value used by the terminal device, and the adjustment parameter of the delay start duration of the RAR window. The adjustment parameter of the delay start duration of the RAR window is preset or is indicated by the network device.

Based on the foregoing solution, the terminal device can determine the second delay start duration of the RAR window based on the first delay start duration of the RAR window, and the terminal device can select to use different delay start duration of the RAR window based on different understandings of a start moment of the RAR window.

In a possible implementation, the delay start duration of the RAR window includes second delay start duration of the RAR window, and the time parameter may include the first delay start duration of the RAR window. The terminal device may determine the second delay start duration of the RAR window based on the first delay start duration of the RAR window and a timing advance value used by the terminal device. Alternatively, the terminal device may determine the second delay start duration of the RAR window based on the first delay start duration of the RAR window, a timing advance value used by the terminal device, and the adjustment parameter of the delay start duration of the RAR window. The adjustment parameter of the delay start duration of the RAR window is preset or is indicated by the network device.

Based on the foregoing solution, the terminal device can determine the first delay start duration of the RAR window based on the second delay start duration of the RAR window, and the terminal device can select to use different delay start duration of the RAR window based on different understandings of a start moment of the RAR window.

In a possible implementation, the terminal device may receive indication information. The indication information may indicate that the network device compensates for a round-trip delay of a feeder link, or the indication information may indicate that the network device does not compensate for a round-trip delay of a feeder link.

Based on the foregoing solution, the terminal device can determine, based on the indication information, whether the network device compensates for the round-trip delay of the feeder link, to determine the first timing offset, the second timing offset, and the delay start duration of the RAR window based on the time parameter.

In a possible implementation, the time parameter may include a common timing value and a difference of the first timing offset. The common timing value herein is determined based on the round-trip delay of the feeder link. When the indication information indicates that the network device compensates for the round-trip delay of the feeder link, the terminal device may determine the first timing offset based on the difference of the first timing offset but not based on the common timing value. When the indication information indicates that the network device does not compensate for the round-trip delay of the feeder link, the terminal device may determine the first timing offset based on the difference of the first timing offset and the common timing value.

In a possible implementation, the time parameter may include a common timing value. When the indication information indicates that the network device compensates for a round-trip delay of a feeder link, the terminal device determines the second timing offset based on the common timing value. When the indication information indicates that the network device does not compensate for the round-trip delay of the feeder link, the terminal device determines the second timing offset based on 0 but not based on the common timing value.

In a possible implementation, the delay start duration of the RAR window includes the first delay start duration of the RAR window, the time parameter includes a common timing value, and the common timing value is determined based on the round-trip delay of the feeder link. The terminal device determines a round-trip delay parameter TA_cal of a service link of the terminal device based on location information of the satellite. When the indication information indicates that the network device compensates for the round-trip delay of the feeder link, the terminal device determines the first delay start duration of the RAR window based on the TA_cal and the common timing value. When the indication information indicates that the network device does not compensate for the round-trip delay of the feeder link, the terminal device determines the first delay start duration of the RAR window based on the TA_cal and the common timing value.

In a possible implementation, the delay start duration of the RAR window includes the second delay start duration of the RAR window, the time parameter includes a common timing value, and the common timing value is determined based on a round-trip delay of a feeder link. When the indication information indicates that the network device compensates for the round-trip delay of the feeder link, the terminal device determines the second delay start duration of the RAR window based on the common timing value. When the indication information indicates that the network device does not compensate for the round-trip delay of the feeder link, the terminal device determines the second delay start duration of the RAR window based on the common timing value.

In a possible implementation, the time parameter may include a common timing value. The common timing value is determined based on the round-trip delay of the feeder link. The terminal device determines a round-trip delay parameter TA_cal of a service link of the terminal device based on location information of the satellite. When the indication information indicates that the network device compensates for the round-trip delay of the feeder link, the terminal device determines a used timing advance value based on the TA_cal but not based on the common timing value. When the indication information indicates that the network device does not compensates for the round-trip delay of the feeder link, the terminal device determines a used timing advance value based on the TA_cal and the common timing value.

Based on the foregoing solution, the indication information can indicate whether the network device compensates for the round-trip delay of the feeder link, and the round-trip delay of the feeder link and the common timing advance value are jointly indicated by using the common timing value, so that signaling overheads can be further reduced.

In a possible implementation, the time parameter includes the difference of the first timing offset and the second timing offset, and the terminal device determines the first timing offset based on the difference of the first timing offset but not based on the second timing offset.

Alternatively, the delay start duration of the RAR window includes the first delay start duration of the RAR window, and the time parameter may include the second timing offset. The terminal device determines the round-trip delay parameter TA_cal of the service link of the terminal device based on the location information of the satellite. The terminal device determines the first delay start duration of the RAR window based on the TA_cal and the second timing offset.

Alternatively, the delay start duration of the RAR window includes the second delay start duration of the RAR window, and the time parameter may include the second timing offset.

The terminal device may determine the first delay start duration of the RAR window based on the second timing offset.

Alternatively, the time parameter may include the difference of the first timing offset and the common timing value. The common timing value is determined based on the round-trip delay of the feeder link. The terminal device determines the first timing offset based on the difference of the first timing offset and the common timing value.

Alternatively, the time parameter may include the common timing value. The common timing value is determined based on the round-trip delay of the feeder link. The terminal device determines the second timing offset based on 0 but not based on the common timing value.

Alternatively, the delay start duration of the RAR window includes the first delay start duration of the RAR window. The time parameter includes the common timing value, and the common timing value is determined based on the round-trip delay of the feeder link. The terminal device determines the round-trip delay parameter TA_cal of the service link of the terminal device based on the location information of the satellite. The terminal device determines the first delay start duration of the RAR window based on the TA_cal and the common timing value.

Alternatively, the delay start duration of the RAR window includes the second delay start duration of the RAR window. The time parameter includes the common timing value, and the common timing value is determined based on the round-trip delay of the feeder link. The terminal device determines the second delay start duration of the RAR window based on the common timing value.

Based on the foregoing solution, the common timing value or K_mac can be used to indicate whether the network device compensates for the round-trip delay of the feeder link, and the indication information may not be used for indication. This can reduce signaling overheads.

In a possible implementation, the delay start duration of the RAR window includes the first delay start duration of the RAR window and the second delay start duration of the RAR window, the second delay start duration of the RAR window is determined based on the round-trip delay parameter Delay_compensated between the reference point and the network device, and the time parameter includes the second delay start duration of the RAR window. The terminal device determines the second timing offset based on the second delay start duration of the RAR window. Alternatively, the terminal device determines the first delay start duration of the RAR window based on the second delay start duration of the RAR window and the timing advance value used by the terminal device.

Based on the foregoing solution, the terminal device can determine the second timing offset or the first delay start duration of the RAR window based on the second delay start duration of the RAR window.

According to a second aspect, a parameter transmission method is provided. The method may be performed by a network device, or may be performed by a chip having a function similar to that of a network device. In the method, the network device may send first information. The first information may include a time parameter, and the time parameter is used to determine a timing offset. The timing offset herein includes at least one of a first timing offset and a second timing offset. The first timing offset may be used to determine a delay degree of receiving information by the network device, or the first timing offset is used to determine an advance degree of sending information by the network device, and the second timing offset is used to determine a delay degree of taking effect of configuration information sent by the network device.

Based on the foregoing solution, the network device can indicate, to a terminal device, the time parameter for determining one of the first timing offset and the second timing offset. This can resolve an insufficient scheduling delay for uplink data on a network side, an insufficient feedback delay configured by the network side for the terminal device, or an insufficient timing delay for a downlink configuration to take effect. In addition, the time parameter can be used to determine the first timing offset and the second timing offset, to reduce signaling overheads.

In a possible implementation, the time parameter is further used to determine delay start duration of a random access RAR window. The delay start duration of the RAR window is used to determine a delay degree of starting the RAR window by the terminal device.

Based on the foregoing solution, the network device can indicate, to the terminal device, the time parameter for determining the delay start duration of the RAR window, and the terminal device can start the RAR window in a delayed manner. In addition, the time parameter can be used to determine the first timing offset, the second timing offset, and the delay start duration of the RAR window. Therefore, the delay start duration of the RAR window can be indicated without additional signaling overheads, to reduce signaling overheads.

In a possible implementation, the time parameter is used to determine the first timing offset. The time parameter may include a difference of the first timing offset and a common timing advance value TA_common. The TA_common is a parameter determined based on a round-trip delay between a satellite and a reference point. The terminal device may determine the first timing offset based on the difference of the first timing offset and the TA_common. The first timing offset may satisfy the following formula:

$$K\text{offset}=\lceil TA\_\text{common/slot\_duration}\rceil+\Delta K\text{offset},$$
where slot_duration indicates a time unit, $\lceil\ \rceil$ indicates a rounding up operation, and $\Delta K$offset indicates the difference of the first timing offset.

Alternatively, the time parameter includes a minimum round-trip delay parameter Service_RTD_min of a service link between a satellite and an area covered by the satellite, a common timing advance value TA_common, and duration of the RAR window. The TA_common is a parameter determined based on a round-trip delay between the satellite and a reference point. The terminal device may determine the first timing offset based on the Service_RTD_min, the TA_common, and the duration of the RAR window. The first timing offset satisfies the following formula:

$$K\text{offset}=\lceil(\text{Service\_}RTD\_\text{min}+RAR\_\text{window}+TA\_\text{common})/\text{slot\_duration}\rceil,\text{where}$$

slot_duration indicates a time unit, and $\lceil\ \rceil$ indicates a rounding up operation.

Alternatively, the time parameter may include a maximum round-trip delay parameter Service_RTD_max of a service link between a satellite and an area covered by the satellite and a common timing advance value TA_common, and the TA_common is a parameter determined based on a round-trip delay between the satellite and a reference point. The terminal device may determine the first timing offset based on the Service_RTD_max and the TA_common. The first timing offset may satisfy the following formula:

$$K\text{offset}=\lceil(\text{Service\_}RTD\_\text{max}+TA\_\text{common})/\text{slot\_duration}\rceil,\text{where}$$

slot_duration indicates a time unit, and ⌈ ⌉ indicates a rounding up operation.

Alternatively, the time parameter may include duration of the RAR window, the delay start duration of the RAR window, and a round-trip delay parameter Delay_compensated between a reference point and the network device. The terminal device may determine the first timing offset based on the duration of the RAR window, the delay start duration of the RAR window, and the Delay_compensated. The first timing offset may satisfy the following formula:

$$K\text{offset}=\lceil(RAR\_\text{window}+RAR\_\text{window\_delay}-\text{Delay\_compensated})/\text{slot\_duration}\rceil, \text{ where}$$

slot_duration indicates a time unit, and ⌈ ⌉ indicates a rounding up operation.

Alternatively, the time parameter may include duration of the RAR window and the delay start duration of the RAR window. The terminal device may determine the first timing offset based on the duration of the RAR window and the delay start duration of the RAR window. The first timing offset may satisfy the following formula:

$$K\text{offset}=\lceil(RAR\_\text{window}+RAR\_\text{window\_delay})/\text{slot\_duration}\rceil, \text{ where}$$

slot_duration indicates a time unit, and ⌈ ⌉ indicates a rounding up operation.

Alternatively, the time parameter may include duration of the RAR window, the delay start duration of the RAR window, and the second timing offset. The terminal device may determine the first timing offset based on the duration of the RAR window, the delay start duration of the RAR window, and the second timing offset. The first timing offset may satisfy the following formula:

$$K\text{offset}=\lceil(RAR\_\text{window}+RAR\_\text{window\_delay})/\text{slot\_duration}\rceil-K\_\text{mac}, \text{ where}$$

slot_duration indicates a time unit, ⌈ ⌉ indicates a rounding up operation, and K_mac indicates the second timing offset.

Based on the foregoing solution, the network device can indicate, to the terminal device, the time parameter for determining the first timing offset, and the terminal device can determine the first timing offset based on the time parameter from the network device and a corresponding calculation relationship.

In a possible implementation, the time parameter is used to determine the second timing offset. The time parameter may include the round-trip delay parameter Delay_compensated between the reference point and the network device. The terminal device may determine the second timing offset based on the Delay_compensated. The second timing offset may satisfy the following formula:

$$K\_\text{mac}=\lceil\text{Delay\_compensated}/\text{slot\_duration}\rceil, \text{ where}$$

slot_duration indicates a time unit, and ⌈ ⌉ indicates a rounding up operation.

Alternatively, the time parameter may include a round-trip delay parameter Feeder_RTD between the satellite and the network device and the common timing advance value TA_common, and the TA_common is determined based on the round-trip delay parameter between the satellite and the reference point. The terminal device may determine the second timing offset based on the Feeder_RTD and the TA_common. The second timing offset may satisfy the following formula:

$$K\_\text{mac}=\lceil(\text{Feeder}\_RTD-TA\_\text{common})/\text{slot\_duration}\rceil, \text{ where}$$

slot_duration indicates a time unit, and ⌈ ⌉ indicates a rounding up operation.

Alternatively, the time parameter may include the duration of the RAR window, the delay start duration of the RAR window, and the first timing offset. The terminal device may determine the second timing offset of the terminal device based on the duration of the RAR window, the delay start duration of the RAR window, and the first timing offset. The second timing offset satisfies the following formula:

$$K\_\text{mac}=\lceil(RAR\_\text{window}+RAR\_\text{window\_delay})/\text{slot\_duration}\rceil-K\text{offset}, \text{ where}$$

slot_duration indicates a time unit, ⌈ ⌉ indicates a rounding up operation, and Koffset indicates the first timing offset.

Alternatively, the time parameter may include the first timing offset and the common timing advance value TA_common, and the TA_common is determined based on the round-trip delay parameter between the satellite and the reference point. The terminal device may determine a round-trip delay parameter TA_cal of a service link of the terminal device based on location information of the satellite. The terminal device may determine the second timing offset of the terminal device based on the first timing offset, the TA_cal, and the TA_common. The second timing offset may satisfy the following formula:

$$K\_\text{mac}=K\text{offset}-\lceil(TA\_\text{cal}+TA\_\text{common})/\text{slot\_duration}\rceil, \text{ where}$$

slot_duration indicates a time unit, ⌈ ⌉ indicates a rounding up operation, and Koffset indicates the first timing offset.

Alternatively, the time parameter may include the duration of the RAR window, the delay start duration of the RAR window, and the common timing advance value TA_common, and the TA_common is determined based on the round-trip delay parameter between the satellite and the reference point. The terminal device may determine a round-trip delay parameter TA_cal of a service link of the terminal device based on location information of the satellite. The terminal device may determine the second timing offset based on the duration of the RAR window, the delay start duration of the RAR window, the TA_cal, and the TA_common. The second timing offset satisfies the following formula:

$$K\_\text{mac}=\lceil(RAR\_\text{window}+RAR\_\text{window\_delay})/\text{slot\_duration}\rceil-\lceil(TA\_\text{cal}+TA\_\text{common})/\text{slot\_duration}\rceil, \text{ where}$$

slot_duration indicates a time unit, and ⌈ ⌉ indicates a rounding up operation.

Based on the foregoing solution, the network device can indicate, to the terminal device, the time parameter for determining the second timing offset, and the terminal device can determine the second timing offset based on the time parameter from the network device and a calculation relationship.

In a possible implementation, the delay start duration of the RAR window includes first delay start duration of the RAR window, and the time parameter is used to determine the first delay start duration of the RAR window. The time parameter may include the round-trip delay parameter Delay_compensated between the reference point and the network device and the common timing advance value TA_common. The TA_common is determined based on the round-trip delay parameter between the satellite and the reference point. The terminal device may determine the round-trip delay parameter TA_cal of the service link of the terminal device based on the location information of the satellite. The terminal device may determine the first delay start duration of the RAR window based on the TA_cal, the TA_common, and the Delay_compensated. The first delay start duration of the RAR window satisfies the following formula:

$$RAR\_window\_delay1 = TA\_cal + Delay\_compensated + TA\_common.$$

Alternatively, the time parameter may include the second timing offset and the common timing advance value TA_common. The TA_common is determined based on the round-trip delay parameter between the satellite and the reference point. The terminal device may determine the round-trip delay parameter TA_cal of the service link of the terminal device based on the location information of the satellite. The terminal device may determine the first delay start duration of the RAR window based on the TA_cal, the TA_common, and the second timing offset. The first delay start duration of the RAR window satisfies the following formula:

$$RAR\_window\_delay1 = TA\_cal + TA\_common + K\_mac*slot\_duration, \text{ where}$$

slot_duration indicates a time unit, and K_mac indicates the second timing offset.

Alternatively, the time parameter includes the round-trip delay parameter Feeder_RTD between the satellite and the network device. The terminal device may determine the round-trip delay parameter TA_cal of the service link of the terminal device based on the location information of the satellite. The terminal device may determine the first delay start duration of the RAR window based on the TA_cal and the Feeder_RTD. The first delay start duration of the RAR window satisfies the following formula:

$$RAR\_window\_delay1 = TA\_cal + Feeder\_RTD.$$

Alternatively, the time parameter includes the first timing offset and the duration of the RAR window. The terminal device may determine the first delay start duration of the RAR window based on the first timing offset and the duration of the RAR window. The first delay start duration of the RAR window may satisfy the following formula:

$$RAR\_window\_delay1 = Koffset*slot\_duration - RAR\_window, \text{ where}$$

Koffset indicates the first timing offset, and slot_duration indicates a time unit.

Alternatively, the time parameter may include the minimum round-trip delay parameter Service_RTD_min of the service link between the satellite and the area covered by the satellite and the round-trip delay parameter Delay_compensated between the reference point and the network device. The terminal device may determine the first delay start duration of the RAR window based on the Service_RTD_min and the Delay_compensated. The first delay start duration of the RAR window may satisfy the following formula:

$$RAR\_window\_delay1 = Service\_RTD\_min + Delay\_compensated + TA\_common.$$

In a possible implementation, the delay start duration of the RAR window includes the first delay start duration of the RAR window and second delay start duration of the RAR window. The time parameter may be used to determine the second delay start duration of the RAR window, and the time parameter includes the first delay start duration of the RAR window. Alternatively, the time parameter is used to determine the first delay start duration of the RAR window, the time parameter includes the second delay start duration of the RAR window, and the second delay start duration of the RAR window is determined based on the round-trip delay parameter Delay_compensated between the reference point and the network device.

Based on the foregoing solution, the network device can indicate, to the terminal device, the time parameter for determining the first delay start duration of the RAR window, and the terminal device can determine the first delay start duration of the RAR window based on the time parameter from the network device.

In a possible implementation, the network device sends indication information. The indication information indicates that the network device compensates for a round-trip delay of a feeder link, or the indication information indicates that the network device does not compensate for a round-trip delay of a feeder link. The time parameter may include a common timing value. The common timing value is determined based on the round-trip delay of the feeder link.

Based on the foregoing solution, the network device can indicate, based on the indication information, whether to compensate for the round-trip delay of the feeder link, and the round-trip delay of the feeder link and the common timing advance value are jointly indicated by using the common timing value, so that signaling overheads can be further reduced.

In a possible implementation, the time parameter includes the second timing offset, or the time parameter includes a common timing value. The common timing value is determined based on a round-trip delay of a feeder link.

Based on the foregoing solution, the network device can indicate, by using the common timing value or the K_mac, whether to compensate for the round-trip delay of the feeder link, and can perform indicating by not using the indication information. This can reduce signaling overheads.

In a possible implementation, the network device sends at least one of an adjustment parameter of the first timing offset, an adjustment parameter of the second timing offset, and an adjustment parameter of the delay start duration of the RAR window.

Based on the foregoing solution, the first timing offset, the second timing offset, and the delay start duration of the RAR window are adjusted by using the adjustment parameter of the first timing offset, the adjustment parameter of the second timing offset, and the adjustment parameter of the delay start duration of the RAR window, to reduce impact of factors such as a positioning error on the time parameter.

According to a third aspect, a communication apparatus is provided. The communication apparatus may include modules/units configured to perform any one of the first aspect or the possible implementations of the first aspect, or may further include modules/units configured to perform any one of the second aspect or the possible implementations of the second aspect, for example, a processing module and a transceiver module.

In an example, when the communication apparatus includes the modules/units configured to perform any one of the first aspect or the possible implementations of the first aspect, the transceiver module may be configured to receive first information. The first information includes a time parameter, and the time parameter is used to determine a timing offset. The timing offset herein may include at least one of a first timing offset and a second timing offset. For related descriptions, refer to the first aspect. Details are not described herein again. The processing module may be configured to determine the timing offset based on the time parameter, for example, determine at least one of the first timing offset and the second timing offset.

In another example, when the communication apparatus includes the modules/units configured to perform any one of the second aspect or the possible implementations of the second aspect, the processing module may be configured to generate first information. The first information includes a time parameter, and the time parameter is used to determine a timing offset. The timing offset herein may include at least one of a first timing offset and a second timing offset. For related descriptions, refer to the second aspect. Details are not described herein again. The transceiver module may be configured to send the first information.

According to a fourth aspect, a communication apparatus is provided, and may include a processor and a transceiver. The transceiver may perform a receiving/sending operation in the first aspect and/or the possible implementations, and the processor may perform an operation other than the receiving/sending operation in the first aspect and/or the possible implementations. For example, the transceiver may be configured to receive first information, and the processor may be configured to determine a timing offset based on the first information. Alternatively, the transceiver may perform a receiving/sending operation in the second aspect and/or the possible implementations, and the processor may perform an operation other than the receiving/sending operation in the second aspect and/or the possible implementations. For example, the processor may be configured to generate first information, and the transceiver may be configured to send the first information.

According to a fifth aspect, a communication apparatus is provided, and may include a processor and a memory. The memory is configured to store computer-executable instructions. When a controller runs, the processor executes some or all of the computer-executable instructions in the memory, to use hardware resources in the controller to perform operation steps of the method according to any one of the first aspect or the possible implementations of the first aspect, or perform operation steps of the method according to any one of the second aspect or the possible implementations of the second aspect.

In a design, the processor and the memory are integrated together.

According to a sixth aspect, a chip is provided, and may include a logic circuit and a communication interface. The communication interface may perform a receiving/sending operation in the first aspect and/or the possible implementations, and the logic circuit may perform an operation other than the receiving/sending operation in the first aspect and/or the possible implementations. For example, the communication interface may be configured to input first information. The logic circuit may be configured to determine a timing offset based on a time parameter. Alternatively, the communication interface may perform a receiving/sending operation in the second aspect and/or the possible implementations, and the logic circuit may perform an operation other than the receiving/sending operation in the second aspect and/or the possible implementations. For example, the logic circuit may be configured to generate first information, and the communication interface may be configured to send the first information.

According to a seventh aspect, a communication system is provided, and may include a communication apparatus configured to perform the method according to the first aspect and/or the possible implementations and a communication apparatus configured to perform the method according to the second aspect and/or the possible implementations.

According to an eighth aspect, this application provides a computer-readable storage medium. The computer-readable storage medium stores instructions, and when the instructions are run on a computer, the computer is enabled to perform the methods according to the foregoing aspects.

According to a ninth aspect, this application provides a computer program product storing instructions. When the computer program product runs on a computer, the computer performs the methods according to the foregoing aspects.

In addition, for beneficial effects of the third aspect to the ninth aspect, refer to the beneficial effects shown in the first aspect and the second aspect.

BRIEF DESCRIPTION OF DRAWINGS

FIG. 7A is a schematic diagram of time at which MAC signaling takes effect when a second timing offset is not introduced;

DESCRIPTION OF EMBODIMENTS

For ease of understanding embodiments of this application, the following explains and describes nouns in embodiments of this application.

(1) "A plurality of" in embodiments of this application means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between associated objects. In addition, it should be understood that although terms such as "first" and "second" may be used in embodiments of the present invention to describe objects, these objects are not limited by these terms. These terms are merely used to distinguish the objects from each other.

(2) +/− may refer to "+" or "−". For example, A+/−B may be understood as A+B or A−B.

The following describes the technical solutions provided in embodiments of this application with reference to the accompanying drawings.

Figure 1:
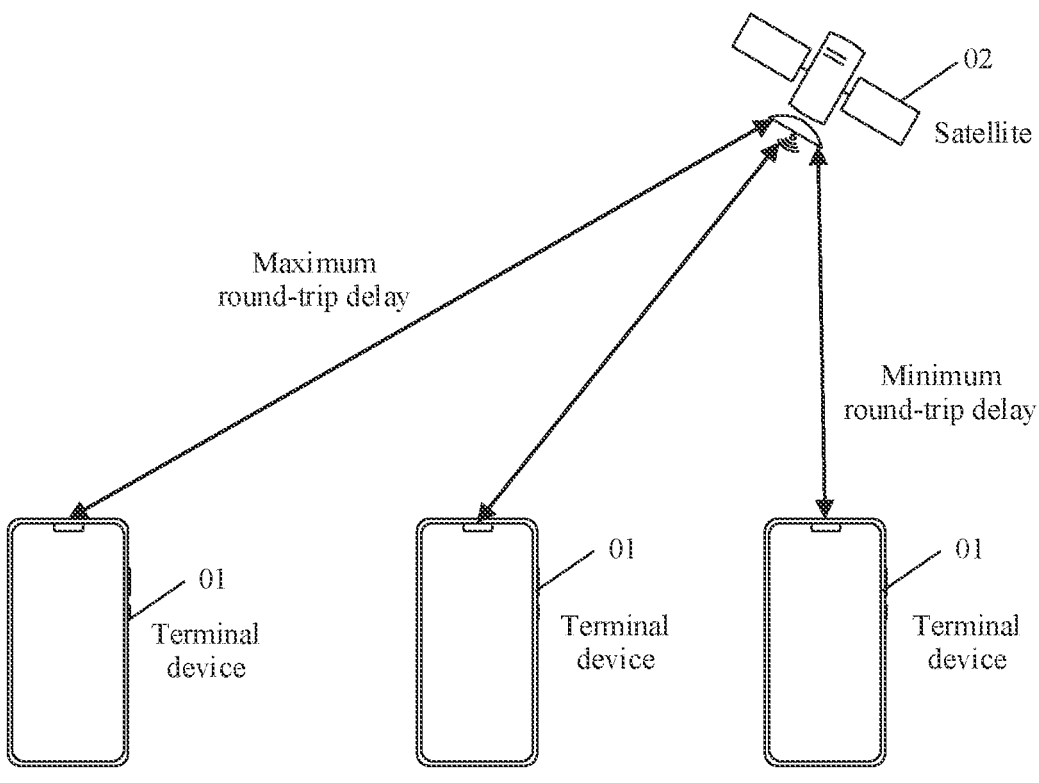
FIG. 1 is a schematic diagram of a round-trip delay between a satellite and a terminal device.
Figure 2:
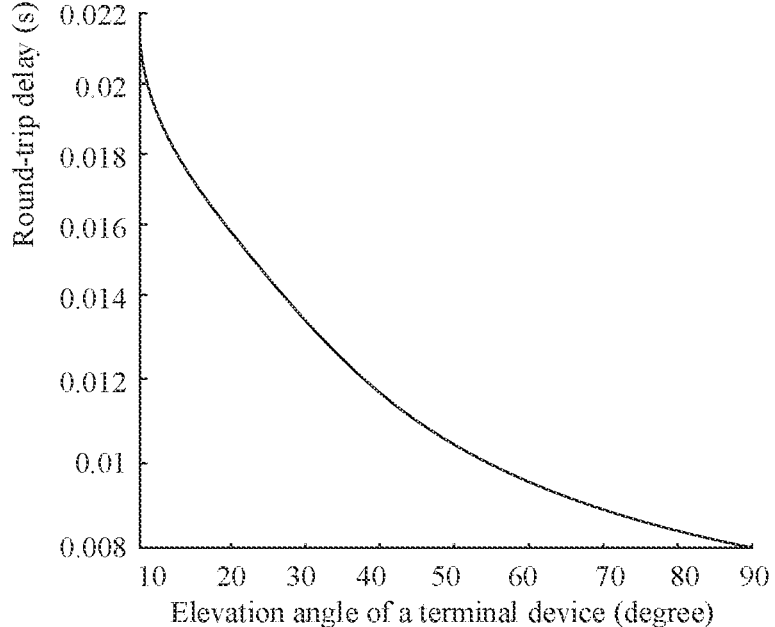
FIG. 2 is a schematic diagram of a relationship between altitude of a satellite and a round-trip delay.
Figure 3:
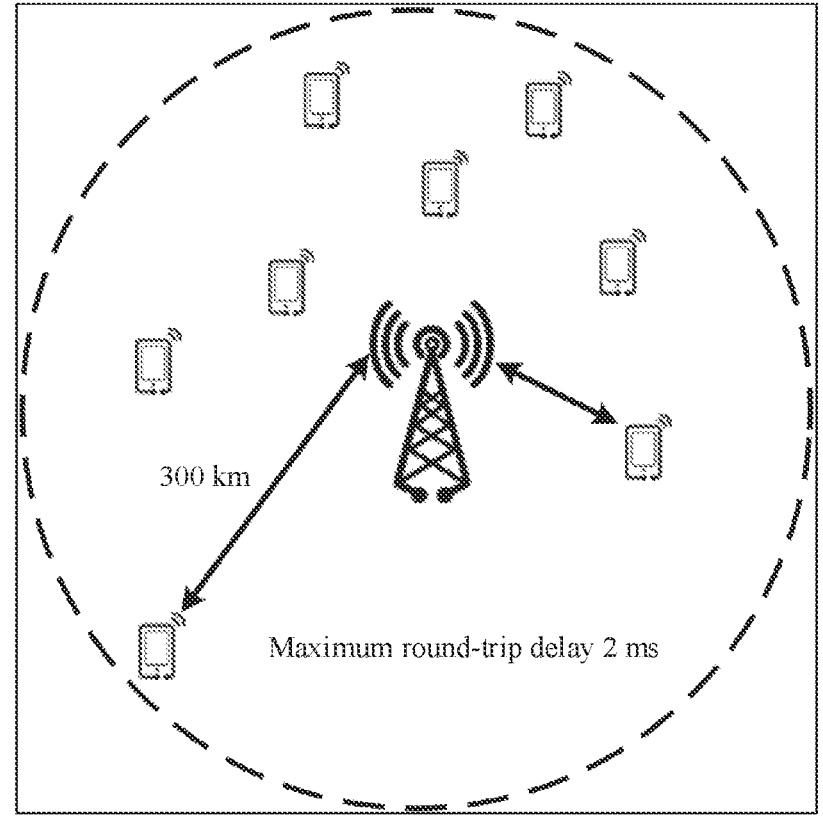
FIG. 3 is a schematic diagram of a round-trip delay in terrestrial communication.

In a non-terrestrial network, a satellite is far away from a terminal device, and an altitude difference is large, resulting in a large round-trip delay. Satellite communication is used as an example. As shown in FIG. 1, when a terminal device is near a location below a satellite, a distance between the terminal device and the satellite is shortest, and a round-trip delay between the terminal device and the satellite is smallest. When a communication elevation angle between the terminal device and the satellite is smallest, a round-trip delay between the terminal device and the satellite is largest. In a geostationary earth orbit (geostationary earth orbit, GEO) communication scenario, a maximum round-trip delay between a satellite and a terminal device may reach 541.46 ms. As shown in FIG. 2, when orbital altitude of the satellite is 1200 km, a minimum round-trip delay between the terminal device and the satellite is 8 ms, and the maximum round-trip delay between the terminal device and the satellite is 20.9 ms. When the satellite works in a gaze mode, a mobile communication elevation angle of the satellite can change from 90 degrees to 10 degrees, and the round-trip delay also gradually changes from 8 ms to 20.9 ms. In a terrestrial communication network, an altitude difference between a base station and a terminal device is not large. Therefore, a round-trip delay is small. As shown in FIG. 3, in terrestrial communication, a maximum radius of a cell is 300 km, and a maximum round-trip delay is 2 ms.

In conclusion, a round-trip delay of an NTN communication system is far greater than a round-trip delay of the terrestrial communication.

Figure 4:
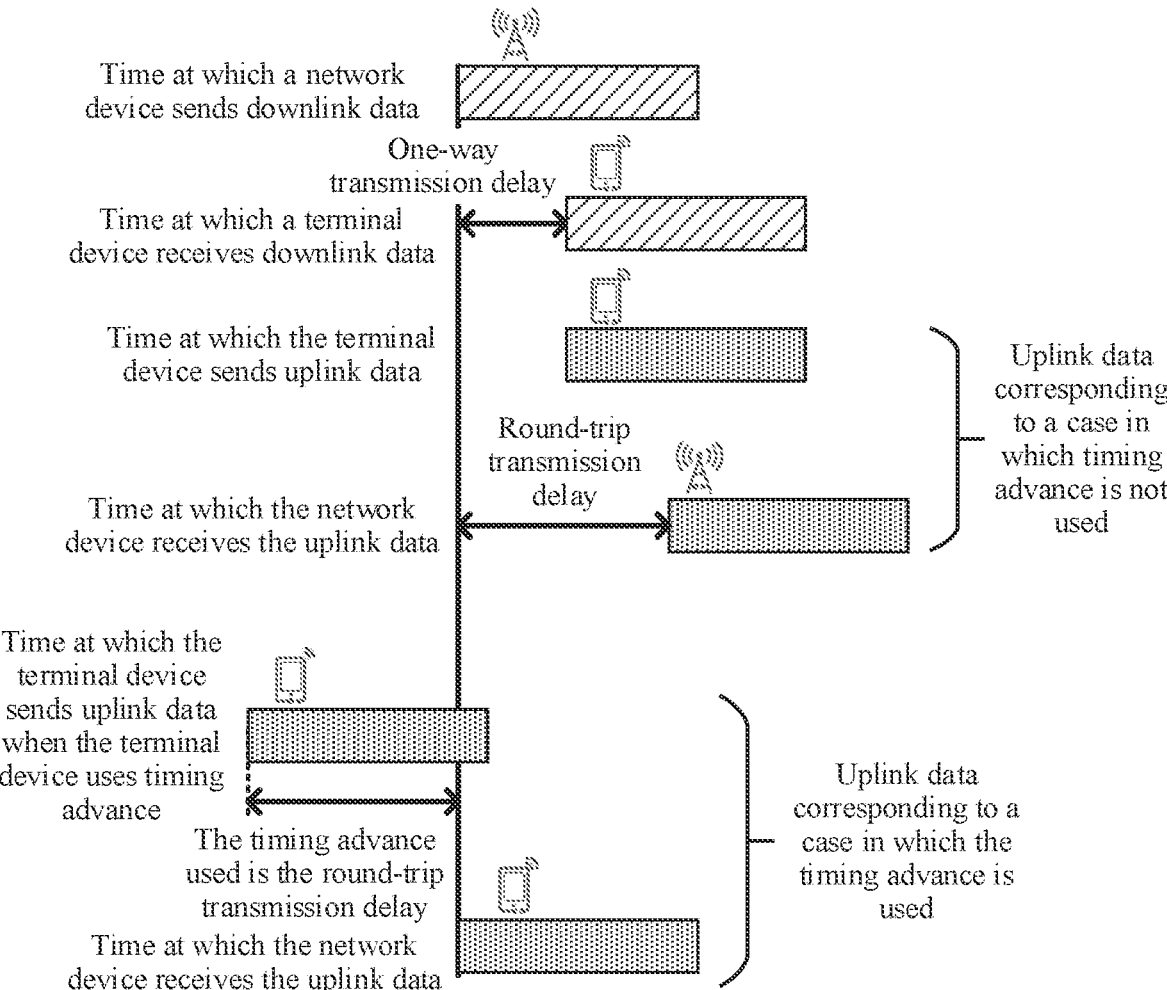
FIG. 4 is a schematic diagram of a round-trip delay of communication between a network device and a terminal device.

Currently, to avoid inter-symbol interference (ISI) generated when uplink data arrives at a network device, it is required that a difference between time at which uplink data of terminal devices using a same frequency band arrives at the network device does not exceed a value of a cyclic prefix (CP). Therefore, the terminal device can perform timing advance adjustment on the uplink data. The terrestrial communication is used as an example. As shown in FIG. 4, if the network device does not perform delay compensation on the uplink data, a value of timing advance adjustment performed by the terminal device on the uplink data is equal to a round-trip delay between the terminal device and the network device. Therefore, in NTN communication, because a round-trip delay is large, a value of timing advance adjustment performed by the terminal device on uplink data is also large.

To resolve the foregoing problem, timing-related parameters such as a first timing offset, a second timing offset, a common timing advance value (TA_common), and delay start duration of a random access response (RAR) window are introduced in the NTN communication. The following separately describes the foregoing timing-related parameters.

1. First Timing Offset

The first timing offset Koffset can resolve an insufficient feedback delay configured by a network side for a terminal device or another problem. The following uses an example to describe a scenario in which the Koffset is used.

Scenario 1

Figure 5A:
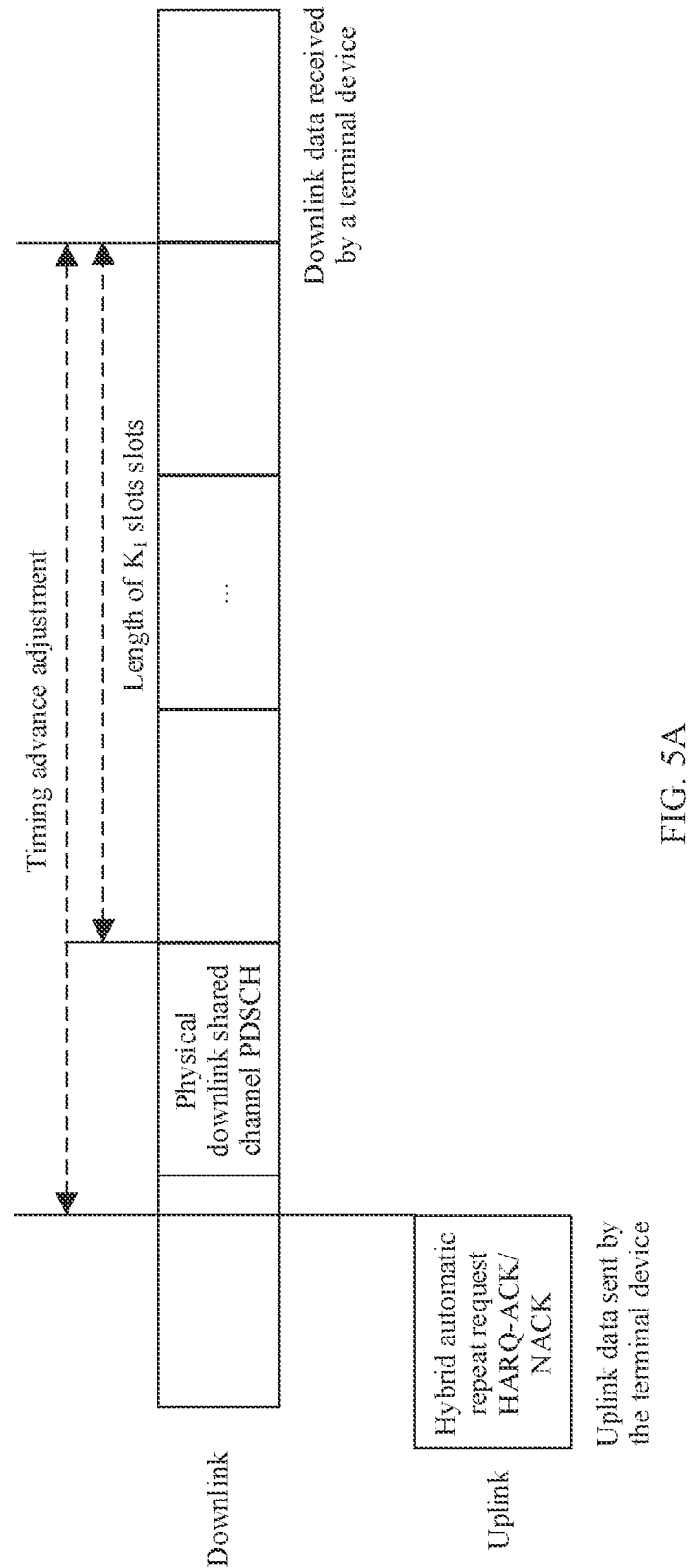
FIG. 5A is a schematic diagram of sending a HARQ-ACK/NACK by a terminal device when a first timing offset is not introduced.

After receiving a physical downlink shared channel (physical downlink shared channel, PDSCH) sent by a network device, the terminal device may send a hybrid automatic repeat request (HARQ) acknowledgement (ACK) or non-acknowledgement (NACK) to feed back whether the PDSCH is successfully decoded. If the terminal device receives the PDSCH in a downlink slot (slot) n, the terminal device may feed back a HARQ-ACK or HARQ-NACK in an uplink slot $n+K_1$. As shown in FIG. 5A, a maximum value of timing advance adjustment that can be performed by the terminal device is a length of $K_1-1$ slots. Currently, a maximum value of $K_1$ is 15. When a subcarrier spacing (SCS) is 15 kHz, a length of one slot is 1 ms. In this case, the maximum value of timing advance adjustment that can be performed by the terminal device is 14 ms. It can be learned from FIG. 2 that the round-trip delay in the NTN communication is greater than 14 ms, that is, a value of timing advance adjustment that needs to be performed by the terminal device on uplink data is also greater than 14 ms. Therefore, the length of $K_1-1$ slots cannot provide a sufficient time length for the terminal device to perform timing advance adjustment, and cannot meet a timing advance requirement of the terminal device for compensating the round-trip delay in the NTN communication. As shown in FIG. 5A, when the value of timing advance adjustment for sending the uplink data by the terminal device is greater than the length of $K_1-1$ slots, the terminal device cannot deliver a HARQ-ACK or HARQ-NACK to the network device on time.

Therefore, the first timing offset Koffset can be introduced, so that there is a sufficient time length between receiving PDSCH data by the terminal device and sending the HARQ-ACK or HARQ-NACK by the terminal device to perform timing advance adjustment.

Figure 5B:
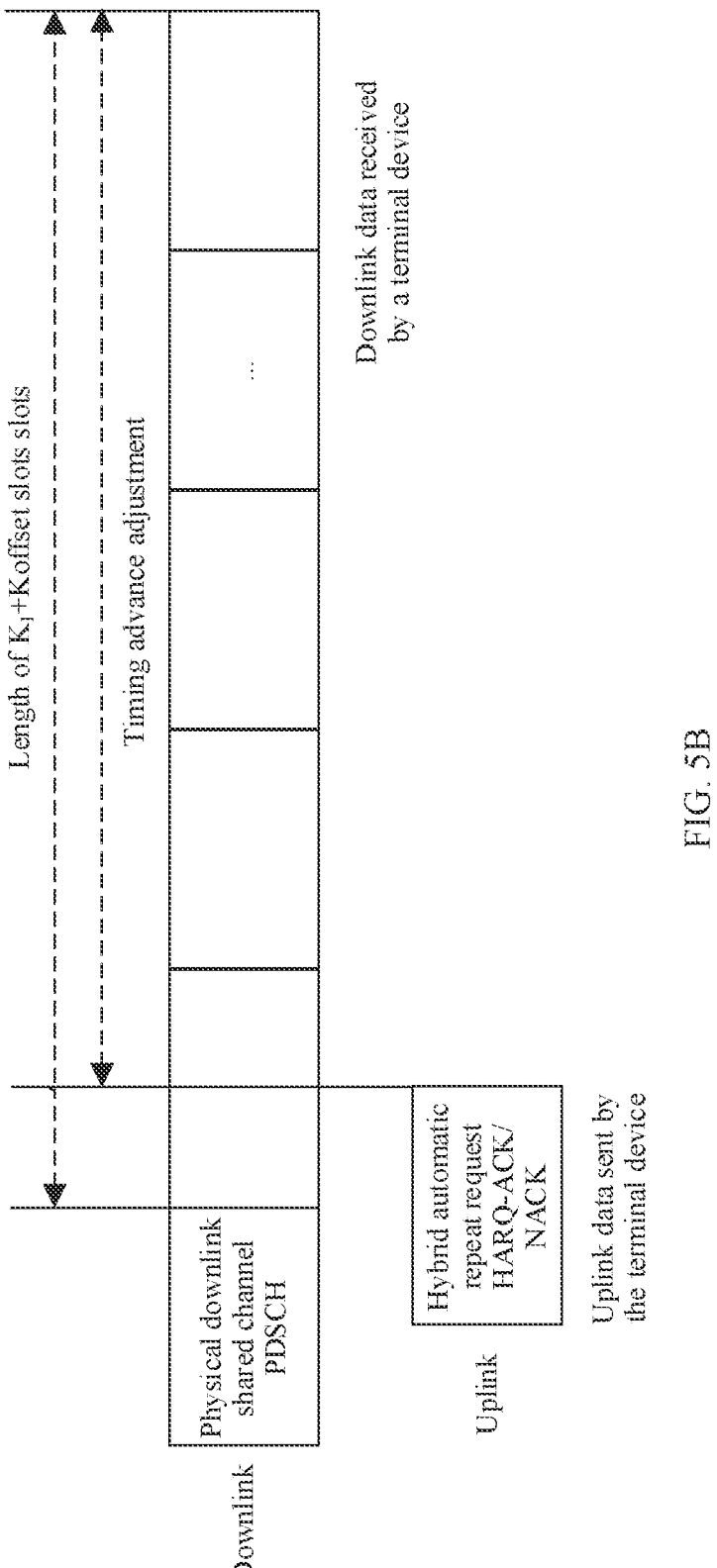
FIG. 5B is a schematic diagram of sending a HARQ-ACK/NACK by a terminal device when a first timing offset is introduced.

As shown in FIG. 5B, the terminal device may send a HARQ-ACK or HARQ-NACK in a slot $n+K_1+\text{Koffset}$. Correspondingly, the network device may receive the HARQ-ACK or HARQ-NACK in the uplink slot $n+K_1+\text{Koffset}$. The Koffset is introduced, to adjust a slot in which the terminal device sends the HARQ-ACK or HARQ-NACK, and increase a scheduling delay of feeding back the HARQ-ACK or HARQ-NACK by the terminal device, so that the terminal device can perform timing advance adjustment based on the sufficient time length.

Scenario 2

Figure 6A:
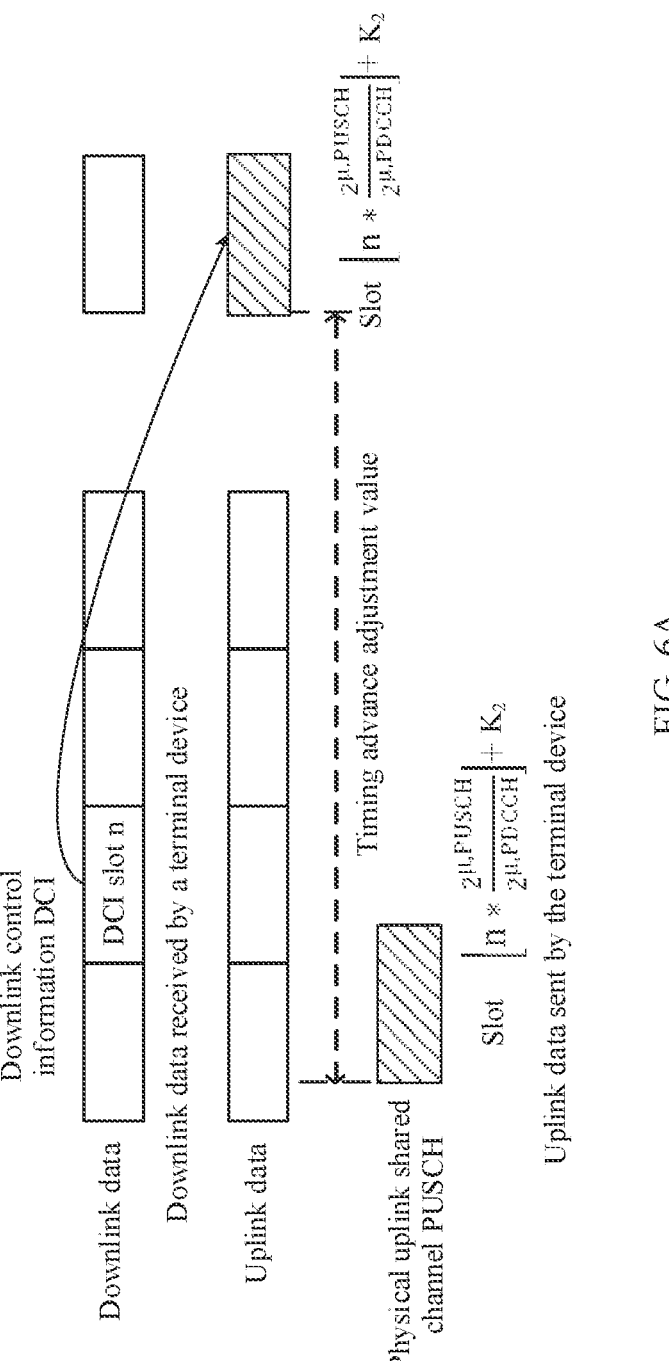
FIG. 6A is a schematic diagram of sending uplink data by a terminal device when a first timing offset is not introduced.

When a physical uplink shared channel (PUSCH) is scheduled by using downlink control information (DCI), a scheduling delay is less than the value of timing advance adjustment. As shown in FIG. 6A, the terminal device receives, in a downlink slot n, an uplink grant (UL grant) scheduled by using the DCI, and the terminal device sends physical uplink shared channel (physical uplink shared channel, PUSCH) data in a corresponding uplink slot $$\left\lfloor n * \frac{2^{\mu, PUSCH}}{2^{\mu, PDCCH}} \right\rfloor + K_2.$$

$\mu, PUSCH$ is related to a subcarrier spacing of the PUSCH, and $\mu, PDCCH$ is related to a subcarrier spacing of the PDCCH. The subcarrier spacing of the PUSCH$=2^{\mu, PUSCH}*15$ kHz, and the subcarrier spacing of the PDCCH$=2^{\mu, PDCCH}*15$ kHz. When a time length of a value of timing advance adjustment for sending uplink data is greater than a length of $K_2-1$ slots, the terminal device cannot send the uplink data in the slot $$\left\lfloor n * \frac{2^{\mu, PUSCH}}{2^{\mu, PDCCH}} \right\rfloor + K_2,$$

and cannot enable a network device to receive the corresponding PUSCH data in the slot $$\left\lfloor n * \frac{2^{\mu, PUSCH}}{2^{\mu, PDCCH}} \right\rfloor + K_2$$

according to an agreement. In the conventional technology, a value of $K_2$ ranges from 0 to 32. When uplink subcarrier spacings are the same, lengths of $K_2$ slots are different. As shown in Table 1, when the SCS=15 kHz, a maximum length of $K_2$ slots is 32 ms. It can be learned that under conditions of different subcarrier spacings, when the terminal device sends the PUSCH data scheduled by using the DCI, a maximum value of timing advance adjustment that can be performed on the PUSCH data is 32 ms. In a GEO scenario, the maximum round-trip delay is 541.46 ms, and the value of $K_2$ cannot meet the requirement for timing advance. For a low earth orbit (LEO)-1200 scenario, when a subcarrier spacing is 30 kHz, a maximum length of $K_2$ slots is 16 ms. However, a maximum round-trip delay in the LEO-1200 scenario is greater than 20 ms. Therefore, the value of $K_2$ also cannot meet a requirement for timing advance adjustment in this scenario.

20

TABLE 1

| Uplink subcarrier spacing | Maximum length of $K_2$ slots |
|---|---|
| 15 kHz | 32 ms |
| 30 kHz | 16 ms |
| 60 kHz | 8 ms |
| 120 kHz | 4 ms |

Therefore, the first timing offset Koffset can be introduced, so that there is a sufficient time length between receiving the DCI and sending the PUSCH, and the terminal device has a sufficient scheduling delay to perform timing advance adjustment on sending the PUSCH.

Figure 6B:
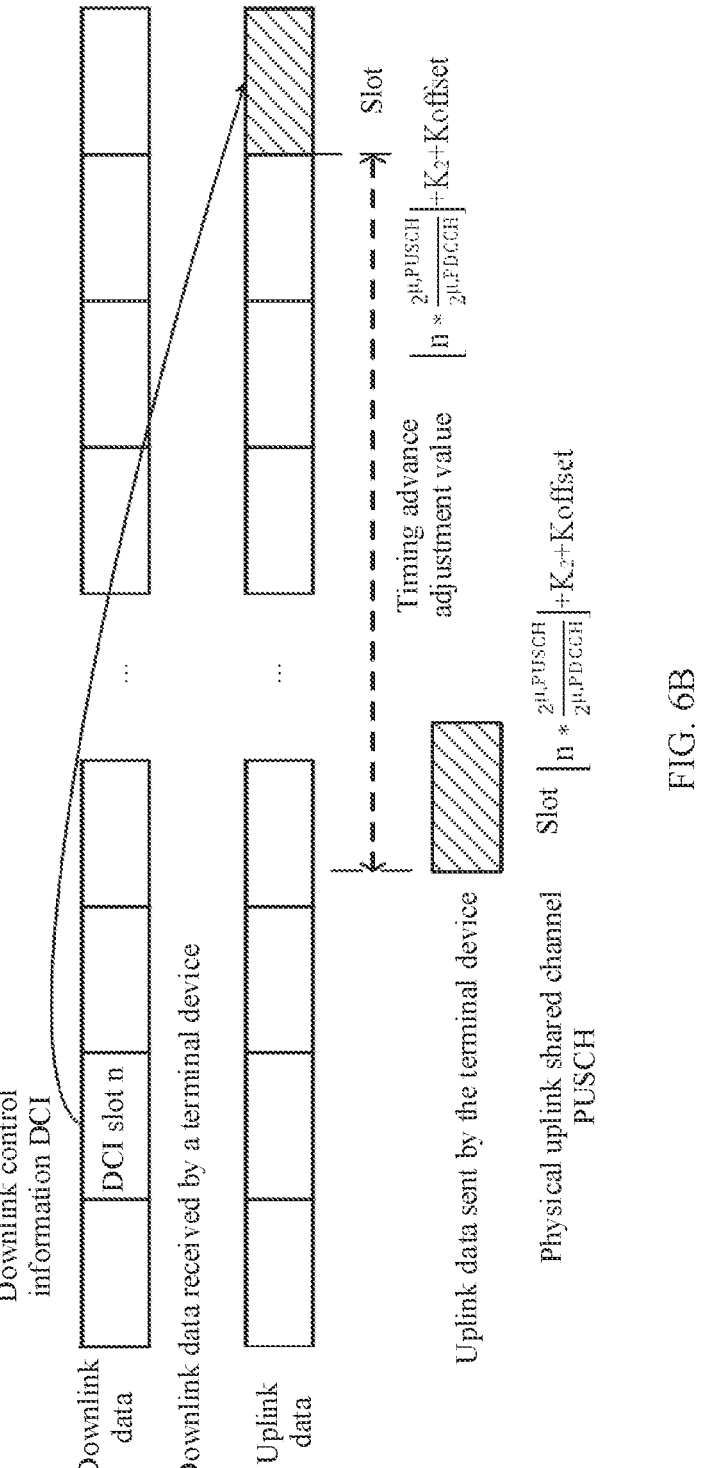
FIG. 6B is a schematic diagram of sending uplink data by a terminal device when a first timing offset is introduced.

As shown in FIG. 6B, the terminal device may send a PUSCH in a slot $$\left\lfloor n * \frac{2^{\mu, PUSCH}}{2^{\mu, PDCCH}} \right\rfloor + K_2 + Koffset.$$

By using the Koffset, a delay for scheduling the uplink data by using the DCI is increased, this can ensure that the terminal device has a sufficient time interval to perform timing advance adjustment.

Scenario 3

In a 2-step random access process, the terminal device may send a message A (message A, Msg A) to a network device. If the network device does not successfully decode the Msg A totally, for example, the network device successfully decodes only a preamble (preamble), the network device may send a fallback RAR (fallback RAR) message to the terminal device. After receiving, in a slot n, a PDSCH carrying the fallback RAR message, the terminal device needs to send, on an uplink PUSCH, a random access message 3 (Msg 3) scheduled by using the fallback RAR message. The terminal device may send the Msg 3 in a slot $n+K_2+\Delta$, where $\Delta$ is a value agreed in a protocol. It can be learned from the foregoing content that a value of $K_2$ cannot meet a requirement for timing advance adjustment.

To implement a sufficient time length between receiving the PDSCH and sending a PUSCH, and enable the terminal device to have a sufficient scheduling delay for sending the PUSCH to perform timing advance adjustment, the Koffset can be introduced. The terminal device may receive, in a downlink slot n, PDSCH data that carries the fallback RAR message, and the terminal device may send the Msg 3 in a slot $n+K_2+\Delta+\text{Koffset}$.

Scenario 4

When the terminal device receives DCI for requesting channel state information (CSI), the terminal device may send a PUSCH carrying the CSI. For example, when the terminal device receives, in a slot n, the DCI for requesting the CSI, the terminal device needs to send, in a slot $n+K$, the PUSCH carrying the CSI. K is determined based on a DCI instruction. However, because a round-trip delay in a non-terrestrial communication scenario is far greater than that in a terrestrial communication scenario, a value of K in the conventional technology cannot meet a requirement of the terminal device for performing timing advance adjustment on the PUSCH.

Therefore, the Koffset can be introduced, so that there is a sufficient time length between receiving the DCI and sending the PUSCH, and the terminal device has a sufficient time length to perform timing advance adjustment on sending the PUSCH. The terminal device may send the PUSCH in a slot $n+K+\text{Koffset}$.

Scenario 5

When receiving, in a slot n, a DCI instruction for triggering an aperiodic sounding reference signal (SRS), the terminal device needs to send an SRS in a slot $$n * \frac{\mu, SRS}{2^{\mu, PDCCH}} + k + Koffset.$$

each time an SRS resource is triggered. k is determined by a higher-layer parameter slot offset (slot offset) that triggers an SRS resource each time, μ, SRS is related to a subcarrier spacing for sending an SRS, and $\mu, PDCCH$ is related to a subcarrier spacing of a PDCCH. For details, refer to the related descriptions of $\mu, PUSCH$ and $\mu, PDCCH$ in the scenario 2. However, because a round-trip delay in a non-terrestrial communication scenario is far greater than that in a terrestrial communication scenario, a value of k in the conventional technology cannot meet a requirement of the terminal device for performing timing advance adjustment on sending the SRS.

Therefore, the Koffset can be introduced, so that there is a sufficient time length between receiving the DCI and sending the SRS, and the terminal device has a sufficient time length to perform timing advance adjustment on sending the SRS. The terminal device may send the SRS in a slot $$n * \frac{\mu, SRS}{2^{\mu, PDCCH}} + k + Koffset.$$

Scenario 6

When the terminal device sends a CSI report in an uplink slot n', the terminal device needs to receive a CSI reference resource from a network device in a slot $n-n_{CSI\_ref}$.

$$n = \left\lfloor n' * \frac{2^{\mu} DL}{2^{\mu} UL} \right\rfloor,$$

and $n_{CSI\_ref}$ is a value that is related to a type of the CSI report and that is agreed in a protocol. $\mu_{UL}$ is related to a subcarrier spacing of uplink data, and $\mu_{DL}$ is related to a subcarrier spacing of downlink data. For details, refer to the related descriptions of $\mu, PUSCH$ and, $\mu, PDCCH$ in the scenario 2. However, because a round-trip delay in a non-terrestrial communication scenario is far greater than that in a terrestrial communication scenario, a value of $n_{CSI\_ref}$ in the conventional technology cannot meet a requirement of the terminal device for performing timing advance adjustment on receiving the CSI reference resource.

Therefore, the Koffset can be introduced, so that there is a sufficient time length between receiving the CSI reference resource and sending the CSI report, and the terminal device has a sufficient time length to perform timing advance adjustment on receiving the CSI reference resource. The terminal device may receive the CSI reference resource in a slot $n-n_{CSI\_ref}+Koffset$.

Scenario 7

A network device indicates, to the terminal device on a PDCCH, an occasion (occasion) for sending a physical random access channel (PRACH). For example, the network device may randomly select a PRACH occasion from consecutive PRACH occasions (PRACH occasions) through media access control (MAC) signaling. The terminal device may determine a next available PRACH occasion based on the PDCCH. To resolve a large round-trip delay in a non-terrestrial communication scenario, the terminal device may determine a next available PDCCH occasion, for example, a random access preamble, after a time length of the Koffset after receiving a last symbol of the PDCCH.

It should be noted that a time interval between a first time domain symbol on which the terminal device sends a random signal and a last time domain symbol on which the terminal device receives the PDCCH needs to be greater than or equal to $N_{T,2}+\Delta_{BWPSwitching}+\Delta_{Delay}+T_{switch}$ ms. If the Koffset is considered, the time interval needs to be greater than or equal to $N_{T,2}+\Delta_{BWPSwitching}+\Delta_{Delay}+T_{switch}+$ Koffset*slot length (ms). $N_{T,2}$ indicates a time length of N2 time domain symbols, and the time length corresponds to a PUSCH processing time capability of the terminal device. It is assumed that subcarrier spacings of the PDCCH and the PRACH are configured as minimum subcarrier spacings. If an activated uplink bandwidth part (BWP) remains unchanged, $\Delta_{BWPSwitching}=0$. In another case, a $\Delta_{BWPSwitching}$ value configured by the network device or agreed in a protocol may be used. If a frequency range of the PRACH is FR1, $\Delta_{Delay}=0.5$ ms. If a frequency range of the PRACH is FR2, $\Delta_{Delay}=0.25$ ms. Generally, it is considered that FR1 indicates a frequency range not greater than 6 GHz, and FR2 indicates a frequency range greater than 6 GHz and less than 52.6 GHz. $T_{switch}$ indicates a conversion time interval, which is configured by the network device or agreed in a protocol.

In addition, it should be noted that an example in which a time unit of the first timing offset Koffset in embodiments of this application is an uplink/downlink slot length is used for description. It should be understood that the Koffset may alternatively be in another time unit, for example, ms. In the foregoing scenarios, when the Koffset is used, time units may be unified. For example, if the time unit of the Koffset is ms, and the uplink slot length is related to an uplink subcarrier spacing $\mu_{DL}$, a length of Koffset ms is equal to a length of Koffset/($2^{\mu_{DL}}$) slots. Similarly, if the Koffset uses ms as a unit, the Koffset in another application scenario may be replaced with Koffset/($2^{\mu_{DL}}$) or Koffset/($2^{\mu_{UL}}$). When the Koffset uses another time unit, the Koffset only needs to be converted into a corresponding slot length unit. Alternatively, another parameter whose slot length is a time unit is converted into a time unit the same as that used by the Koffset. Details are not described below again.

The following uses the scenario 2 as an example for description.

The terminal device receives, in a downlink slot n, PDSCH data carrying an RAR message, and the terminal device needs to send, in a slot $n+K_2+\Delta+Koffset/(2^{\mu_{UL}})$ of an uplink PUSCH, a random access message 3 (message 3) scheduled by using RAR, where $\Delta$ is a value agreed in a protocol. The reason for changing the description is as follows: If the time unit of the Koffset is ms, but the uplink slot length is related to the uplink subcarrier spacing, that is, related to $\mu_{UL}$, the length of Koffset ms is equal to Koffset/($2^{\mu_{UL}}$) slot length. Similarly, if the Koffset uses ms as a unit, the Koffset in another application scenario may be replaced with Koffset/($2^{\mu_{UL}}$) or Koffset/($2^{\mu_{UL}}$). When the Koffset uses another unit, the Koffset only needs to be converted into a corresponding quantity of slot length units. Alternatively, another parameter indicating a slot length may be converted into a time unit that is the same as that used by the Koffset. A principle is similar to that in the foregoing description. Details are not described again.

2. Second Timing Offset

To be distinguished from the first timing offset, the timing-related parameter herein may be referred to as the second timing offset. It should be noted that the second timing offset may be the same as the first timing offset, or may be different from the first timing offset. A difference lies in that the second timing offset and the first timing offset are applied to different scenarios. The second timing offset K_mac can resolve an insufficient timing delay for a downlink configuration sent by a network side to take effect. The following describes a scenario in which the K_mac is introduced.

A network device receives, in an uplink slot n, a HARQ-ACK for a PDSCH carrying MAC signaling. The MAC signaling is a configuration instruction for a downlink signal. Time at which the configuration instruction of the downlink signal takes effect is time at which a first slot after a downlink slot $$n + XN_{slot}^{subframe,\mu}$$

takes effect.

$$N_{slot}^{subframe,\mu}$$

is a quantity of slots included in one subframe (subframe) when a subcarrier spacing is $2^{\mu} * 15$ kHz, and X is a non-negative integer agreed in a protocol or configured by the network device.

The MAC signaling carried in the PDSCH may be for resource configuration of a downlink zero power channel state information—reference signal (ZP CSI-RS), or deactivating (deactivating) a downlink ZP CSI-RS resource configuration that has taken effect. For another example, the MAC signalling carried in the PDSCH may indicate a mapping relationship between a transmission configuration indicator (TCI) state and a code point in a DCI field. For another example, the MAC signalling carried in the PDSCH may be for activating/deactivating a semi-persistent CSI reporting configuration. For another example, the MAC signalling carried in the PDSCH may be for activating/deactivating a CSI-RS/channel state information—interference measurement (CSI-IM) configuration.

As shown in FIG. 7A, it can be learned that when timing compensation performed by the network device on uplink data is greater than or equal to $$XN_{slot}^{subframe,\mu},$$

a HARQ-ACK/NACK that is for the PDSCH carrying the MAC signaling, that is received by the network device, and that is sent by a terminal device is not earlier than time at which the MAC signaling takes effect. The network device cannot learn, in a timely manner, whether the terminal device correctly decodes the MAC signaling. In other words, when the MAC signaling takes effect, the network device has not received the HARQ-ACK/NACK fed back by the terminal device. After sending the HARQ-ACK in the slot n, the terminal device considers that the MAC signaling starts to take effect from a downlink slot $$n + 3N_{slot}^{subframe,\mu} + 1.$$

As a result, the two sides: the terminal device and the network device have different understandings of time at which the MAC signaling takes effect, causing a communication conflict. Herein, a timing compensation value of the network device for the uplink data indicates a compensation value by which the network device delays a receive window when receiving the uplink data.

To resolve the preceding problem, a K_mac parameter can be introduced. It is assumed that the MAC signaling takes effect in a first slot after a downlink slot $$n + XN_{slot}^{subframe,\mu} + K\_mac,$$

that is, a slot $$n + XN_{slot}^{subframe,\mu} + K_{mac} + 1.$$

Figure 7B:
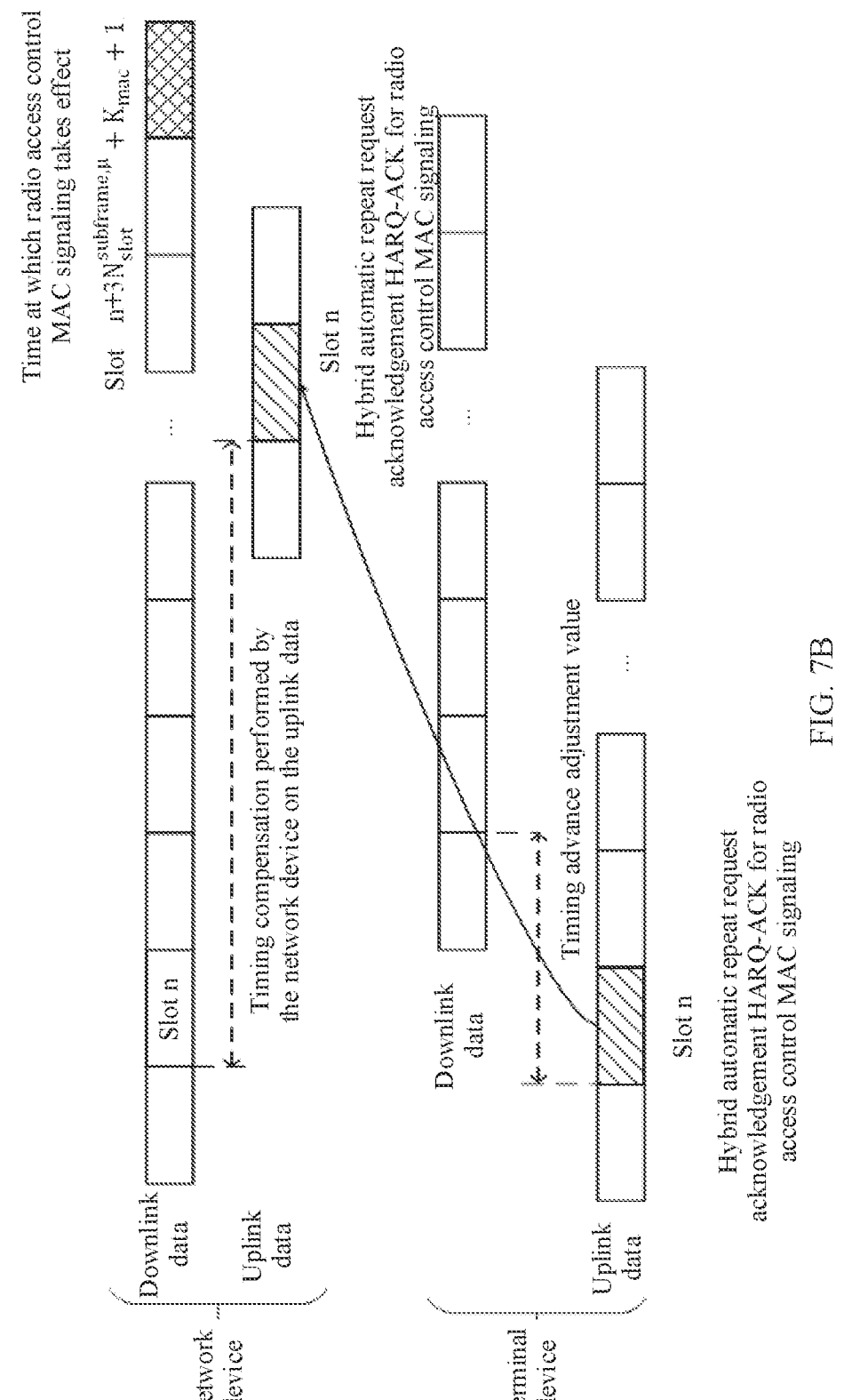
FIG. 7B is a schematic diagram of time at which MAC signaling takes effect when a second timing offset is introduced.

As shown in FIG. 7B, it can be learned that when a K_mac value is used to delay time at which the MAC signaling takes effect, that is, a time length indicated by the K_mac needs not to be less than a time length indicated by a timing compensation value of the network device for the uplink data, this ensures that the MAC signaling takes effect only after the network device receives the corresponding HARQ-ACK, and ensures that the terminal device and the network device have the same understanding of the time at which the MAC signaling takes effect.

3. Common Timing Advance Value TA_common

A terminal device with a positioning function may obtain a round-trip delay of a service link through processing based on a location of the terminal device and a location of a satellite. The location of the satellite may be obtained based on ephemeris information. However, the satellite cannot obtain the round-trip delay of the feeder link. If a network side performs delay compensation on an uplink signal, the terminal device cannot obtain a delay compensation value of the network side either. Therefore, the terminal device with the positioning function cannot obtain complete propagation delay information based on only the location information of the terminal device and location information of the satellite, including a round-trip delay of a feeder link and a propagation delay compensation value of the network side.

Figure 8:
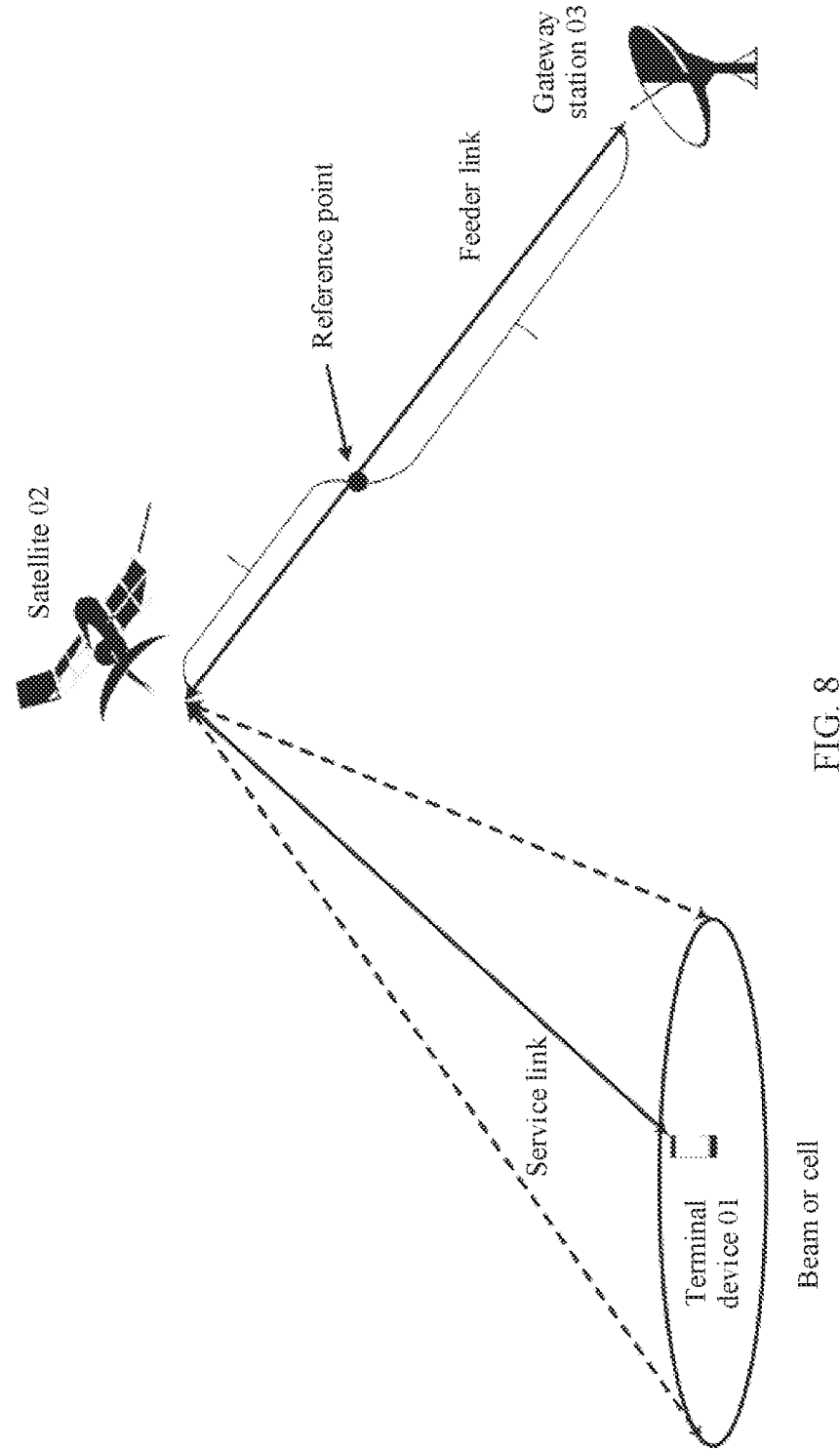
FIG. 8 is a schematic diagram of a common timing advance value corresponding to a case in which a reference point is on a feeder link according to an embodiment of this application.

As shown in FIG. 8, if a compensation value of the propagation delay compensation performed by the network side on the uplink signal is less than the round-trip delay of the feeder link, the common timing advance value (TA_common) may be used to indicate a remaining propagation delay value obtained by subtracting a delay compensated by the network side from the feeder link. For example, if a propagation round-trip delay of the feeder link is a, and the propagation delay compensation value of the network side for the feeder link is b, a TA_common sent by the network side to the terminal device is equal to a−b. In this way, because a reference point is on the feeder link, a value of the TA_common is a positive number.

The terminal device may obtain the round-trip delay of the service link TA_cal through processing based on the location of the terminal device and the location of the satellite. After receiving the TA_common, the terminal device may obtain, based on a sum of the TA_cal and the TA_common, a timing advance value (TA) used when the terminal device sends an uplink signal.

Figure 9:
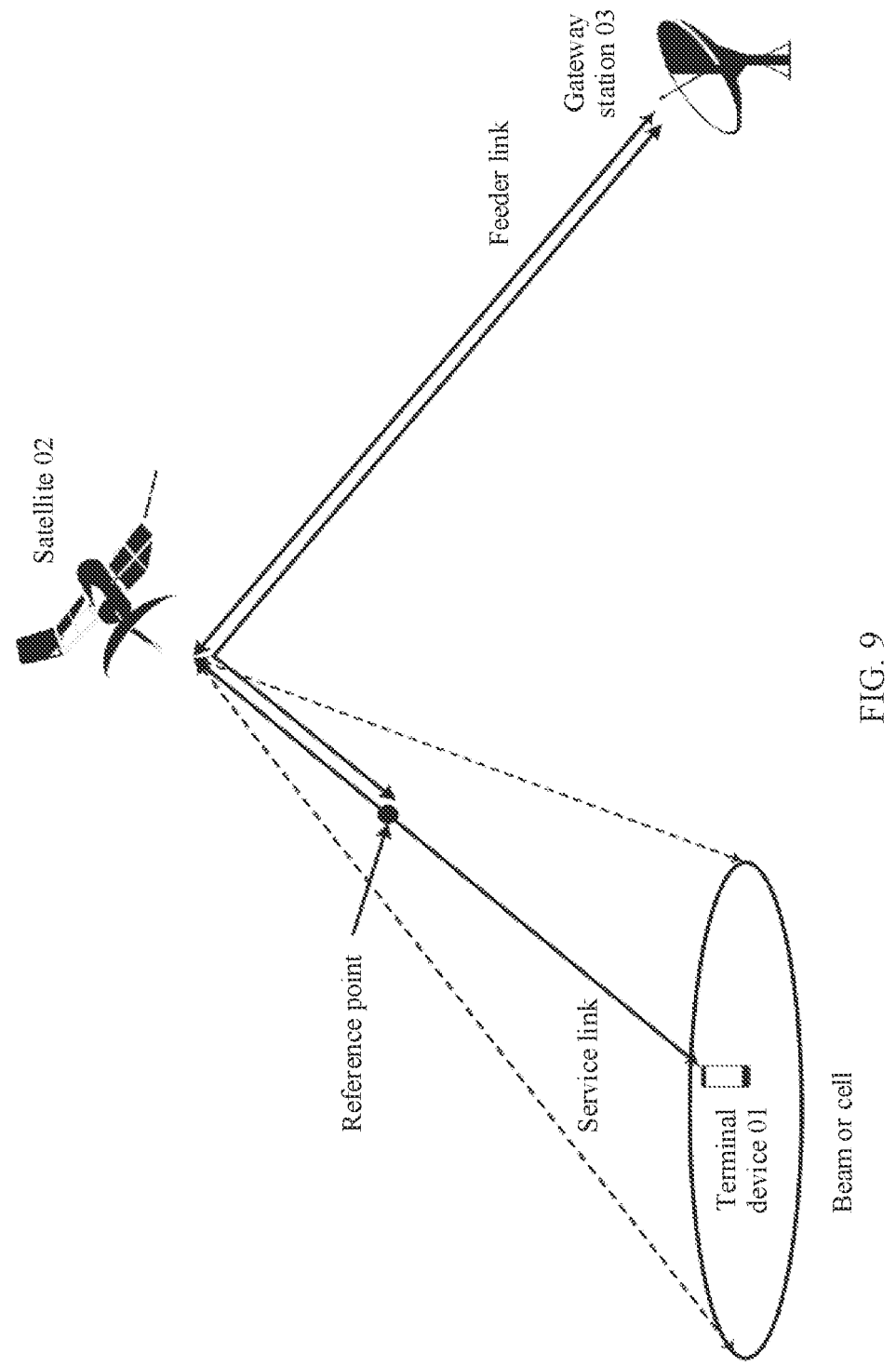
FIG. 9 is a schematic diagram of a common timing advance value corresponding to a case in which a reference point is on a service link according to an embodiment of this application.

As shown in FIG. 9, when a compensation value of the propagation delay compensation performed by the network side on the uplink signal is greater than the round-trip delay of the feeder link, the TA_common may be used to indicate a compensation value performed by the network side on a part of the propagation round-trip delay of the service link. For example, an absolute value of the TA_common is d. In this case, because a reference point is on the service link, the TA_common is a negative number. The TA_common sent by the network side to the terminal device is −d. Then, the terminal device may add the round-trip delay of the service link obtained through processing to the TA_common to obtain a TA value for performing timing advance adjustment on the uplink signal.

4. Delay Start Duration of a RAR Window (RAR_window_delay)

Scenario 1

In the conventional technology, a terminal device sends a message 1 (message 1, Msg 1) in a 4-step random access process. The terminal device starts, after a last symbol of the Msg 1, or after a last symbol of a PRACH occasion (PRACH occasion) on which the terminal device sends a preamble (preamble) sequence transmitted on a PRACH, a window for detecting physical downlink control channel (PDCCH) information from a first symbol of an earliest configured control-resource set (CORESET). The terminal device may detect the PDCCH information in the window, and the detection window may be referred to as a random access response (RAR) window/receive window/detection window. The terminal device may receive a corresponding message 2 (Msg 2) RAR message based on a PDCCH. Herein, a length of the RAR window is defined as a RAR window. A network device sends the RAR window to the terminal device. For example, the length of the RAR receive window is configured for the terminal device in a broadcast manner or by using a response receive window (ra-Response Window) or a response receive window—v1610 (ra-Response Window—v1610) parameter. If the terminal device fails to detect the PDCCH information in the RAR window, random access fails. Currently, a maximum configuration of the RAR window may be 160 ms. In a GEO scenario, a round-trip delay may reach 541.46 ms.

Figure 10A:
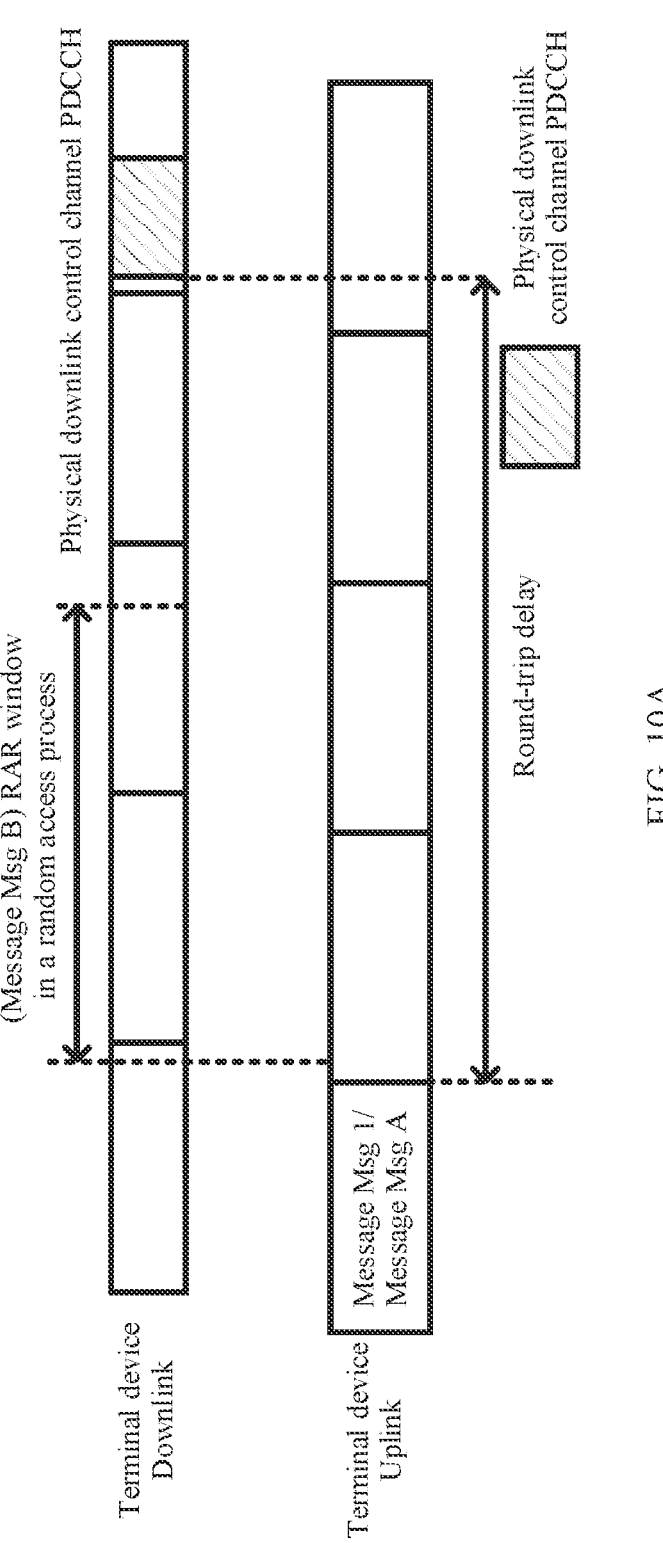
FIG. 10A is a schematic diagram of starting a RAR window by a terminal device when delay start duration of the RAR window is not introduced.

As shown in FIG. 10A, because a length of the RAR window is less than the round-trip delay, the terminal device cannot receive, in the RAR window, PDCCH information sent by the network device, and the random access fails. In the figure, a PDCCH is used to schematically indicate the PDCCH information in the CORESET, that is, resource information indicated by the PDCCH may be a resource occupied by the CORESET. This may be understood in the following figures. Details are not described again.

The terminal device sends a Msg A in a 2-step random access process. After a last symbol (symbol) of a PUSCH occasion (PUSCH occasion) or a PRACH occasion (PRACH occasion) corresponding to PRACH transmission, the terminal device starts to detect PDCCH information from a first symbol of an earliest configured CORESET, or the terminal device receives a corresponding Msg B RAR message based on a PDCCH. The terminal device detects the PDCCH information or receives the corresponding Msg B RAR message in a RAR window. A network device may send a length of the RAR window to the terminal device, and the length is defined as a RAR_window. Currently, a maximum configuration value of the RAR window is 320 ms. If the terminal device fails to detect the PDCCH information in the RAR window, random access fails. Similar to the foregoing RAR window, when a round-trip delay of signal transmission is greater than a time length of Msg B_RAR_window, the terminal device cannot receive, within the window, the PDCCH information that is sent by the network device and that indicates the Msg B RAR message, and the random access fails.

Figure 10B:
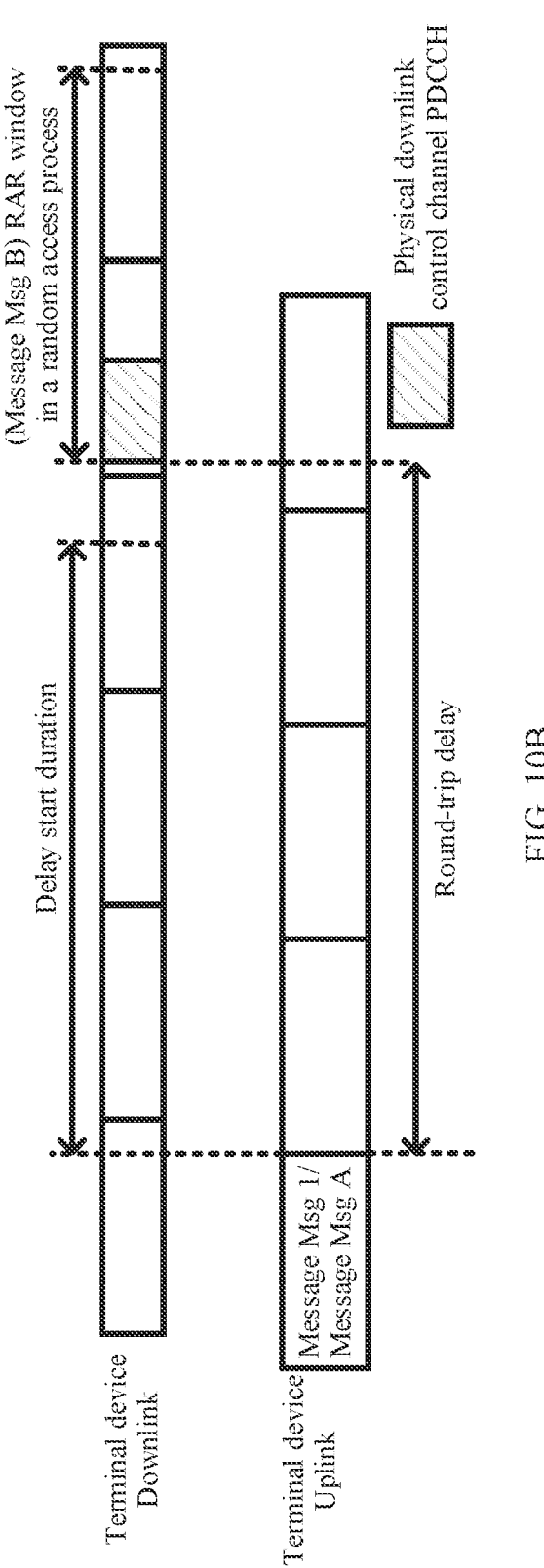
FIG. 10B is a schematic diagram of starting a RAR window by a terminal device when delay start duration of the RAR window is introduced.

To avoid that the terminal device fails to receive the PDCCH information or receive the Msg B RAR message, delay start duration or a start offset can be introduced, which may be defined as the RAR_window_delay, and indicates a delay degree of starting the RAR window. As shown in FIG. 10B, a terminal device sends a Msg 1 in a 4-step random access process. After a last symbol of the Msg 1 or a last symbol of a PRACH occasion used by the terminal device, after the RAR_window_delay duration, the RAR window is started to detect a PDCCH or receive a Msg 2 RAR message from a first symbol of an earliest configured CORESET. A terminal device sends a Msg A in a 2-step random access process. After a last symbol (symbol) corresponding to a PUSCH occasion or a PRACH occasion, after the RAR_window_delay duration, the terminal device starts to start the RAR window to detect the PDCCH information from a first symbol of an earliest CORESET, that is, starts a Msg B-RAR receive window/detection window or a Msg B response receive window (Msg B response window).

It should be noted that the RAR_window_delay used in the 4-step random access process may be the same as or different from the RAR_window_delay used in the 2-step random access process. For ease of description, ease of use, and signaling saving herein, both are represented by using the RAR_window_delay or a RAR_offset.

The RAR_window_delay can ensure that the terminal device can successfully receive the PDCCH information in the RAR window. In addition, the terminal device can avoid starting a detection procedure before the PDCCH arrives, thereby saving power.

Scenario 2

In a 4-step random access process or fallback of a 2-step random access to the 4-step random access process, once a terminal device sends a message 3 (Msg 3), the terminal device starts a random access contention resolution timer (ra-Contention Resolution Timer) on a first symbol (symbol) after sending the Msg 3. Alternatively, the terminal device starts a random access contention resolution timer (ra-Contention Resolution Timer) on a first symbol (symbol) after the Msg 3 is retransmitted. In a valid timing period of the random access contention resolution timer, the terminal device detects PDCCH information sent by a network device. The PDCCH may carry a cell radio network temporary identifier (C-RNTI) or a half-static C-RNTI (TEMPORARY_C-RNTI), and may include a new uplink transmission grant. If the terminal device successfully detects the PDCCH sent by the network device, the terminal device may stop the random access contention resolution timer, and may further consider that the random access process is successfully completed. If the terminal device fails to detect the PDCCH sent by the network device before timing of the random access contention resolution timer expires or until timing of the random access contention resolution timer expires, it is considered that the random access process fails.

Currently, duration of the random access contention resolution timer is sent by the network device to the terminal device. A maximum configuration value of the random access contention resolution timer is 64 ms. After sending the Msg 3, the terminal device starts the random access contention resolution timer and starts to receive the PDCCH. In a non-terrestrial communication scenario such as a GEO scenario, the round-trip delay may reach 541.46 ms. After receiving the Msg 3, a round-trip delay for the network device to send the PDCCH and a message 4 (Msg 4) to the terminal device is large, and the duration of the random access contention resolution timer is far less than the round-trip delay. As a result, the terminal device cannot receive the PDCCH information within the valid timing period of the random access contention resolution timer, causing a random access failure. Therefore, a delay in starting the random access contention resolution timer may be added to resolve the foregoing problem. To be specific, the terminal device waits for a period of time and then starts the random access contention resolution timer to detect the PDCCH information, so that the terminal device can receive the corresponding PDCCH within the valid timing period of the random access contention resolution timer, and can achieve power saving. Duration for starting the random access contention resolution timer in a delayed manner may be defined as delay start duration of the random access contention resolution timer.

It should be noted that the RAR_window_delay used in the 4-step random access process may be the same as or different from the RAR_window_delay used in the 2-step random access process and the delay start duration of the random access contention resolution timer. For ease of description, ease of use, and signaling saving, all are represented by using the RAR_window_delay.

In conclusion, to resolve a large round-trip delay in non-terrestrial communication, the network device can send the foregoing timing-related parameters 1 to 4 to the terminal device. However, sending these timing-related parameters causes additional signaling overheads.

Aiming at the foregoing problem, embodiments of this application provide a parameter transmission method. The method provided in embodiments of this application may be applied to any communication system. The communication system may be a 3rd generation partnership project (3GPP) communication system, for example, a long term evolution (LTE) system, may be a 5th generation (5G) mobile communication system, a new radio (NR) system, or a new radio vehicle-to-everything (NR V2X) system, may be applied to a system of LTE and 5G hybrid networking, a device-to-device (device, D2D) communication system, a machine-to-machine (M2M) communication system, an internet of things (IoT), and another next-generation communication system, or may also be a non-3GPP communication system. This is not limited.

The method provided in embodiments of this application may be applied to various communication scenarios, for example, may be applied to one or more of the following communication scenarios: enhanced mobile broadband (eMBB), ultra-reliable low-latency communication (URLLC), machine type communication (MTC), massive machine-type communications (mMTC), D2D, V2X, and IoT.

Figure 11:
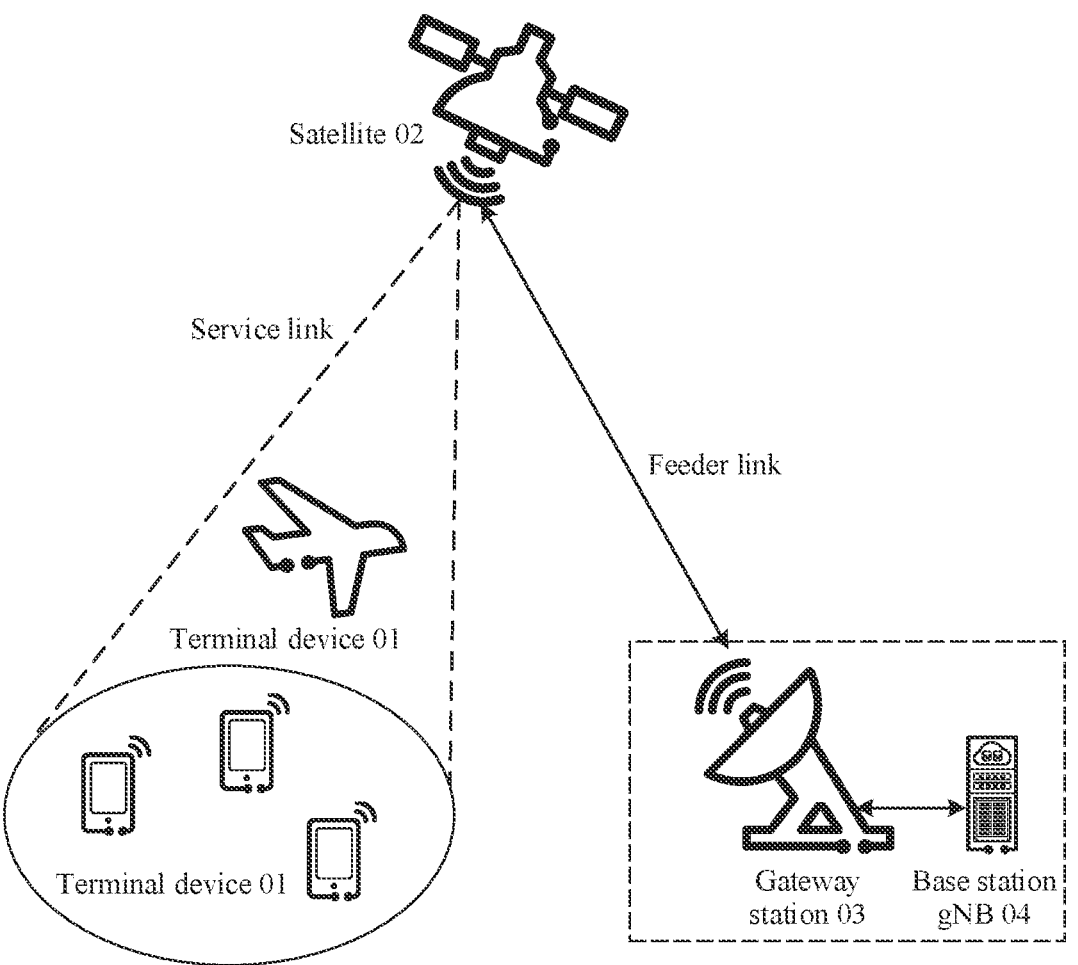
FIG. 11 is a schematic diagram of a communication system applicable to a parameter transmission method according to an embodiment of this application.

The method provided in embodiments of this application may be further applied to a long distance communication scenario, for example, applied to a satellite communication scenario in which a distance between a terminal device and a network device constantly changes, or another long distance communication scenario. This is not limited. The following uses FIG. 11 as an example to describe the parameter transmission method provided in embodiments of this application. FIG. 11 is a schematic diagram of a communication system according to an embodiment of this application. As shown in FIG. 11, an NTN communication system is used as an example. The communication system may include a terminal device 01, a satellite 02 (or referred to as a satellite base station), a gateway station 03 (or referred to as a terrestrial station or a gateway station) (gateway), and a ground base station (gNB) 04.

Figure 12:
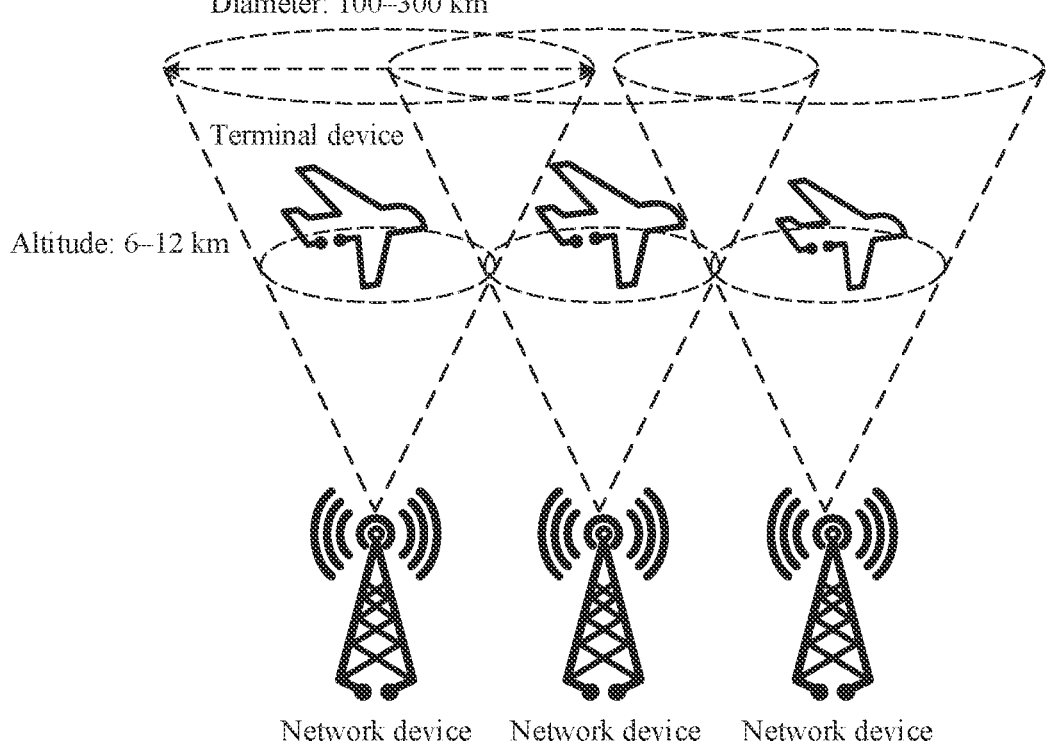
FIG. 12 is another schematic diagram of a communication system applicable to a parameter transmission method according to an embodiment of this application.

As shown in FIG. 12, the method provided in embodiments of this application may be further applied to an air-to-ground (ATG) communication scenario shown in FIG. 12. An ATG communication system may include at least one network device and at least one terminal device.

A terminal device in this application includes a device that provides voice and/or data connectivity for a user, and specifically, includes a device that provides voice for the user, includes a device that provides data connectivity for the user, or includes a device that provides voice and data connectivity for the user. The terminal may include user equipment (UE), a wireless terminal, a mobile terminal, a device-to-device (D2D) terminal, a vehicle-to-everything (V2X) terminal, a machine-to-machine/machine type communication (M2M/MTC) terminal, an internet of things (IoT) terminal, a high-altitude aircraft, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like.

As an example instead of a limitation, in this embodiment of this application, the terminal may alternatively be a wearable device. The wearable device may also be referred to as a wearable intelligent device, an intelligent wearable device, or the like, and is a general term for wearable devices developed by intelligently designing daily wearables by using a wearable technology, such as glasses, gloves, watches, clothes, and shoes. If the various terminals described above are located on a vehicle (for example, placed in the vehicle or installed in the vehicle), the terminals may be considered as vehicle-mounted terminals. For example, the vehicle-mounted terminals are also referred to as on-board units (OBUs).

The satellite in this embodiment of this application may provide a wireless access service for the terminal device, schedule a radio resource for the accessed terminal device, and provide a reliable wireless transmission protocol, a data encryption protocol, and the like. The satellite may be a base station for wireless communication of an artificial earth satellite, a high-altitude aircraft, or the like, for example, an evolved NodeB (eNB) and a 5G base station (gNB). Optionally, the satellite may also be used as a relay of these base stations to transparently transmit radio signals of these base stations to the terminal device. In this case, the gateway station may be considered as a base station for wireless communication. Therefore, in this embodiment of this application, in some embodiments, for example, in a satellite regeneration scenario, the network device may be the satellite base station shown in FIG. 11. In other embodiments, for example, in a satellite transparent transmission scenario, the network device may be the gateway station shown in FIG. 11.

In a possible implementation, the satellite may be a geostationary earth orbit (GEO) satellite, may be a medium earth orbit (MEO) satellite and a low earth orbit (LEO) satellite of a non-geostationary earth orbit (NGEO), or may be a high altitude platform station (HAPS) satellite, or the like.

The gateway station in this embodiment of this application may be configured to connect a satellite to a core network. For example, when the satellite is used as a base station for wireless communication, the gateway station may transparently transmit signaling between the satellite and the core network. Alternatively, the gateway station may be used as a base station for wireless communication, and the satellite may transparently transmit signaling between a terminal device and the gateway station. For example, during communication, the gateway station may send signaling from the core network to the satellite through a feeder link (feeder link), and the satellite sends the signaling to a terminal device through a service link (service link) between the satellite and the terminal device. Correspondingly, the terminal device may also send signaling to the satellite through the service link, and the satellite sends the signaling to the core network by using the gateway station. Optionally, a base station and the gateway station may be separately deployed. In this case, a delay of the feeder link includes two parts: a delay from the satellite to the gateway station and a delay from the gateway station to the gNB. In the transparent transmission mode discussed later, a case in which gateway station and the gNB are located together or near each other is used as an example. For a case in which the gateway station is far away from the gNB, the delay of the feeder link is a sum of the delays from the satellite to the gateway station and from the gateway station to the gNB.

In this embodiment of this application, the network device may include but is not limited to the satellite base station or the gateway station shown above. For example, the base station may alternatively be a base station in a future communication system such as a sixth generation communication system. Optionally, the network device may alternatively be an access node, a wireless relay node, a wireless backhaul node, or the like in a wireless local area network (Wi-Fi) system. Optionally, the network device may alternatively be a radio controller in a cloud radio access network (CRAN) scenario. Optionally, the network device may alternatively be a wearable device, a vehicle-mounted device, or the like. Optionally, the network device may alternatively be a small cell, a transmission node (TRP) (or may also be referred to as a transmission reception point), or the like. It may be understood that the network device may alternatively be a base station in a future evolved PLMN, or the like.

It should be understood that FIG. 11 shows only one satellite and one gateway station. A person skilled in the art may use a communication system architecture of a plurality of satellites and/or a plurality of gateway stations based on a requirement. Each satellite may provide a service for one or more terminal devices, each satellite may correspond to one or more gateway stations, each gateway station may correspond to one or more satellites, and the like. This is not specifically limited in this embodiment of this application.

Figure 13:
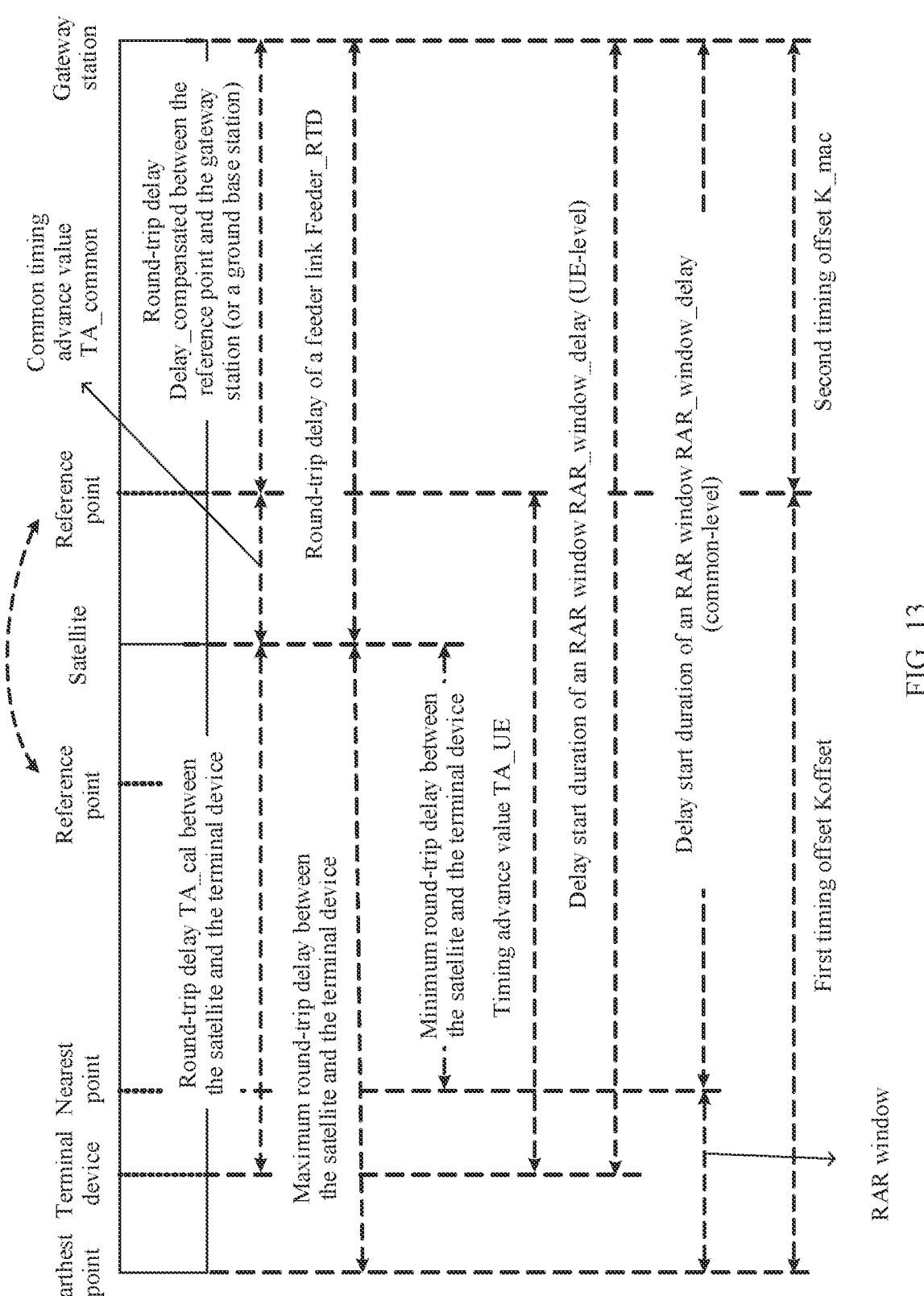
FIG. 13 is a schematic diagram of a time parameter according to an embodiment of this application.

For ease of understanding the solutions provided in embodiments of this application, FIG. 13 is used as an example to describe time parameters in embodiments of this application. A reference point shown in FIG. 13 may be the reference point shown in FIG. 8 and FIG. 9. It should be understood that a location of the reference point in FIG. 13 is an example, and the location of the reference point is not limited in this application. The location of the reference point may be determined by a network device. The reference point may be between a terminal device and a satellite, namely, on a service link, or may be between the reference point and a gateway station, namely, on a feeder link. The reference point may also be on the satellite or the gateway station. A round-trip delay between the reference point and the satellite is compensated by the terminal device, and the terminal device may compensate for the round-trip delay between the reference point and the satellite by performing timing advance compensation on a sent signal. A round-trip delay between the reference point and the gateway station is compensated by the network device. The network device may compensate for the round-trip delay between the reference point and the gateway station by performing delay compensation on a signal receiving window.

(1) TA_cal may indicate a round-trip delay between a satellite and a terminal device, or may indicate a round-trip delay of a service link. The terminal device may obtain the TA_cal by processing location information of the terminal device and location information of the satellite.

(2) TA_common may indicate a round-trip delay between a satellite and a reference point. It should be noted that the TA_common is a negative value when the reference point is on a service link, and the TA_common is a positive value when the reference point is on a feeder link.

(3) Delay_compensated may indicate a delay compensation value performed by a network device on a signal received from a terminal device. The delay compensation value may be equal to a round-trip delay between a reference point and a gateway station (or ground base station). The delay compensation value means that when receiving the signal from the terminal device, the network device delays a receive window. For example, if the delay compensation value is 200 ms, when receiving the signal from the terminal device, the network device delays time for starting the receive window by 200 ms.

(4) Service_RTD_max may indicate, between a satellite and a coverage area of the satellite, a maximum round-trip delay between the satellite and terminal devices. Alternatively, Service_RTD_max may indicate a round-trip delay between a satellite and a farthest point in a coverage area of the satellite, namely, a maximum round-trip delay of a service link between the satellite and the coverage area of the satellite.

(5) Service_RTD_min may indicate, between a satellite and a coverage area of the satellite, a minimum round-trip delay between the satellite and terminal devices. Alternatively, Service_RTD_min may indicate a round-trip delay between a satellite and a nearest point in a coverage area of the satellite, namely, a minimum round-trip delay of a service link between the satellite and the coverage area of the satellite.

(6) Feeder_RTD may indicate a round-trip delay between a satellite and a gateway station, or may indicate a round-trip delay of a feeder link.

(7) TA_UE may indicate a timing advance value obtained by a terminal device based on a common timing advance value and a TA_cal. TA_UE=TA_cal+TA_common. The terminal device may further obtain, based on the TA_UE, a timing advance value TA used to send uplink data. For example, a correction value and/or an offset may be added to the TA_UE to obtain a usable timing advance value TA.

(8) RAR_window_delay (UE-level/UE-specific) may be a UE-level RAR_window_delay, and may indicate delay start duration of a RAR window and/or a random access contention resolution timer. RAR_window_delays used by terminal devices in a same cell or beam may be different. It should be understood that a network device may know or may not know an RAR_window_delay value of each terminal device, that is, the RAR_window_delay value may be transparent to the network device.

(9) RAR_window_delay (common/common-level) may be a common-level RAR_window_delay, and may indicate delay start duration of a RAR window and/or a random access contention resolution timer. Terminal devices in a same cell or beam use a same RAR_window_delay (common). Generally, if the terminal device uses the RAR_window_delay (common), a network device needs to send the RAR_window_delay (common) to the terminal device. The UE-level RAR_window_delay and the RAR_window_delay (common) have the same functions and application scenarios. Differences lie in an application scope of the terminal device and whether the RAR_window_delay and the RAR_window_delay (common) can be transparent to the network device.

(10) RAR window may indicate a length of a receive window for receiving a PDCCH indicating a Msg 2/Msg B/fallback RAR message (fallback RAR) after a terminal device sends a Msg 1/Msg A. For a description of the RAR window, refer to the foregoing timing-related parameter 4. Details are not described herein again.

(11) Koffset may be used to determine a delay degree of sending information by a terminal device or may be used to determine an advance degree of receiving information by a terminal device. For a description of the Koffset, refer to the foregoing timing-related parameter 1. Details are not described herein again.

(12) K_mac may indicate a delay degree of taking effect of configuration information (for example, MAC signaling) received by a terminal device. For a description of the K_mac, refer to the timing-related parameter 2. Details are not described herein again.

In conclusion, it can be learned from FIG. 13 relationships between some time parameters and the round-trip delay, such as Koffset=TA_common+Service_RTD_max=RAR_window_delay (common)–RAR window, TA_UE=TA_common+TA_cal, and RAR_window_delay=TA_cal+TA_common+Delay_compensated.

Therefore, it can be learned that there is an overlapping/repeated indication between the time parameters. Therefore, the network device may indicate, to the terminal device, time parameters that have an overlapping indication relationship, so that the terminal device obtains one or more of the foregoing timing-related parameters 1 to 4 through processing. The following describes the technical solutions provided in embodiments of this application with reference to the accompanying drawings.

Figure 14:
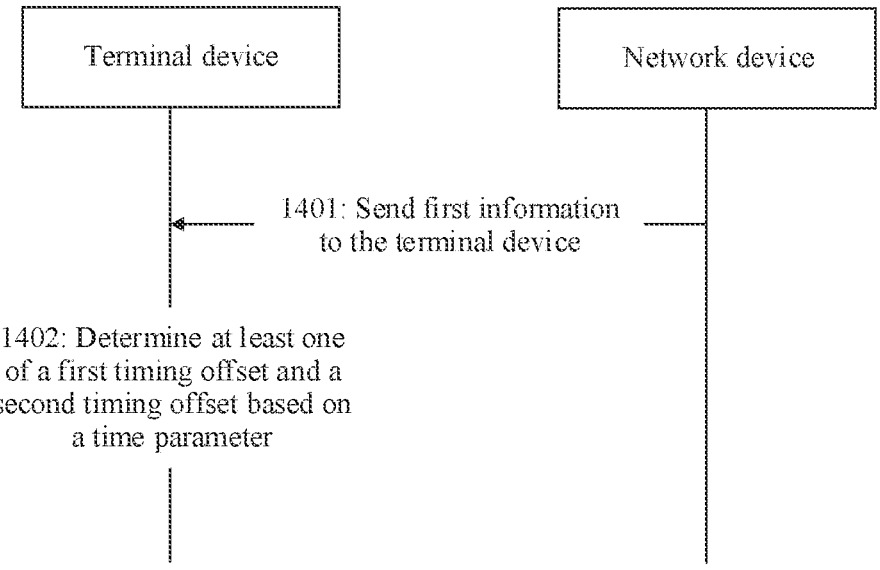
FIG. 14 is an example flowchart of a parameter transmission method according to an embodiment of this application.

FIG. 14 is an example flowchart of the parameter transmission method according to an embodiment of this application. The method may include the following steps.

Step 1401: A network device sends first information to a terminal device.

The first information herein includes a time parameter. The time parameter may be used to determine a timing offset. It should be noted that the timing offset may include at least one of the first timing offset shown in the timing-related parameter 1 and the second timing offset shown in the timing-related parameter 2. Optionally, the time parameter may be further used to determine delay start duration of a RAR window. The first information may include one or more of the time parameters in (1) to (12).

In a possible implementation, the network device may send the first information to the terminal device in a broadcast or multicast manner. The network device may send the first information by using at least one piece of broadcast information, such as a system information block (SIB) 1, other system information (OSI), and a master information block (MIB). Based on the foregoing solution, sending the foregoing signaling to the terminal device in the broadcast or multicast manner can avoid scheduling different resources for different terminal devices to send the foregoing signaling, reduce signaling overheads of resource scheduling, and reduce system scheduling complexity.

In another possible implementation, the network device may send the first information to the terminal device in a radio resource control (RRC) connection phase.

In an example, the network device may send the first information by using an RRC message, for example, an RRC setup (RRC setup) message, an RRC reconfiguration (RRC reconfiguration) message, and an RRC resume (RRC resume) message.

In another example, the network device may use at least one of downlink control information (DCI), group DCI, a media access control (MAC) control element (CE), and a timing advance command (TAC) to carry the RRC message or the time parameter. Alternatively, the network device may indicate the RRC message or the time parameter to the terminal device in a table form based on at least one piece of the foregoing information.

Optionally, the network device may send the time parameter to the terminal device in a unicast or multicast manner along with data transmission or on a separately allocated PDSCH. An advantage of separately sending the foregoing signaling to terminal devices is that a parameter value of each terminal device can be flexibly controlled, and different parameter values are configured for the terminal devices based on different locations or areas in which the terminal devices are located, to optimize a system parameter and optimize communication performance/system communication performance of the terminal devices. For example, different Koffset values may be configured for the terminal devices based on different locations of the terminal devices, to optimize a scheduling delay of each terminal device and improve system communication efficiency.

Based on the foregoing solution, the network device may separately send the time parameter to the terminal devices, and may configure a different time parameter for the terminal device based on a location or an area of the terminal device, to optimize the system parameter, and optimize the communication performance and system communication performance of the terminal device.

Optionally, after receiving the first information, the terminal device may further determine the timing offset based on the time parameter. Specifically, the terminal device may perform the following step 1402.

Step 1402: The terminal device determines at least one of the first timing offset and the second timing offset based on the time parameter.

The terminal device may determine the first timing offset and/or the second timing offset based on the time parameter, and use the determined first timing offset and/or the determined second timing offset when sending or receiving information. Alternatively, the terminal device may determine the first timing offset and/or the second timing offset based on the time parameter when sending or receiving information, and send or receive information based on the first timing offset and/or the second timing offset. Optionally, the terminal device may alternatively determine the delay start duration of the RAR window based on the time parameter.

Optionally, the network device may alternatively determine the timing offset and/or the delay start duration of the RAR window based on the time parameter. Specifically, the network device may determine at least one of the first timing offset, the second timing offset, and the delay start duration of the RAR window based on the time parameter. Calculation manners used by the terminal device and the network device need to be the same. A main reason is that the terminal device and the network device need to determine at least one of a same first timing offset, a same second timing offset, and same delay start duration of the RAR window, to transmit communication data.

The following separately describes cases in which time parameters included in the first information are different and cases in which the network device and/or the terminal device determine/determines the first timing offset, the second timing offset, and the delay start duration of the RAR window.

Case 1: The time parameter includes a difference ΔKoffset of the first timing offset and TA_common.

The terminal device may determine Koffset based on ΔKoffset and TA_common. Koffset satisfies the following calculation relationship/formula (1):

$$Koffset = \lceil TA\_common/slot\_duration \rceil + \Delta Koffset \qquad \text{Formula (1)}$$

slot_duration indicates a time unit/duration unit or a quantization unit, $\lceil\ \rceil$ indicates a rounding up operation, and ΔKoffset indicates an integer. In the foregoing formula (1), time units of TA_common, Koffset, and ΔKoffset may be the same, or may be different. If the time units are different, time units of the time parameters may be converted or quantized into the same time unit.

It should be understood that slot_duration may be specified in a communication protocol, or may be indicated by the network device. slot_duration may be a slot length, for example, a slot length of uplink data or a slot length of downlink data. Alternatively, slot_duration may be a duration unit determined based on an actual system requirement, for example, any one of 0.5 ms, 1 ms, a length of one symbol, a length of one subframe, a length of one frame, Ts, 16*Ts, 16*Ts/29, or Tc. This is not specifically limited in this application. The symbol $\lceil\ \rceil$ indicates rounding up. During specific implementation, Koffset/K_mac/RAR_window_delay may be further determined in a manner of rounding down $\lfloor\ \rfloor$. For example, the formula (1) may be rewritten as Koffset=$\lceil$TA_common/slot_duration$\rceil$+ΔKoffset. The foregoing descriptions of rounding up and rounding down are also applicable to the following. For ease of description, rounding up is used for description in this embodiment of this application.

In the foregoing case 1, the time parameter sent by the network device to the terminal device includes ΔKoffset, and the terminal device determines a to-be-used Koffset value based on the ΔKoffset value. It can be learned from FIG. 13 that Koffset is represented in a plurality of manners, for example:

$$Koffset = \lceil TA\_common/slot\_duration \rceil + \lceil Service\_RTD\_max/slot\_duration \rceil.$$

Therefore, in an example, ΔKoffset=$\lceil$Service_RTD_max/slot_duration$\rceil$ may be used.

Then, Koffset=$\lceil$TA_common/slot_duration$\rceil$+ΔKoffset; or $$Koffset = \lceil (RAR\_window + RAR\_window\_delay)/slot\_duration \rceil + \lceil Delay\_compensated/slot\_duration \rceil.$$

In another example, ΔKoffset=$\lceil$Delay_compensated/slot_duration$\rceil$ may be used.

Then, Koffset=$\lceil$(RAR_window+RAR_window_delay)/slot_duration$\rceil$+ΔKoffset; or Koffset=$\lceil$(RCR_timer+RCR_timer_delay)/slot_duration$\rceil$+$\lceil$Delay_compensated/slot_duration$\rceil$. If Delay_compensated is a negative value, the preceding calculation relationship is used. If Delay_compensated is a positive value, a negative sign is used, that is, Koffset=$\lceil$(RAR_window+RAR_window_delay)/slot_duration$\rceil$–$\lceil$Delay_compensated/slot_duration$\rceil$ or Koffset=$\lceil$(RCR_timer+RCR_timer_delay)/slot_duration$\rceil$–$\lceil$Delay_compensated/slot_duration$\rceil$.

In still another example, ΔKoffset=$\lceil$Delay_compensated/slot_duration$\rceil$ may be used.

Then, Koffset=$\lceil$(RCR_timer+RCR_timer_delay)/slot_duration$\rceil$+ΔKoffset.

RCR_timer indicates a time length of a random access—contention resolution timer (ra—contention resolution timer). RCR_timer delay indicates delay start duration of the random access—contention resolution timer. Optionally, RCR_timer_delay may be equal to RAR_window_delay. If Delay_compensated is a negative value, the preceding calculation relationship is used. If Delay_compensated is a positive value, a negative sign is used, that is, Koffset=$\lceil$(RAR_window+RAR_window_delay)/slot_duration$\rceil$–ΔKoffset.

When a reference point is on a service link, the method: ΔKoffset=$\lceil$Service_RTD_max/slot_duration$\rceil$ may be used. When the reference point is on a feeder link, ΔKoffset=$\lceil$Delay_compensated/slot_duration$\rceil$ may be used. Therefore, the network device may indicate, to the terminal device by using signaling (for example, signaling of a 1-bit length), a case to which ΔKoffset belongs when Koffset is determined, and the network device sends ΔKoffset to the terminal device.

For example, when a value of the signaling is 1, ΔKoffset=$\lceil$Service_RTD_max/slot_duration$\rceil$, and the terminal device determines Koffset according to Koffset=$\lceil$TA_common/slot_duration$\rceil$+ΔKoffset.

When the value of the signaling is 0, ΔKoffset=$\lceil$Delay_compensated/slot_duration$\rceil$ or ΔKoffset=|Delay_compensated/slot_duration|.

The terminal device determines Koffset by using Koffset=$\lceil$(RCR_timer+RCR_timer_delay)/slot_duration$\rceil$+ΔKoffset or Koffset=$\lceil$(RCR_timer+RCR_timer_delay)/slot_duration$\rceil$–ΔKoffset.

Case 2: The time parameter includes Service_RTD_min, TA_common, and RAR_window.

The terminal device may determine Koffset based on Service_RTD_min, TA_common, and RAR window. Koffset satisfies the following formula (2):

$$Koffset = \lceil (Service\_RTD\_min + RAR\_window + TA\_common)/slot\_duration \rceil \qquad \text{Formula (2)}$$

slot_duration indicates a time unit, and $\lceil\ \rceil$ indicates a rounding up operation. For related descriptions, refer to the foregoing case 1. In the foregoing formula (2), time units of Service_RTD_min, TA_common and RAR window may be the same or different. If the time units are different, time units of the time parameters may be converted or quantized into the same time unit.

Case 3: The time parameter includes Service_RTD_max and TA_common.

The terminal device may determine Koffset based on Service_RTD_max and TA_common. Koffset satisfies the following formula (3):

$$Koffset = \lceil (Service\_RTD\_max + TA\_common)/slot\_duration \rceil \qquad \text{Formula (3)}$$

slot_duration indicates a time unit, and $\lceil\ \rceil$ indicates a rounding up operation. For related descriptions, refer to the foregoing case 1.

In the foregoing formula (3), time units of Service_RTD_max and TA_common may be the same or different. If the time units are different, time units of the time parameters may be converted or quantized into the same time unit.

Case 4: The time parameter includes RAR window, RAR_window_delay, and Delay_compensated.

The terminal device may determine Koffset based on RAR window, RAR_window_delay, and Delay_compensated. Koffset satisfies the following formula (4):

$$K\text{offset}=\lceil(RAR\_\text{window}+RAR\_\text{window\_delay}-\text{Delay\_compensated})/\text{slot\_duration}\rceil \quad \text{Formula (4)}$$

slot_duration indicates a time unit, and ⌈ ⌉ indicates a rounding up operation. For related descriptions, refer to the foregoing case 1. In the foregoing formula (4), time units of RAR window, RAR_window_delay and Delay_compensated may be the same or different. If the time units are different, time units of the time parameters may be converted or quantized into the same time unit.

Case 5: The time parameter includes RAR window and RAR_window_delay.

The terminal device may determine Koffset based on RAR window and RAR_window_delay. Koffset may satisfy the following formula (5):

$$K\text{offset}=\lceil(RAR\_\text{window}+RAR\_\text{window\_delay})/\text{slot\_duration}\rceil \quad \text{Formula (5)}$$

slot_duration indicates a time unit, and ⌈ ⌉ indicates a rounding up operation. For related descriptions, refer to the foregoing case 1.

In the foregoing formula (5), time units of RAR_window and RAR_window_delay may be the same or different. If the time units are different, time units of the time parameters may be converted or quantized into the same time unit.

Case 6: The time parameter includes RAR window, RAR_window_delay, and K_mac.

The terminal device may determine Koffset based on RAR window, RAR_window_delay, and K_mac. Koffset may satisfy the following formula (6):

$$K\text{offset}=\lceil(RAR\_\text{window}+RAR\_\text{window\_delay})/\text{slot\_duration}\rceil-K\_\text{mac} \quad \text{Formula (6)}$$

slot_duration indicates a time unit, and ⌈ ⌉ indicates a rounding up operation. For related descriptions, refer to the foregoing case 1. K_mac indicates the second timing offset. In the foregoing formula (6), time units of RAR window, RAR_window_delay and K_mac may be the same or different. If the time units are different, time units of the time parameters may be converted or quantized into the same time unit.

The network device may indicate, to the terminal device by using the foregoing cases 1 to 6, the time parameter for determining Koffset. Optionally, when impact of positioning errors, such as a positioning error of the terminal device, a positioning error of a satellite, and a positioning error of a gateway station, a processing delay, a quantization error, and/or the like is considered, to avoid an insufficient scheduling delay for uplink data due to an excessively small value of Koffset determined by the terminal device, an adjustment parameter Z of the first timing offset Koffset may be separately added to the foregoing formulae (1) to (6). Z may be a real number, and may be indicated by the network device or may be specified in a communication protocol. For example, sent information carrying Z may be the same as the information carrying the first information shown in the step 1401, and Z and the time parameter may be carried in a same piece of information or different pieces of information. Optionally, when determining Koffset, the terminal device may multiply Z by a time unit and substitute a multiplication result into the foregoing calculation relationship. The time unit may be specified in a communication protocol or indicated by the network device. For example, a time unit of Z may be 1 ms, 10 ms, a length of one slot, a length of one subframe, a length of one frame, Ts, 16*Ts, 16*Ts/29, or Tc.

The foregoing case 1 is used as an example to describe a case in which the adjustment parameter Z of Koffset is introduced.

The terminal device may determine Koffset based on ΔKoffset, TA_common, and the adjustment parameter Z. Koffset may satisfy the following formula (7) or formula (8).

$$K\text{offset}=\lceil TA\_\text{common}/\text{slot\_duration}\rceil+\Delta K\text{offset}+/-Z \quad \text{Formula (7)}$$

slot_duration indicates a time unit, and ⌈ ⌉ indicates a rounding up operation. For related descriptions, refer to the foregoing case 1. Alternatively, Koffset may satisfy the following formula (8). +/− in the formula (7) may be related to a value range of Z, or related to that Koffset required by a system cannot be too large or too small. During specific implementation, + or − may be used by the terminal device through a protocol agreement or a network configuration.

$$K\text{offset}=\lceil(TA\_\text{common}+/-Z)/\text{slot\_duration}\rceil+\Delta K\text{offset} \quad \text{Formula (8)}$$

slot_duration indicates a time unit, and ⌈ ⌉ indicates a rounding up operation. For related descriptions, refer to the foregoing case 1.

The following describes a case in which the network device sends the time parameter for determining K_mac to the terminal device.

Case 7: The time parameter includes Delay_compensated.

The terminal device may determine K_mac based on Delay_compensated. K_mac may satisfy the following formula (9):

$$K\_\text{mac}=\lceil\text{Delay\_compensated}/\text{slot\_duration}\rceil \quad \text{Formula (9)}$$

slot_duration indicates a time unit, and ⌈ ⌉ indicates a rounding up operation. For related descriptions, refer to the foregoing case 1. In the foregoing formula (9), time units of Delay_compensated and K_mac may be the same or different. If the time units are different, time units of the time parameters may be converted or quantized into the same time unit.

Case 8: The time parameter includes Feeder_RTD and TA_common.

The terminal device may determine K_mac based on Feeder_RTD and TA_common. K_mac may satisfy the following formula (10):

$$K\_\text{mac}=\lceil(\text{Feeder}\_RTD-TA\_\text{common})/\text{slot\_duration}\rceil \quad \text{Formula (10)}$$

slot_duration indicates a time unit, and ⌈ ⌉ indicates a rounding up operation. For related descriptions, refer to the foregoing case 1. In the foregoing formula (10), time units of Feeder_RTD and TA_common may be the same or different. If the time units are different, time units of the time parameters may be converted or quantized into the same time unit.

Case 9: The time parameter includes RAR window, RAR_window_delay, and Koffset.

The terminal device may determine K_mac based on RAR window, RAR_window_delay, and Koffset. K_mac satisfies the following formula (11):

$$K\_\text{mac}=\lceil(RAR\_\text{window}+RAR\_\text{window\_delay})/\text{slot\_duration}\rceil-K\text{offset} \quad \text{Formula (11)}$$

slot_duration indicates a time unit, and ⌈ ⌉ indicates a rounding up operation. For related descriptions, refer to the foregoing case 1. Koffset indicates the first timing offset. In the foregoing formula (11), time units of RAR window, RAR_window_delay, Koffset, and K_mac may be the same or different. If the time units are different, time units of the time parameters may be converted or quantized into the same time unit.

Case 10: The time parameter includes Koffset and TA_common.

The terminal device may determine K_mac based on TA_cal, Koffset, and TA_common. TA_cal is determined by the terminal device based on location information of the terminal device and location information of a satellite, and may indicate a round-trip delay value of a service link of the terminal device. For example, the terminal device may determine the location information of the satellite based on ephemeris information of the satellite, and further determine TA_cal. It should be noted that the location information of the satellite and the time parameter may be sent to the terminal device together, or may be sent to the terminal device separately. Details are not described below. K_mac satisfies the following formula (12):

$$K\_mac=Koffset-\lceil(TA\_cal+TA\_common)/slot\_duration\rceil \qquad \text{Formula (12)}$$

slot_duration indicates a time unit, and $\lceil\ \rceil$ indicates a rounding up operation. For related descriptions, refer to the foregoing case 1. Koffset indicates the first timing offset. In the foregoing formula (12), time units of TA_cal, Koffset, TA_common, and K_mac may be the same or different. If the time units are different, time units of the time parameters may be converted or quantized into the same time unit.

Case 11: The time parameter includes RAR window, RAR_window_delay, and TA_common.

The terminal device may determine K_mac based on TA_cal, RAR window, RAR_window_delay, and TA_common. K_mac satisfies the following formula (13):

$$K\_mac=\lceil(RAR\_window+RAR\_window\_delay)/slot\_duration\rceil-\lceil(TA\_cal+TA\_common)/slot\_duration\rceil \qquad \text{Formula (13)}$$

slot_duration indicates a time unit, and $\lceil\ \rceil$ indicates a rounding up operation. For related descriptions, refer to the foregoing case 1. In the foregoing formula (13), time units of TA_cal, RAR_window, RAR_window_delay and TA_common may be the same or different. If the time units are different, time units of the time parameters may be converted or quantized into the same time unit.

The network device indicates, to the terminal device by using the foregoing cases 7 to 11, the time parameter for determining K_mac. Optionally, when impact of positioning errors, such as a positioning error of the terminal device, a positioning error of a satellite, and a positioning error of a gateway station, a processing delay, a quantization error, and/or the like is considered, to avoid an insufficient timing delay for a downlink configuration to take effect due to an excessively small value of K_mac determined by the terminal device, an adjustment parameter Y of the second timing offset K_mac may be separately added to the foregoing formulae (9) to (14). Y may be a real number, and may be indicated by the network device or may be specified in a communication protocol. For example, sent information carrying Y may be the same as the information carrying the first information shown in the step 1401, and Y and the time parameter may be carried in a same piece of information or different pieces of information. Optionally, when determining K_mac, the terminal device may multiply Y by a time unit and substitute a multiplication result into the foregoing calculation relationship. The time unit may be specified in a communication protocol or indicated by the network device.

For example, a time unit of Y may be 1 ms, 10 ms, a length of one slot, a length of one subframe, a length of one frame, Ts, 16*Ts, 16*Ts/29, or Tc.

The following uses the case 8 as an example to describe a case in which the adjustment parameter Y of K_mac is introduced.

The terminal device may determine K_mac based on Feeder_RTD, TA_common, and Y K_mac may satisfy the following formula (14) and formula (15):

$$K\_mac=\lceil(Feeder\_RTD-TA\_common)/slot\_duration\rceil+/-Y \qquad \text{Formula (14)}$$

Alternatively, K_mac may satisfy the following formula (15):

$$K\_mac=\lceil(Feeder\_RTD-TA\_common+/-Y)/slot\_duration\rceil \qquad \text{Formula (15)}$$

slot_duration indicates a time unit, and $\lceil\ \rceil$ indicates a rounding up operation. For related descriptions, refer to the foregoing case 1. In the formula (14) and formula (15), a time unit of Y may be the same as or different from that of K_mac. If the time units are different, time units of the time parameters may be converted or quantized into the same time unit.

In a possible implementation, the terminal device and the network device may agree on update time of at least one of TA, Koffset, and K_mac. For example, it may be agreed that time at which the network device updates system information is time at which at least one of TA, Koffset, and K_mac is updated.

For example, the network device starts to broadcast updated system information in some specific system frames, that is, content of the updated system information. When updating the system information, the network device sends a system information change notification (change notification) to the terminal device. After receiving a system information change notification, the terminal device receives new system information starting from a next possible system frame that meets a requirement. For example, the system frame can be used as a start frame for updating the system information only when a number of the system frame meets the requirement: SFN mod m=0. SFN indicates the number of the system frame, and m indicates a positive integer, for example, 32, 64, 128, or 256. Therefore, it may be agreed that the network device sends the system information change notification to the terminal device when updating the system information, and the terminal device detects the updated system information in the agreed start frame based on the system information change notification, and then updates the time parameter.

For example, the start time of the start frame for updating the system information is used as the agreed time for updating the at least one of TA, Koffset, and K_mac. Alternatively, the network device may update at least one of TA, Koffset, and K_mac based on the foregoing agreed time. Based on the foregoing solution, the terminal device and the network device may obtain at least one of a same updated TA, a same updated Koffset, and a same updated K_mac.

For example, the time parameter includes one or more of RAR window, RAR_window_delay, and TA_common. When the terminal device obtains one or more of RAR window, RAR_window_delay, and TA_common in the updated system information by using a broadcast message, the terminal device further determines one or more of corresponding TA, Koffset, and K_mac, if one or more of the newly determined TA, Koffset, and K_mac change with the previously used TA, Koffset, and K_mac, a timing parameter determined through calculation is updated to a newly determined value at the start time of the start frame for updating the system information. Optionally, the network device may also perform the foregoing process. In this way, both the terminal device and the network device can obtain one or more of a same latest TA, a same latest Koffset, and a same latest K_mac.

Optionally, the terminal device may send determining information to the network device. The determining information indicates to update at least one of TA, Koffset, and K_mac to a newly determined value. For example, the determining information may be at least one of an updated TA, an updated Koffset, and an updated K_mac. Alternatively, the determining information may be a parameter for updating at least one of TA, Koffset, and K_mac, for example, may be a TA difference used to update TA, and the TA difference indicates a difference between TA before update and TA after update. Alternatively, the determining information may be signaling of 1-bit length, and indicates that the terminal device uses at least one of the updated TA, the updated Koffset, and the updated K_mac. Optionally, after the network device sends, to the terminal device, a related value for updating Koffset, or after the network device confirms that the terminal device can update Koffset, the terminal device may further determine and update K_mac. Optionally, after the network device sends, to the terminal device, a related value for updating K_mac, or after the network device confirms that the terminal device can update K_mac, the terminal device may further determine and update Koffset.

Optionally, the determining information may also be sent by the network device to the terminal device. The terminal device may use at least one of the updated TA, the updated Koffset, and the updated K_mac based on the determining information.

In another possible implementation, after obtaining a to-be-updated or to-be-used K_mac based on the calculation relationship/formula for determining K_mac, the terminal device may send latest K_mac or a latest difference of K_mac to the network device. The difference of K_mac may be a difference between K_mac used by the terminal device and a reference value. For example, the reference value may be K_mac reported by the terminal device last time. After receiving K_mac or the difference of K_mac, the network device may obtain the latest K_mac, and may obtain, based on a calculation relationship/formula, TA that is being used by the terminal device or a related value of TA that is being used by the terminal device.

For example, the terminal device obtains K_mac based on a calculation relationship: K_mac=⌈(RAR_window+RAR_window_delay−TA)/slot_duration⌉, and sends K_mac to the network device. After receiving K_mac, the network device may obtain, according to TA≈(⌈(RAR_window+RAR_window_delay)/slot_duration⌉−K_mac), the related value of TA used by the terminal device. In other words, a TA value obtained through processing is not necessarily accurately equal to the TA value used by the terminal device, but is approximately equal to the TA value used by the terminal device. Optionally, the network device may obtain the first timing offset and/or RAR_window_delay based on the TA value obtained through processing, and may send the obtained first timing offset and/or RAR_window_delay to the network device.

For example, the network device may obtain, through processing based on Koffset=⌈TA/slot_duration⌉, Koffset that can be used by the terminal device, and may send Koffset or a difference of Koffset to the terminal device.

Optionally, the terminal device may determine, based on a K_mac update threshold K_mac_thresh, whether a condition for updating K_mac is met. K_mac_thresh may be specified in a communication protocol, or indicated by the network device. For example, the K_mac update threshold may be an integer value, and K_mac_thresh=2. After the terminal device or the network device determines an updated K_mac, the terminal device or the network device may determine whether |the updated K_mac−K_mac before update|≥K_mac_thresh is satisfied. If the updated K_mac−K_mac before update|≥K_mac_thresh is satisfied, K_mac is updated. If the updated K_mac−K_mac before update|≥K_mac_thresh is not satisfied, K_mac before update continues to be used. After the time parameter is updated, a determining operation is performed.

The foregoing formula (9) is used as an example. If the terminal device receives updated Delay_compensated, the terminal device may determine whether |the updated K_mac−K_mac before update|≥K_mac_thresh is satisfied. If |the updated K_mac−K_mac before update|≥K_mac_thresh is not satisfied, K_mac before update, namely, K_mac used before Delay_compensated is updated, may continue to be used.

The following describes different cases in which the network device indicates the time parameter for determining RAR_window_delay. For ease of understanding embodiments of this application, the following first describes RAR_window_delay in embodiments of this application.

Different understandings of a moment for starting the RAR window and a moment for starting the random access contention resolution timer cause different manners of determining RAR_window_delay. For ease of distinguishing, the delay start duration that is of the RAR window and that is determined in an actual timing manner may be referred to as first delay start duration of the RAR window RAR_window_delay 1, and delay start duration that is of the RAR window and that is determined in a logical timing manner may be referred to as second delay start duration of the RAR window RAR_window_delay 2.

RAR_window_delay 1 is described below.

After sending a last symbol (symbol) of a PUSCH occasion or PRACH occasion of Msg 1/Msg B in advance based on a used timing advance value TA, the terminal device may start to detect the PDCCH on a first symbol of an earliest CORESET based on actual sending time of the Msg 1/Msg B, that is, may start the RAR window based on the actual sending time of the Msg 1/Msg B.

Figure 15A:
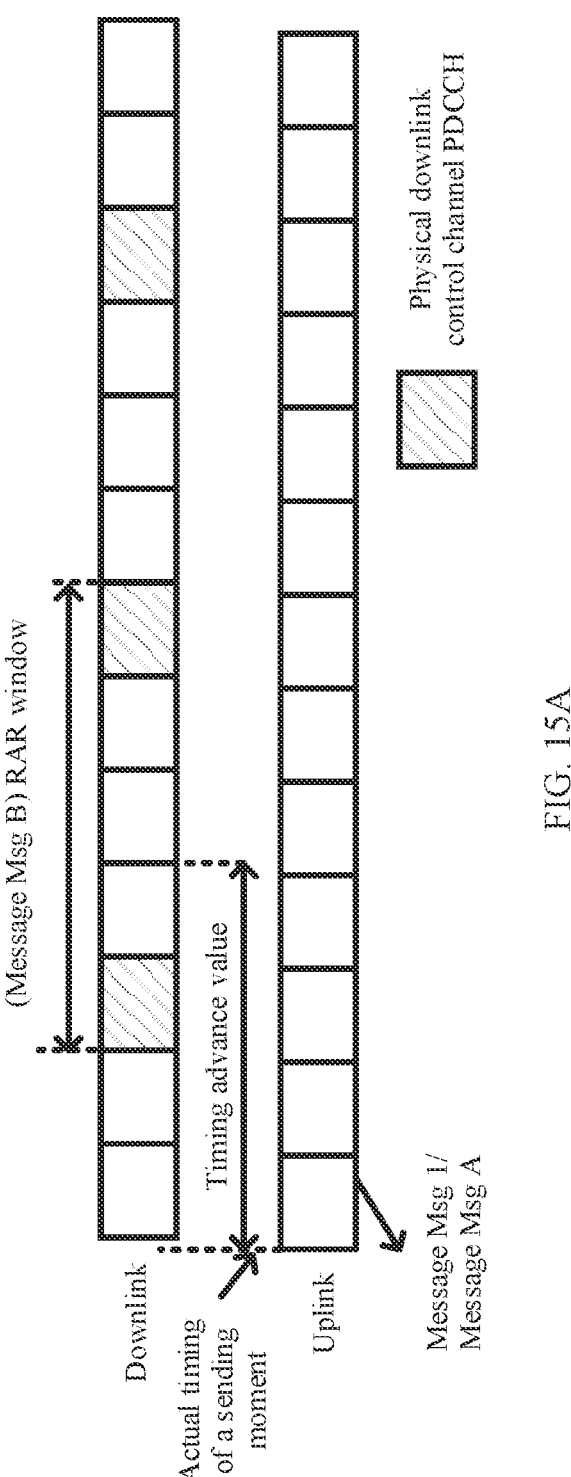
FIG. 15A is a schematic diagram of determining a RAR window in an actual timing manner according to an embodiment of this application.

As shown in FIG. 15A, the PDCCH may indicate a start location or a start symbol of a resource occupied by the CORESET. The terminal device may determine a start moment of the RAR window based on a communication scenario and based on the last symbol (symbol) of the PUSCH occasion or PRACH occasion. For example, in a 4-step random access scenario, the start moment of the RAR window is determined based on end time of the last symbol of the PRACH occasion. In a 2-step random access scenario, the terminal device determines the start moment of the RAR window based on end time of the last symbol (symbol) of the PUSCH occasion. If a PRACH preamble sequence sent by the terminal device is not mapped to a valid PUSCH occasion, the terminal device determines the start moment of the RAR window based on end time of the last symbol of the PRACH occasion corresponding to PRACH transmission.

Figure 15B:
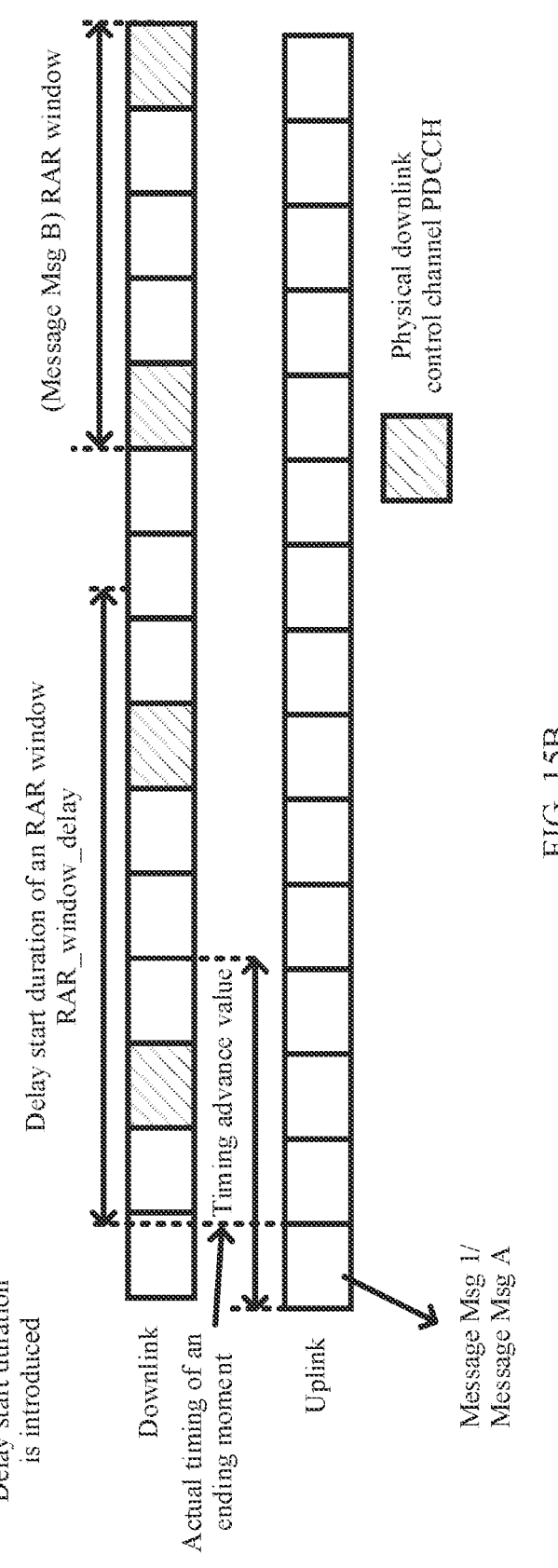
FIG. 15B is a schematic diagram of determining delay start duration of a RAR window in an actual timing manner according to an embodiment of this application.

As shown in FIG. 15B, on the basis of determining start time of starting the RAR detection window in the actual timing manner, RAR_window_delay 1 is used to start the RAR window in a delayed manner. A start moment of RAR_window_delay 1 is end time at which the terminal device sends the last symbol of the PUSCH occasion or PRACH occasion of the Msg 1/Msg B. In other words, the end time at which the last symbol of the PUSCH occasion or PRACH occasion of the Msg 1/Msg B is sent is the start moment of RAR_window_delay 1. Alternatively, a start symbol of RAR_window_delay 1 may be a next symbol after the last symbol of the PUSCH occasion or PRACH occasion. In other words, the next symbol after the last symbol of the PUSCH occasion or PRACH occasion is the start symbol of RAR_window_delay 1.

RAR_window_delay 2 is described below.

After sending a last symbol (symbol) of a PUSCH occasion or PRACH occasion of Msg 1/Msg A in advance based on a used timing advance value TA, the terminal device starts to detect PDCCH information based on a first symbol of an earliest CORESET based on logical timing. To be specific, the terminal device may start the RAR window based on logical time at which the Msg 1/Msg A is sent.

Figure 16A:
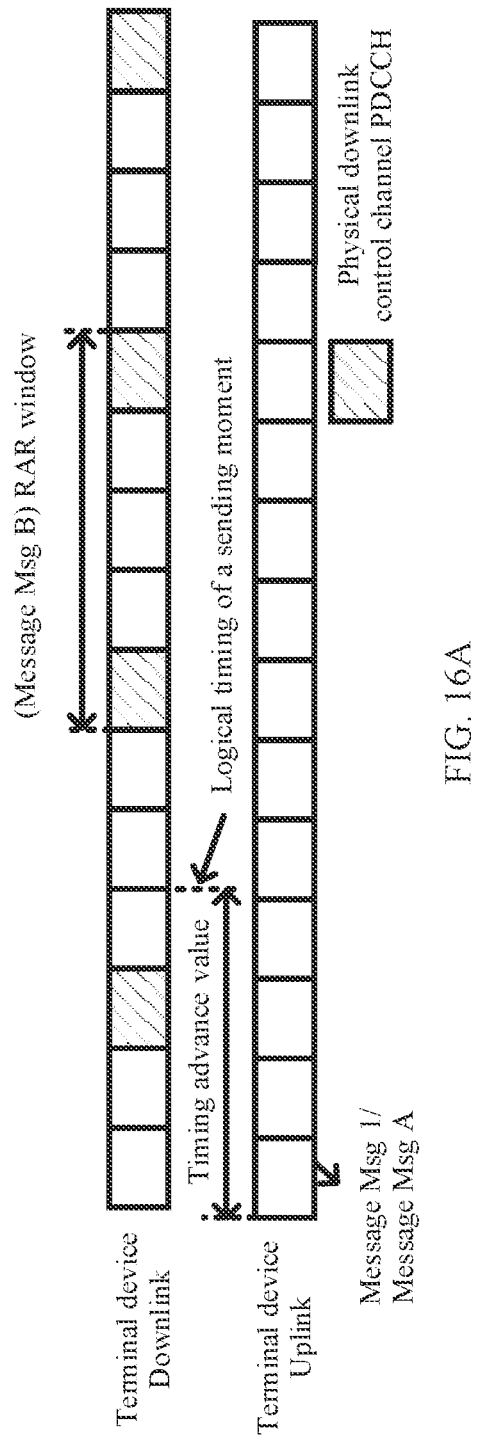
FIG. 16A is a schematic diagram of determining a RAR window in a logical timing manner according to an embodiment of this application.

The logical time may be understood as time corresponding to a case in which the timing advance value TA is equal to 0. For example, as shown in FIG. 16A, logical time of a start moment at which the terminal device sends the Msg 1/Msg A is an ending moment of first PDCCH information shown in FIG. 16A, and it is determined, based on the logical time, that a start moment of the RAR window is a start moment of second PDCCH information shown in FIG. 16A. In comparison with the actual timing manner, in FIG. 16A, the start moment of the RAR window is determined based on actual sending time. Actual time of a start moment at which the terminal device sends the Msg 1/Msg B is actual time of a sending moment shown in the figure, and it is determined, based on the actual time, that the start moment of the RAR window is a start moment of the first PDCCH information drawn in the figure.

Figure 16B:
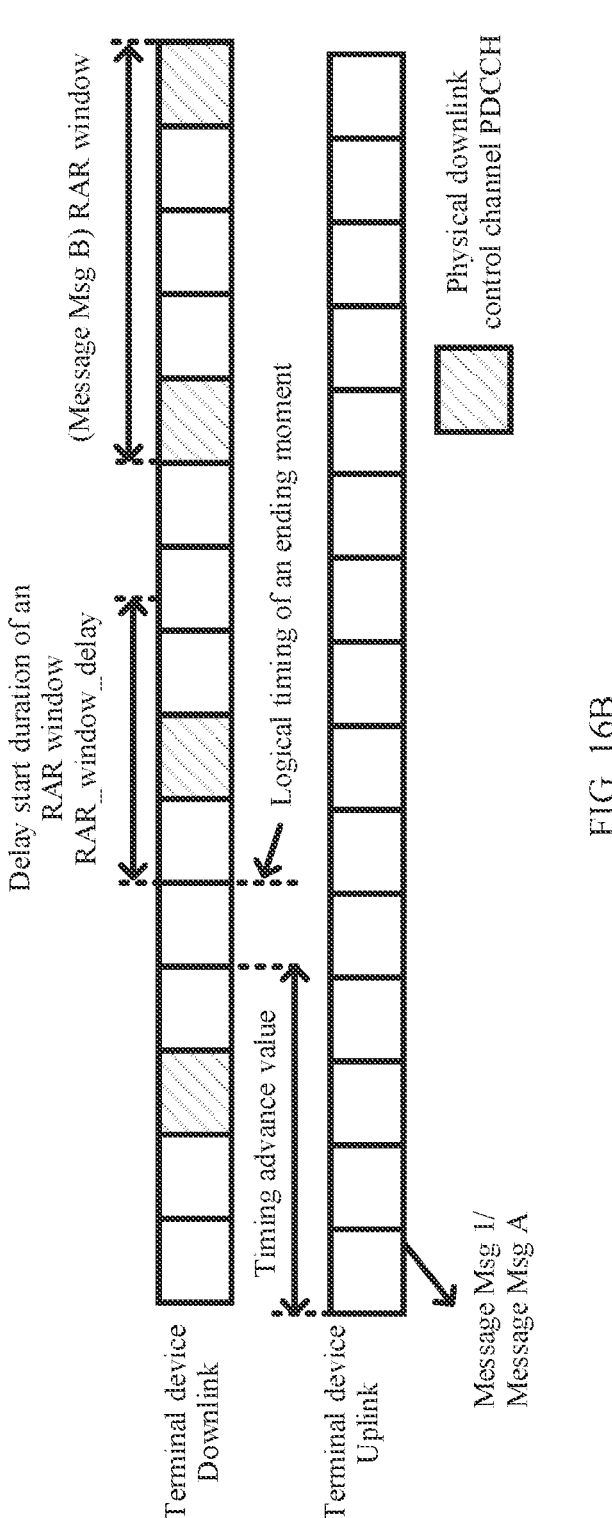
FIG. 16B is a schematic diagram of determining delay start duration of a RAR window in a logical timing manner according to an embodiment of this application.

As shown in FIG. 16B, on the basis of determining the start time of starting the RAR window based on the logical time, RAR_window_delay 2 is used to start the RAR window in a delayed manner. A start moment of RAR_window_delay 2 is logical end time at which the last symbol (symbol) of the PUSCH occasion or PRACH occasion of the Msg 1/Msg B is sent. In other words, the logical end time at which the last symbol (symbol) of the PUSCH occasion or PRACH occasion of the Msg 1/Msg B is sent is the start moment of RAR_window_delay 2. Alternatively, a start symbol of RAR_window_delay 2 is a next symbol after the last symbol of the PUSCH occasion or PRACH occasion. In other words, the next symbol after the last symbol of the PUSCH occasion or PRACH occasion is the start symbol of RAR_window_delay 2. Alternatively, a start moment of RAR_window_delay 2 is logical start time of a next symbol after the last symbol of the PUSCH occasion or PRACH occasion. In other words, the logical start time of the next symbol after the last symbol of the PUSCH occasion or PRACH occasion is the start moment of RAR_window_delay 2.

In a possible implementation, the network device and the terminal device may determine to determine the moment of starting the RAR window/random access contention resolution timer in an actual timing manner or a logical timing manner. For example, the actual timing manner or the logical timing manner may be agreed in a protocol, or the network device may indicate, to the terminal device, that the actual timing manner or the logical timing manner is used, for example, indicate, to the terminal device through signaling, that the actual timing manner or the logical timing manner is used. Correspondingly, a start moment of RAR_ window_delay is also determined in an actual timing manner or a logical timing manner according to a protocol agreement or an indication of the network device.

In the foregoing cases 7 to 11, RAR_window_delay included in the time parameter sent by the network device to the terminal device is determined in the actual timing manner. The following describes a case in which RAR_window_delay indicated by the network device to the terminal device is determined in the logical timing manner.

Case 12: The time parameter includes RAR_window_delay.

The terminal device determines K_mac based on RAR_window_delay. K_mac satisfies the following formula (16):

$$K\_mac = \lceil RAR\_window\_delay / slot\_duration \rceil \qquad \text{Formula (16)}$$

slot_duration indicates a time unit, and $\lceil \ \rceil$ indicates a rounding up operation. For related descriptions, refer to the foregoing case 1. In the foregoing formula (16), time units of RAR_window_delay and K_mac may be the same or different. If the time units are different, time units of the time parameters may be converted or quantized into the same time unit.

The following separately describes, by using Case 13 to Case 17, a case in which the network device sends the time parameter for determining RAR_window_delay. It should be understood that RAR_window_delay may include RAR_window_delay 1 and RAR_window_delay 2.

Case 13: The time parameter includes Delay_compensated and TA_common.

The terminal device may determine RAR_window_delay 1 based on TA_cal, Delay_compensated, and TA_common. RAR_window_delay 1 satisfies the following formula (17):

$$RAR\_window\_delay1 = TA\_cal + Delay\_compensated + TA\_common \qquad \text{Formula (17)}$$

In the foregoing formula (17), time units of TA_cal, Delay_compensated, TA_common, and RAR_window_delay 1 may be the same or different. If the time units are different, time units of the time parameters may be converted or quantized into the same time unit. For example, in the foregoing formula (17), a time unit of TA_cal is Tc, and units of Delay_compensated and TA_common are Ts or 16*Ts. In this case, time units of all the time parameters need to be converted into the same measurement unit, for example, Tc.

$$Tc = \frac{1}{\Delta f_{max} * N_f},$$

$$\Delta f_{max} = 480 * 10^3 \ Hz,$$

and $N_f$=4096. Ts is defined as $$\frac{Ts}{Tc} = 64,$$

that is, $$Ts = \frac{1}{\Delta f_{ref} * N_{f,ref}},$$

$\Delta f_{ref}$=15*10³ Hz, and $N_{f,ref}$=2048.

The terminal device may also determine RAR_window_delay 2 based on the foregoing time parameters. RAR_window_delay 2 satisfies the following formula (18):

$$RAR\_window\_delay2 = TA\_cal + Delay\_compensated + TA\_common - TA = Delay\_compensated \qquad \text{Formula (18)}$$

TA indicates a timing advance value used by the terminal device, and TA=TA_cal+TA_common. Details are not described below again.

In the foregoing formula (18), time units of TA_cal, Delay_compensated, TA_common, TA, and RAR_window_delay 2 may be the same or different. If the time units are different, time units of the time parameters may be converted or quantized into the same time unit.

Case 14: The time parameter includes K_mac and TA_common.

The terminal device may determine RAR_window_delay 1 based on TA_cal, K_mac, and TA_common. RAR_window_delay 1 satisfies the following formula (19):

$$RAR\_window\_delay1 = TA\_cal + TA\_common + K\_mac * slot\_duration \qquad \text{Formula (19)}$$

slot_duration indicates a time unit. For a related description, refer to the foregoing case 1. K_mac indicates the second timing offset. In the formula (19), time units of TA_cal, K_mac, TA_common, and RAR_window_delay 1 may be the same or different. If the time units are different, time units of the time parameters may be converted or quantized into the same time unit. The terminal device may also determine RAR_window_delay 2 based on the foregoing time parameters. RAR_window_delay 2 satisfies the following formula (20):

$$RAR\_window\_delay2 = TA\_cal + TA\_common + K\_mac * slot\_duration - TA = K\_mac * slot\_duration \qquad \text{Formula (20)}$$

slot_duration indicates a time unit. For a related description, refer to the foregoing case 1. K_mac indicates the second timing offset. In the formula (20), time units of TA_cal, K_mac, TA_common, TA, and RAR_window_delay 2 may be the same or different. If the time units are different, time units of the time parameters may be converted or quantized into the same time unit.

Case 15: The time parameter includes Feeder_RTD.

The terminal device may determine RAR_window_delay 1 based on TA_cal and Feeder_RTD. RAR_window_delay 1 satisfies the following formula (21):

$$RAR\_window\_delay1 = TA\_cal + Feeder\_RTD \qquad \text{Formula (21)}$$

In the formula (21), time units of TA_cal, Feeder_RTD, and RAR_window_delay 1 may be the same or different. If the time units are different, time units of the time parameters may be converted or quantized into the same time unit. The terminal device may also determine RAR_window_delay 2 based on the foregoing time parameters. RAR_window_delay 2 satisfies the following formula (22):

$$RAR\_window\_delay2 = TA\_cal + Feeder\_RTD - TA \qquad \text{Formula (22)}$$

In the formula (22), time units of TA_cal, Feeder_RTD, TA, and RAR_window_delay 2 may be the same or different. If the time units are different, time units of the time parameters may be converted or quantized into the same time unit.

Case 16: The time parameter includes RAR window and Koffset.

The terminal device may determine RAR_window_delay 1 based on RAR window and Koffset. RAR_window_delay 1 satisfies the following formula (23):

$$RAR\_window\_delay1 = Koffset * slot\_duration - RAR\_window \qquad \text{Formula (23)}$$

Koffset indicates the first timing offset, and slot_duration indicates a time unit. For related descriptions, refer to the foregoing case 1. In the formula (23), time units of RAR window, Koffset, and RAR_window_delay 1 may be the same or different. If the time units are different, time units of the time parameters may be converted or quantized into the same time unit. The terminal device may also determine RAR_window_delay 2 based on the foregoing time parameters. RAR_window_delay 2 satisfies the following formula (24):

$$RAR\_window\_delay2 = Koffset * slot\_duration - RAR\_window - TA \qquad \text{Formula (24)}$$

Koffset indicates the first timing offset, and slot_duration indicates a time unit. In the formula (24), time units of RAR window, Koffset, TA, and RAR_window_delay 2 may be the same or different. If the time units are different, time units of the time parameters may be converted or quantized into the same time unit.

Case 17: The time parameter includes Service_RTD_min and Delay_compensated.

The terminal device may determine RAR_window_delay 1 based on Service_RTD_min and Delay_compensated. RAR_window_delay 1 satisfies the following formula (25):

$$RAR\_window\_delay1 = Service\_RTD\_min + Delay\_compensated + TA\_common \qquad \text{Formula (25)}$$

In the formula (25), time units of Service_RTD_min, Delay_compensated, and RAR_window_delay 1 may be the same or different. If the time units are different, time units of the time parameters may be converted or quantized into the same time unit.

The terminal device may also determine RAR_window_delay 2 based on the foregoing time parameters. RAR_window_delay 2 satisfies the following formula (26):

$$RAR\_window\_delay2 = Service\_RTD\_min + Delay\_compensated + TA\_common - TA \qquad \text{Formula (26)}$$

In the formula (26), time units of Service_RTD_min, Delay_compensated, TA, and RAR_window_delay 1 may be the same or different. If the time units are different, time units of the time parameters may be converted or quantized into the same time unit. The network device indicates, to the terminal device by using the foregoing cases 13 to 17, the time parameter for determining RAR_window_delay. Optionally, when impact of positioning errors, such as a positioning error of the terminal device, a positioning error of a satellite, and a positioning error of a gateway station, a processing delay, a quantization error, and/or the like is considered, to avoid a problem that the terminal device cannot receive the PDCCH information in the RAR window because RAR_window_delay determined by the terminal device is excessively large, an adjustment parameter X of RAR_window_delay may be separately added to the foregoing formulae (17) to (26). X may be a real number, and may be indicated by the network device or may be specified in a communication protocol. For example, sent information carrying X may be the same as the information carrying the first information shown in the step 1401, and X and the time parameter may be carried in a same piece of information or different pieces of information. Optionally, when determining RAR_window_delay, the terminal device may multiply X by a time unit and substitute a multiplication result into the foregoing calculation relationship. The time unit may be specified in a communication protocol or indicated by the network device. For example, a time unit of X may be 1 ms, 10 ms, a length of one slot, a length of one subframe, a length of one frame, Ts, 16*Ts, $16*Ts/2^{\mu}$, or Tc.

The following uses the case 13 as an example to describe a case in which the adjustment parameter X of RAR_window_delay is introduced.

The terminal device may determine RAR_window_delay 1 based on TA_cal, RAR_window_delay, and TA_common. RAR_window_delay 1 may satisfy the following formula (27):

$$RAR\_window\_delay1 = TA\_cal + Delay\_compensated + TA\_common +/- X \quad \text{Formula (27)}$$

RAR_window_delay 2 may satisfy the following formula (28):

$$RAR\_window\_delay2 = TA\_cal + Delay\_compensated + TA\_common - TA +/- X = Delay\_ \\ compensated +/- X = RAR\_window\_delay1 - TA \quad \text{Formula (28)}$$

It should be noted that there is a difference TA between RAR_window_delay 1 and RAR_window_delay 2. If the terminal device corrects RAR_window_delay 1 based on the adjustment parameter X, RAR_window_delay 2 may not need to be further corrected when RAR_window_delay 2 is calculated. If the terminal device does not correct RAR_window_delay 1, RAR_window_delay 2 may be corrected based on the adjustment parameter X when RAR_window_delay 2 is calculated.

Based on the foregoing solution, the network device may indicate, to the terminal device in the manners shown in the cases 1 to 17, the time parameter for determining the first timing offset, the second timing offset, and the delay start duration of the RAR window, to reduce signaling overheads.

In the foregoing cases 13 to 17, the time parameter sent by the terminal device may include RAR_window_delay. In this case, the terminal device may determine more accurate RAR_window_delay based on another time parameter, and use RAR_window_delay as actually used RAR_window_delay. Alternatively, for convenience and no calculation, the terminal device may directly use received RAR_window_delay sent by the network device as the actually used RAR_window_delay. When the time parameter sent by the network device to the terminal device includes RAR_window_delay, it may be agreed, in a communication protocol, whether the terminal device determines and uses UE-level RAR_window_delay based on the another time parameter or directly uses RAR_window_delay sent by the network device to the terminal device. Alternatively, the terminal device selects, based on an actual situation, whether to determine and use UE-level RAR_window_delay based on the another time parameter or directly use RAR_window_delay sent by the network device to the terminal device. Alternatively, the network device may indicate, to the terminal device through signaling, whether to determine and use UE-level RAR_window_delay based on the another time parameter or directly use RAR_window_delay sent by the network device to the terminal device. For example, 1-bit signaling indicates, to the terminal device, whether to determine and use UE-level RAR_window_delay based on the another time parameter or directly use a RAR_window_delay value sent by the network device to the terminal device.

In the foregoing cases 1 to 17, the network device and the terminal device need to know TA_cal or a TA value used by the terminal device to separately determine a K_mac value, to ensure that the network device and the terminal device use same K_mac. The terminal device may report TA_cal, TA_cal+TA_common, or a used TA value in the following manner for the network device to determine the K_mac value.

(1) The terminal device reports, to the network device, TA_cal or a TA value obtained by the terminal device through calculation.

(2) The terminal device reports location information of the terminal device, and the network device may obtain TA_cal or a TA value through processing based on the location information of the terminal device and location information of a satellite. In this case, TA_cal or the TA obtained by the network device through processing is the same as TA_cal or the TA obtained by the terminal device through processing, because the terminal device also obtains TA_cal or the TA value through processing based on the location information of the terminal device and the location information of the satellite.

(3) The terminal device reports TA_cal+TA_common or a TA value, that is, a sum of TA_cal and TA_common, so that the network device determines K_mac.

(4) The terminal device reports a difference of TA, namely, a difference between the TA value used by the terminal device and a reference value. For example, the reference value may be a TA value reported by the terminal device last time, or the reference value may be a minimum round-trip delay determined based on satellite orbital altitude, or the reference value may be TA_common. After receiving the difference of TA, the network device may obtain, through processing based on a sum of the difference of TA and the reference value, the TA value used by the terminal device.

In a possible implementation, the network device may indicate location coordinate information to the terminal device. The terminal device may obtain Service_RTD_max through calculation based on the location coordinate information. For example, the location coordinate information may be location coordinate information of a point that is farthest from a satellite and that is in a coverage area (a cell or a beam beam) of the satellite. After receiving the location coordinate information, the terminal device may obtain Service_RTD_max through processing based on location information of the satellite and location information of the farthest point. For example, the terminal device may obtain Service_RTD_max through calculation according to 2*distance (location coordinates of the satellite and the farthest point)/speed of light. Distance (A, B) indicates a distance between a point A and a point B. The terminal device may use Service_RTD_max determined based on the received location coordinate information and determine another timing-related parameter based on the calculation relationship in this embodiment of this application. Therefore, Service_RTD_max in the foregoing cases 1 to 17 may be obtained by the terminal device through calculation based on the location coordinate information indicated by the network device, and does not need to be indicated by the network device.

Similarly, Service_RTD_min may also be determined by the terminal device based on location coordinate information indicated by the network device. For example, the location coordinate information may be location coordinate information of a point that is nearest to a satellite and that is in a coverage area of the satellite. Therefore, Service_RTD_min in the foregoing cases 1 to 17 may be obtained by the terminal device through calculation based on the location coordinate information indicated by the network device, and does not need to be indicated by the network device.

In another possible implementation, after the terminal device receives TA_common sent by the network device, a period of time may have passed when the terminal device uses TA_common. Therefore, TA_common received by the terminal device may be inaccurate, and needs to be corrected. The terminal device may determine TA based on corrected TA_common. Alternatively, the terminal device may determine one or more of RAR_window_delay, K_mac, and Koffset based on corrected TA_common.

In an example, the terminal device may determine corrected TA_common based on a common timing advance change rate TA_rate indicated by the network device. Alternatively, the terminal device may determine TA_rate based on a parameter that is related to TA_rate and that is indicated by the network device, to determine corrected TA_common. For example, corrected TA_common=received TA_common+$\Delta$T*TA_rate, where $\Delta$T indicates a time interval, and may be a time interval between a moment at which the network device sends TA_common and a moment at which the terminal device uses TA_common.

For example, in the foregoing formula (17) for determining RAR_window_delay 1 or the formula using TA_common during determining of Koffset, in actual use, after receiving TA_common, the terminal device may need to correct or adjust TA_common, for example, adjust TA_common based on the common timing advance change rate. TA_common_new=TA_common_old+$\Delta$T*timing advance change rate, where TA_common_new indicates an adjusted TA_common value, TA_common_old indicates TA_common before adjustment or TA_common sent by the network device and received by the terminal device, and $\Delta$T indicates a time interval for determining TA_common_new and TA_common_old or a time difference between time for determining TA_common_new and time corresponding to TA_common_old. The terminal device may determine Koffset based on adjusted TA_common, as shown below:

$$Koffset=[(Service\_RTD+TA\_common\_new)/slot\_duration]=[(Service\_RTD\_max+TA\_common\_old+\Delta T*timing\ advance\ change\ rate)/slot\_duration].$$

It should be noted that the network device may determine the time parameter based on various cases such as the foregoing cases 1 to 17, or the network device may determine the time parameter based on various combinations of the cases 1 to 17. For example, the network device may determine the time parameter based on a combination of the case 1 and the case 7. The time parameter may include $\Delta$Koffset, TA_common, and Delay_compensated. The terminal device may determine one or more of Koffset, K_mac, and RAR_window_delay based on $\Delta$Koffset, TA_common, and Delay_compensated. The following uses Koffset as an example for description.

$$Koffset=[TA\_common/slot\_duration]+\Delta Koffset,$$

$$Koffset=[TA\_common/slot\_duration]+\Delta Koffset+/-Z, or$$

$$Koffset=[(TA\_common+/-Z)/slot\_duration]+\Delta Koffset.$$

A person skilled in the art may determine, based on the foregoing cases 1 to 17 and various combinations of the cases 1 to 17, that the terminal device can determine at least one of Koffset, K_mac, and RAR_window_delay.

Optionally, the time parameter sent by the network device may be used by the terminal device to determine Koffset, K_mac, and RAR_window_delay. In this way, the network device may perform signaling transmission once, so that the terminal device can determine Koffset, K_mac, and RAR_window_delay, to further reduce signaling overheads.

In a possible implementation, TA=TA_cal+TA_common. Therefore, TA_cal+TA_common in the foregoing formulae (1) to (26) may be represented by TA. Optionally, in a communication process, a correction value and/or an offset may be added to TA used by the terminal device based on TA_cal+TA_common. The correction value may be related to movement of a satellite, and the offset is related to a positioning error, a duplex mode, and the like. In this embodiment of this application, for ease of description, TA_cal+TA_common or TA indicates TA used by the terminal device. Similarly, Koffset, K_mac, RAR_window_delay 1, and RAR_window_delay 2 in this embodiment of this application in a communication process may be determined based on the foregoing time parameters and calculation relationships. Alternatively, one or more of another impact parameter, an offset, a variation, and a correction value may be added to the foregoing calculation relationship, to obtain one or more of Koffset, K_mac, RAR_window_delay 1, and RAR_window_delay 2 that can be finally used. Details are not described below again. One or more of the another impact parameter, the offset, the variation, or the correction value may be indicated by the network device, or may be specified in a communication protocol.

The following explains and describes a combination of the foregoing cases 1 and 17 by using specific embodiments.

Embodiment 1

The network device sends Delay_compensated, Service_RTD_max, and TA_common to the terminal device.

The terminal device may determine Koffset according to the foregoing formula (3), as shown below:

$$Koffset=[(Service\_RTD\_max+TA\_common)/slot\_duration].$$

Alternatively, the terminal device may determine Koffset based on the formula (3) and the adjustment parameter Z of Koffset, as shown below:

$$Koffset=[(Service\_RTD\_max+TA\_common)/slot\_duration]+/-Z, or$$

$$Koffset=[(Service\_RTD\_max+TA\_common+/-Z)/slot\_duration].$$

The terminal device may determine K_mac according to the foregoing formula (9), as shown below:

$$K\_mac=[Delay\_compensated/slot\_duration].$$

Alternatively, the terminal device may determine K_mac based on the foregoing formula (9) and the adjustment parameter Y of K_mac, as shown below:

$$K\_mac=[Delay\_compensated/slot\_duration]+/-Y, or$$

$$K\_mac=[(Delay\_compensated+/-Y)/slot\_duration].$$

The terminal device may determine RAR_window_delay 1 according to the foregoing formula (17), as shown below:

$$RAR\_window\_delay1=TA\_cal+Delay\_compensated+TA\_common.$$

Alternatively, the terminal device may determine RAR_window_delay 1 based on the formula (17) and the adjustment parameter X of RAR_window_delay, as shown below:

$$RAR\_window\_delay1=TA\_cal+Delay\_compensated+TA\_common+/-X.$$

The terminal device may determine RAR_window_delay 2 according to the foregoing formula (18), as shown below:

$$RAR\_window\_delay2 = TA\_cal + Delay\_compensated + TA\_common - TA = Delay\_compensated.$$

Alternatively, the terminal device may determine RAR_window_delay 2 based on the formula (18) and the adjustment parameter X of RAR_window_delay, as shown below:

$$RAR\_window\_delay2 = TA\_cal + Delay\_compensated + TA\_common - TA +/- X = Delay\_compensated +/- X.$$

$$TA = TA\_cal + TA\_common.$$

Embodiment 2

The network device sends K_mac, ΔKoffset, and TA_common to the terminal device. For example, the network device may determine K_mac and ΔKoffset related to a maximum round-trip delay of a service link based on the calculation relationship: $K\_mac = \lceil Delay\_compensated/slot\_duration \rceil$. For example, the network device may determine ΔKoffset based on the maximum round-trip delay of the service link Service_RTD_max. $\Delta Koffset = \lceil Service\_RTD\_max/slot\_duration \rceil$. Alternatively, Koffset is determined based on a maximum round-trip delay between the network device and a signal coverage area (a cell or a beam). $Koffset = \lceil$ the maximum round-trip delay between the network device and the signal coverage area (the cell or the beam)/slot_duration $\rceil$. Alternatively, the network device may determine Koffset based on a maximum round-trip delay between a reference point and a signal coverage area (a cell or a beam). $Koffset = \lceil$ the maximum round-trip delay between the reference point and the cell or beam coverage area/slot_duration $\rceil$, and then ΔKoffset is determined according to $\Delta Koffset = Koffset - \lceil TA\_common/slot\_duration \rceil$.

The terminal device may determine Koffset according to the foregoing formula (1), as shown below:

$$Koffset = \lceil TA\_common/slot\_duration \rceil + \Delta Koffset.$$

Alternatively, the terminal device may determine Koffset based on the foregoing formula (1) and the adjustment parameter Z of Koffset, as shown below:

$$Koffset = \lceil TA\_common/slot\_duration \rceil + \Delta Koffset +/- Z,$$
or $$Koffset = \lceil (TA\_common +/- Z)/slot\_duration \rceil + \Delta Koffset.$$

Optionally, when the terminal device and the network device obtain Koffset/K_mac based on TA_common, if TA_common is a negative number, an absolute value of TA_common may be substituted into the calculation relationship formula, and then the quantized value is subtracted. For example, for the calculation relationship: $Koffset = \lceil TA\_common/slot\_duration \rceil + \Delta Koffset$, if TA_common is negative, it can be adjusted to $Koffset = -\lceil |TA\_common|/slot\_duration \rceil + \Delta Koffset$ or $Koffset = -\lceil |TA\_common|/slot\_duration \rceil + \Delta Koffset$.

The terminal device may determine K_mac based on received K_mac and the adjustment parameter Y of K_mac.

The terminal device may determine RAR_window_delay 1 according to the foregoing formula (19), as shown below:

$$RAR\_window\_delay1 = TA\_cal + TA\_common + K\_mac*slot\_duration.$$

Alternatively, the terminal device may determine RAR_window_delay 1 based on the formula (19) and the adjustment parameter X of RAR_window_delay, as shown below:

$$RAR\_window\_delay1 = TA\_cal + TA\_common + K\_mac*slot\_duration +/- X.$$

The terminal device may determine RAR_window_delay 2 according to the foregoing formula (20), as shown below:

$$RAR\_window\_delay2 = TA\_cal + TA\_common + K\_mac*slot\_duration - TA = K\_mac*slot\_duration.$$

Alternatively, the terminal device may determine RAR_window_delay 2 based on the formula (20) and the adjustment parameter X of RAR_window_delay, as shown below:

$$RAR\_window\_delay2 = TA\_cal + TA\_common + K\_mac*slot\_duration - TA +/- X = K\_mac*slot\_duration +/- X.$$

$$TA = TA\_cal + TA\_common.$$

Embodiment 3

The network device sends Feeder_RTD, ΔKoffset, and TA_common to the terminal device. For example, the network device may determine Feeder_RTD based on a round-trip delay between a satellite and the network device, and determine ΔKoffset based on a maximum round-trip delay of a service link.

The terminal device may determine Koffset according to the foregoing formula (1), as shown below:

$$Koffset = \lceil TA\_common/slot\_duration \rceil + \Delta Koffset.$$

Alternatively, the terminal device may determine Koffset based on the foregoing formula (1) and the adjustment parameter Z of Koffset, as shown below:

$$Koffset = \lceil TA\_common/slot\_duration \rceil + \Delta Koffset +/- Z,$$
or $$Koffset = \lceil (TA\_common +/- Z)/slot\_duration \rceil + \Delta Koffset.$$

Optionally, when the terminal device and the network device obtain Koffset/K_mac based on TA_common, if TA_common is a negative number, an absolute value of TA_common may be substituted into the calculation relationship formula, and then the quantized value is subtracted. For example, for the calculation relationship: $Koffset = \lceil TA\_common/slot\_duration \rceil + \Delta Koffset$, if TA_common is negative, it can be adjusted to $Koffset = -\lceil |TA\_common|/slot\_duration \rceil + \Delta Koffset$ or $Koffset = -\lceil |TA\_common|/slot\_duration \rceil + \Delta Koffset$.

The terminal device may determine K_mac according to the foregoing formula (10), as shown below:

$$K\_mac = \lceil (Feeder\_RTD - TA\_common)/slot\_duration \rceil.$$

Alternatively, the terminal device may determine K_mac based on the formula (10) and the adjustment parameter Y of K_mac, as shown below:

$$K\_mac = \lceil (Feeder\_RTD - TA\_common)/slot\_duration \rceil +/- Y,$$ or $$K\_mac = \lceil (Feeder\_RTD - TA\_common +/- Y)/slot\_duration \rceil.$$

The terminal device may determine RAR_window_delay 1 according to the foregoing formula (21), as shown below:

$$RAR\_window\_delay1 = TA\_cal + Feeder\_RTD.$$

Alternatively, the terminal device may determine RAR_window_delay 1 based on the formula (21) and the adjustment parameter X of RAR_window_delay, as shown below:

$$RAR\_window\_delay1 = TA\_cal + Feeder\_RTD +/- X.$$

51

The terminal device may determine RAR_window_delay 2 according to the foregoing formula (22), as shown below:

$$RAR\_window\_delay2 = TA\_cal + Feeder\_RTD - TA.$$

Alternatively, the terminal device may determine RAR_window_delay 2 based on the formula (22) and the adjustment parameter X of RAR_window_delay, as shown below:

$$RAR\_window\_delay2 = TA\_cal + Feeder\_RTD - TA +/- X.$$

$$TA = TA\_cal + TA\_common.$$

Embodiment 4

The network device sends Delay_compensated, Koffset, RAR window, and TA_common to the terminal device. For example, the network device may determine Koffset based on a maximum round-trip delay Service_RTD_max between the network device and a coverage area (beam/cell). Koffset=⌈(Service_RTD_max)/slot_duration⌉, or Koffset=⌈(Service_RTD_max−Delay_compensated)/slot_duration⌉.

The terminal device may determine Koffset based on received Koffset and the adjustment parameter Z of Koffset.

The terminal device may determine K_mac according to the foregoing formula (9), as shown below:

$$K\_mac = \lceil Delay\_compensated/slot\_duration \rceil.$$

Alternatively, the terminal device may determine K_mac based on the formula (7) and the adjustment parameter Y of K_mac, as shown below:

$$K\_mac = \lceil Delay\_compensated/slot\_duration \rceil +/- Y, \text{ or}$$

$$K\_mac = \lceil (Delay\_compensated +/- Y)/slot\_duration \rceil.$$

The terminal device may determine RAR_window_delay 1 according to the foregoing formula (23), as shown below:

$$RAR\_window\_delay1 = Koffset*slot\_duration - RAR\_window.$$

Alternatively, the terminal device may determine RAR_window_delay 1 based on the formula (23) and the adjustment parameter X of RAR_window_delay, as shown below:

$$RAR\_window\_delay1 = Koffset*slot\_duration - RAR\_window +/- X, \text{ or}$$

$$RAR\_window\_delay1 = (Koffset +/- X)*slot\_duration - RAR\_window.$$

The terminal device may determine RAR_window_delay 2 according to the foregoing formula (24), as shown below:

$$RAR\_window\_delay2 = Koffset*slot\_duration - RAR\_window - TA.$$

Alternatively, the terminal device may determine RAR_window_delay 2 based on the formula (24) and the adjustment parameter X of RAR_window_delay, as shown below:

$$RAR\_window\_delay2 = Koffset*slot\_duration - RAR\_window - TA +/- X, \text{ or}$$

$$RAR\_window\_delay2 = (Koffset +/- X)*slot\_duration - RAR\_window - TA.$$

$$TA = TA\_cal + TA\_common.$$

Embodiment 5

The network device sends Delay_compensated, Service_RTD_min, TA_common, and RAR window to the terminal device.

The terminal device may determine Koffset according to the foregoing formula (2), as shown below:

$$Koffset = \lceil (Service\_RTD\_min + RAR\_window + TA\_common)/slot\_duration \rceil.$$

Alternatively, the terminal device may determine Koffset based on the formula (2) and the adjustment parameter Z of Koffset, as shown below:

$$Koffset = \lceil (Service\_RTD\_min + RAR\_window + TA\_common)/slot\_duration \rceil +/- Z, \text{ or}$$

$$Koffset = \lceil (Service\_RTD\_min + RAR\_window + TA\_common +/- Z)/slot\_duration \rceil.$$

The terminal device may determine K_mac according to the foregoing formula (9), as shown below:

$$K\_mac = \lceil Delay\_compensated/slot\_duration \rceil.$$

Alternatively, the terminal device may determine K_mac based on the formula (9) and the adjustment parameter Y of K_mac, as shown below:

$$K\_mac = \lceil Delay\_compensated/slot\_duration \rceil +/- Y, \text{ or}$$

$$K\_mac = \lceil (Delay\_compensated +/- Y)/slot\_duration \rceil.$$

The terminal device may determine RAR_window_delay 1 according to the foregoing formula (17), as shown below:

$$RAR\_window\_delay1 = TA\_cal + Delay\_compensated + TA\_common.$$

Alternatively, the terminal device may determine RAR_window_delay 1 based on the formula (17) and the adjustment parameter X of RAR_window_delay, as shown below:

$$RAR\_window\_delay1 = TA\_cal + Delay\_compensated + TA\_common +/- X.$$

Alternatively, the terminal device may determine RAR_window_delay 1 according to the foregoing formula (25), as shown below:

$$RAR\_window\_delay1 = Service\_RTD\_min + Delay\_compensated + TA\_common.$$

Alternatively, the terminal device may determine RAR_window_delay 1 based on the formula (25) and the adjustment parameter X of RAR_window_delay, as shown below:

$$RAR\_window\_delay1 = Service\_RTD\_min + Delay\_compensated + TA\_common +/- X.$$

The terminal device may determine RAR_window_delay 2 according to the foregoing formula (18), as shown below:

$$RAR\_window\_delay2 = TA\_cal + Delay\_compensated + TA\_common - TA = Delay\_compensated.$$

Alternatively, the terminal device may determine RAR_window_delay 2 based on the formula (18) and the adjustment parameter X of RAR_window_delay, as shown below:

$$RAR\_window\_delay2 = TA\_cal + Delay\_compensated + TA\_common - TA +/- X = Delay\_compensated +/- X.$$

Alternatively, the terminal device may determine RAR_window_delay 2 according to the foregoing formula (26), as shown below:

$$RAR\_window\_delay1 = Service\_RTD\_min + Delay\_compensated + TA\_common - TA = Service\_RTD\_min + Delay\_compensated - TA\_cal.$$

Alternatively, the terminal device may determine RAR_window_delay 2 based on the formula (26) and the adjustment parameter X of RAR_window_delay, as shown below:

$$RAR\_window\_delay1 = Service\_RTD\_min + Delay\_compensated + TA\_common\ TA +/- X = Service\_RTD\_min + Delay\_compensated - TA\_cal +/- X.$$

$$TA = TA\_cal + TA\_common.$$

Embodiment 6

The network device sends RAR_window_delay, Service_RTD_max, TA_common, and RAR window to the terminal device. Optionally, RAR_window_delay may indicate a related value of a minimum round-trip delay between a gateway station and a terminal device in a coverage area of the gateway station, for example, may be equal to a minimum round-trip delay value or a quantized value of the minimum round-trip delay value.

It is assumed that RAR_window_delay sent by the network device is determined in an actual timing manner, the terminal device may determine Koffset according to the foregoing formula (3) or based on the formula (3) and the adjustment parameter Z of Koffset, as shown below:

$$Koffset = \lceil (Service\_RTD\_max + TA\_common)/slot\_duration \rceil,$$

$$Koffset = \lceil (Service\_RTD\_max + TA\_common)/slot\_duration \rceil +/- Z, \text{ or}$$

$$Koffset = \lceil (Service\_RTD\_max + TA\_common +/- Z)/slot\_duration \rceil.$$

The terminal device may determine K_mac according to the foregoing formula (13) or based on the formula (13) and the adjustment parameter Y of K_mac, as shown below:

$$K\_mac = \lceil (RAR\_window + RAR\_window\_delay)/slot\_duration \rceil - \lceil (TA\_cal + TA\_common)/slot\_duration \rceil,$$

$$K\_mac = \lceil (RAR\_window + RAR\_window\_delay)/slot\_duration \rceil - \lceil (TA\_cal + TA\_common)/slot\_duration \rceil +/- Y, \text{ or}$$

$$K\_mac = \lceil (RAR\_window + RAR\_window\_delay +/- Y)/slot\_duration \rceil - \lceil (TA\_cal + TA\_common)/slot\_duration \rceil.$$

Alternatively, the terminal device may determine K_mac according to the formula (11) or based on the formula (11) and the adjustment parameter Y of K_mac, as shown below:

$$K\_mac = \lceil (RAR\_window + RAR\_window\_delay)/slot\_duration \rceil - Koffset,$$

$$K\_mac = \lceil (RAR\_window + RAR\_window\_delay)/slot\_duration \rceil - Koffset +/- Y, \text{ or}$$

$$K\_mac = \lceil (RAR\_window + RAR\_window\_delay +/- Y)/slot\_duration \rceil - Koffset.$$

Koffset in the formula (11) may be determined by the terminal device based on time parameter.

If the network device and the terminal device agree to determine RAR_window_delay in an actual timing manner, the terminal device may use RAR_window_delay sent by the network device as actually used delay start duration of the RAR window. Alternatively, the terminal device may determine accurate RAR_window delay based on the foregoing time parameters. For example, the terminal device may determine RAR_window_delay 1 according to the foregoing formula (17) or based on the formula (17) and the adjustment parameter X of RAR_window_delay, as shown below:

$$RAR\_window\_delay1 = TA\_cal + Delay\_compensated + TA\_common, \text{ or}$$

$$RAR\_window\_delay1 = TA\_cal + Delay\_compensated + TA\_common +/- X.$$

If the network device and the terminal device agree to determine RAR_window_delay in a logical timing manner, the terminal device may use a difference obtained by subtracting TA from received RAR_window_delay as the delay start duration of the RAR window, or the terminal device may use received RAR_window_delay, TA, and the adjustment parameter X of the RAR window as the delay start duration of the RAR window.

It is assumed that RAR_window_delay sent by the network device is determined in a logical manner. If the network device and the terminal device agree to determine RAR_window_delay in a logical timing manner, the terminal device may use received RAR_window_delay as actually used delay start duration of the RAR window. Alternatively, the terminal device may determine accurate RAR_window_delay based on the foregoing time parameters. For example, the terminal device may determine RAR_window_delay 2 according to the foregoing formula (18) or based on the formula (18) and the adjustment parameter X of RAR_window_delay, as shown below:

$$RAR\_window\_delay2 = TA\_cal + Delay\_compensated + TA\_common - TA = Delay\_compensated, \text{ or}$$

$$RAR\_window\_delay2 = TA\_cal + Delay\_compensated + TA\_common - TA +/- X = Delay\_compensated +/- X.$$

If the network device and the terminal device agree to determine RAR_window_delay in an actual timing manner, the terminal device may use a sum of received RAR_window_delay and TA as the delay start duration of the RAR window, or the terminal device may use received RAR_window_delay, TA, and the adjustment parameter X of the RAR window as the delay start duration of the RAR window.

$$TA = TA\_cal + TA\_common.$$

Embodiment 7

The network device sends Delay_compensated, RAR_window_delay, RAR window, and TA_common to the terminal device.

Optionally, RAR_window_delay may indicate a related value of a minimum round-trip delay between a gateway station and a terminal device in a coverage area of the gateway station, for example, may be equal to a minimum round-trip delay value or a quantized value of the minimum round-trip delay value.

It is assumed that RAR_window_delay sent by the network device is determined in an actual timing manner, the terminal device may determine Koffset according to the foregoing formula (3) or based on the formula (3) and the adjustment parameter Z of Koffset, as shown below:

$$Koffset = \lceil (Service\_RTD\_max + TA\_common)/slot\_duration \rceil,$$

$$Koffset = \lceil (Service\_RTD\_max + TA\_common)/slot\_duration \rceil +/- Z, \text{ or}$$

$$Koffset = \lceil (Service\_RTD\_max + TA\_common +/- Z)/slot\_duration \rceil.$$

Alternatively, the terminal device may determine Koffset according to the foregoing formula (4) or based on the formula (4) and the adjustment parameter Z of Koffset, as shown below:

$Koffset=[(RAR\_window+RAR\_window\_delay-Delay\_compensated)/slot\_duration]$, $Koffset=[(RAR\_window+RAR\_window\_delay-Delay\_compensated)/slot\_duration]+/-Z$, or $Koffset=[(RAR\_window+RAR\_window\_delay-Delay\_compensated+/-Z)/slot\_duration]$.

The terminal device may determine K_mac according to the foregoing formula (9) or based on the formula (9) and the adjustment parameter Y of K_mac, as shown below:

$K\_mac=[Delay\_compensated/slot\_duration]$, $K\_mac=[Delay\_compensated/slot\_duration]+/-Y$, or $K\_mac=[(Delay\_compensated+/-Y)/slot\_duration]$.

If the network device and the terminal device agree to determine RAR_window_delay in an actual timing manner, the terminal device may use RAR_window_delay sent by the network device as actually used delay start duration of the RAR window. Alternatively, the terminal device may determine accurate RAR_window_delay based on the foregoing time parameters. For example, the terminal device may determine RAR_window_delay 1 according to the foregoing formula (17) or based on the formula (17) and the adjustment parameter X of RAR_window_delay, as shown below:

$RAR\_window\_delay1=TA\_cal+Delay\_compensated+TA\_common$, or $RAR\_window\_delay1=TA\_cal+Delay\_compensated+TA\_common+/-X$.

If the network device and the terminal device agree to determine RAR_window_delay in a logical timing manner, the terminal device may use a difference obtained by subtracting TA from received RAR_window_delay as the delay start duration of the RAR window, or the terminal device may use received RAR_window_delay, TA, and the adjustment parameter X of the RAR window as the delay start duration of the RAR window.

It is assumed that RAR_window_delay sent by the network device is determined in a logical manner. If the network device and the terminal device agree to determine RAR_window_delay in a logical timing manner, the terminal device may use received RAR_window_delay as actually used delay start duration of the RAR window. Alternatively, the terminal device may determine accurate RAR_window_delay based on the foregoing time parameters. For example, the terminal device may determine RAR_window_delay 2 according to the foregoing formula (18) or based on the formula (18) and the adjustment parameter X of RAR_window_delay, as shown below:

$RAR\_window\_delay2=TA\_cal+Delay\_compensated+TA\_common-TA=Delay\_compensated$, or $RAR\_window\_delay2=TA\_cal+Delay\_compensated+TA\_common-TA+/-X=Delay\_compensated+/-X$.

If the network device and the terminal device agree to determine RAR_window_delay in an actual timing manner, the terminal device may use a sum of received RAR_window_delay and TA as the delay start duration of the RAR window, or the terminal device may determine the delay start duration of the RAR window based on received RAR_window_delay, TA, and the adjustment parameter X of the RAR window.

$TA=TA\_cal+TA\_common$.

Embodiment 8

The network device sends K_mac, RAR_window_delay, TA_common, and RAR window to the terminal device.

It is assumed that RAR_window_delay sent by the network device is determined in an actual timing manner, the terminal device may determine Koffset according to the foregoing formula (5) or based on the formula (5) and the adjustment parameter Z of Koffset, as shown below:

$Koffset=[(RAR\_window+RAR\_window\_delay)/slot\_duration]$, $Koffset=[(RAR\_window+RAR\_window\_delay)/slot\_duration]+/-Z$, or $Koffset=[(RAR\_window+RAR\_window\_delay+/-Z)/slot\_duration]$.

Alternatively, the terminal device may determine Koffset according to the foregoing formula (6) or based on the formula (6) and the adjustment parameter Z of Koffset, as shown below:

$Koffset=[(RAR\_window+RAR\_window\_delay)/slot\_duration]-K\_mac$, $Koffset=[(RAR\_window+RAR\_window\_delay)/slot\_duration]-K\_mac+/-X$, or $Koffset=[(RAR\_window+RAR\_window\_delay+/-X)/slot\_duration]-K\_mac$.

The terminal device may determine K_mac based on the received K_mac and an adjustment parameter Y of K_mac.

If the network device and the terminal device agree to determine RAR_window_delay in an actual timing manner, the terminal device may use RAR_window_delay sent by the network device as actually used delay start duration of the RAR window. Alternatively, the terminal device may determine accurate RAR_window_delay based on the foregoing time parameters. For example, the terminal device may determine RAR_window_delay 1 according to the formula (19) or based on the formula (19) and the adjustment parameter X of RAR_window_delay, as shown below:

$RAR\_window\_delay1=TA\_cal+TA\_common+K\_mac*slot\_duration$, $RAR\_window\_delay1=TA\_cal+TA\_common+K\_mac*slot\_duration+/-X$, or $RAR\_window\_delay1=TA\_cal+TA\_common+(K\_mac+/-X)*slot\_duration$.

If the network device and the terminal device agree to determine RAR_window_delay in a logical timing manner, the terminal device may use a difference obtained by subtracting TA from received RAR_window_delay as the delay start duration of the RAR window, or the terminal device may use received RAR_window_delay, TA, and the adjustment parameter X of the RAR window as the delay start duration of the RAR window.

It is assumed that RAR_window_delay sent by the network device is determined in a logical manner. If the network device and the terminal device agree to determine RAR_window_delay in a logical timing manner, the terminal device may use received RAR_window_delay as actually used delay start duration of the RAR window. Alternatively, the terminal device may determine accurate RAR_window_delay based on the foregoing time parameters. For example, the terminal device may determine RAR_window_delay 2 according to the formula (20) or based on the formula (20) and the adjustment parameter X of RAR_window_delay, as shown below:

$$RAR\_window\_delay2 = TA\_cal + TA\_common + K\_mac * slot\_duration - TA = K\_mac * slot\_duration,$$

$$RAR\_window\_delay2 = TA\_cal + TA\_common + K\_mac * slot\_duration - TA + /- X = K\_mac * slot\_duration + /- X, \text{ or}$$

$$RAR\_window\_delay2 = TA\_cal + TA\_common + (K\_mac + /- X) * slot\_duration - TA = (K\_mac + /- X) * slot\_duration.$$

If the network device and the terminal device agree to determine RAR_window_delay in an actual timing manner, the terminal device may use a sum of received RAR_window_delay and TA as the delay start duration of the RAR window, or the terminal device may use received RAR_window_delay, TA, and the adjustment parameter X of the RAR window as the delay start duration of the RAR window.

$$TA = TA\_cal + TA\_common.$$

Embodiment 9

The network device sends ΔKoffset, RAR_window_delay, TA_common, and RAR window to the terminal device.

It is assumed that RAR_window_delay sent by the network device is determined in an actual timing manner, the terminal device may determine Koffset according to the foregoing formula (1) or based on the formula (1) and the adjustment parameter Z of Koffset, as shown below:

$$Koffset = \lceil TA\_common/slot\_duration \rceil + \Delta Koffset,$$

$$Koffset = \lceil TA\_common/slot\_duration + /- Z \rceil + \Delta Koffset, \text{ or}$$

$$Koffset = \lceil TA\_common/slot\_duration \rceil + \Delta Koffset + /- Z.$$

The terminal device may determine K_mac according to the foregoing formula (11) or based on the formula (11) and the adjustment parameter Y of K_mac, as shown below:

$$K\_mac = \lceil (RAR\_window + RAR\_window\_delay)/slot\_duration \rceil - Koffset,$$

$$K\_mac = \lceil (RAR\_window + RAR\_window\_delay)/slot\_duration \rceil - Koffset + /- Y, \text{ or}$$

$$K\_mac = \lceil (RAR\_window + RAR\_window\_delay + /- Y)/slot\_duration \rceil - Koffset.$$

If the network device and the terminal device agree to determine RAR_window_delay in a logical timing manner, the terminal device may use a difference obtained by subtracting TA from received RAR_window_delay as the delay start duration of the RAR window, or the terminal device may use received RAR_window_delay, TA, and the adjustment parameter X of the RAR window as the delay start duration of the RAR window.

It is assumed that RAR_window_delay sent by the network device is determined in a logical manner. If the network device and the terminal device agree to determine RAR_window_delay in a logical timing manner, the terminal device may use received RAR_window_delay as actually used delay start duration of the RAR window. Alternatively, the terminal device may determine accurate RAR_window_delay based on the foregoing time parameters. For example, the terminal device may determine RAR_window_delay 2 according to the formula (20) or based on the formula (20) and the adjustment parameter X of RAR_window_delay, as shown below:

$$RAR\_window\_delay2 = TA\_cal + TA\_common + K\_mac * slot\_duration - TA = K\_mac * slot\_duration,$$

$$RAR\_window\_delay2 = TA\_cal + TA\_common + K\_mac * slot\_duration - TA + /- X = K\_mac * slot\_duration + /- X, \text{ or}$$

$$RAR\_window\_delay2 = TA\_cal + TA\_common + (K\_mac + /- X) * slot\_duration - TA = (K\_mac + /- X) * slot\_duration.$$

If the network device and the terminal device agree to determine RAR_window_delay in an actual timing manner, the terminal device may use a sum of received RAR_window_delay and TA as the delay start duration of the RAR window, or the terminal device may use received RAR_window_delay, TA, and the adjustment parameter X of the RAR window as the delay start duration of the RAR window.

$$TA = TA\_cal + TA\_common.$$

Embodiment 10

The network device sends RAR_window_delay, TA_common, and RAR window to the terminal device.

If RAR_window_delay sent by the network device is determined in an actual timing manner, the terminal device may determine Koffset according to the foregoing formula (5) or based on the formula (5) and the adjustment parameter Z of Koffset, as shown below:

$$Koffset = \lceil (RAR\_window + RAR\_window\_delay)/slot\_duration \rceil,$$

$$Koffset = \lceil (RAR\_window + RAR\_window\_delay)/slot\_duration \rceil + /- Z, \text{ or}$$

$$Koffset = \lceil (RAR\_window + RAR\_window\_delay + /- Z)/slot\_duration \rceil.$$

The terminal device may determine K_mac according to the foregoing formula (11) or based on the formula (11) and the adjustment parameter Y of K_mac, as shown below:

$$K\_mac = \lceil (RAR\_window + RAR\_window\_delay)/slot\_duration \rceil - Koffset,$$

$$K\_mac = \lceil (RAR\_window + RAR\_window\_delay)/slot\_duration \rceil - Koffset + /- Y, \text{ or}$$

$$K\_mac = \lceil (RAR\_window + RAR\_window\_delay + /- Y)/slot\_duration \rceil - Koffset.$$

Alternatively, the terminal device may determine K_mac according to the foregoing formula (12) or based on the formula (12) and the adjustment parameter Y of K_mac, as shown below:

$$K\_mac = Koffset - \lceil (TA\_cal + TA\_common)/slot\_duration \rceil,$$

$$K\_mac = Koffset - \lceil (TA\_cal + TA\_common)/slot\_duration \rceil + /- Y, \text{ or}$$

$$K\_mac = Koffset - \lceil (TA\_cal + TA\_common + /- Y)/slot\_duration \rceil.$$

Alternatively, the terminal device may determine K_mac according to the foregoing formula (13) or based on the formula (13) and the adjustment parameter Y of K_mac, as shown below:

$$K\_mac=[(RAR\_window+RAR\_window\_delay)/slot\_duration]-[(TA\_cal+TA\_common)/slot\_duration],$$

$$K\_mac=[(RAR\_window+RAR\_window\_delay)/slot\_duration]-[(TA\_cal+TA\_common)/slot\_duration]+/-Y, \text{ or}$$

$$K\_mac=[(RAR\_window+RAR\_window\_delay+/-Y)/slot\_duration]-[(TA\_cal+TA\_common)/slot\_duration].$$

$$TA=TA\_cal+TA\_common.$$

It is assumed that RAR_window_delay sent by the network device is determined in a logical manner. If the network device and the terminal device agree to determine RAR_window_delay in a logical timing manner, the terminal device may use received RAR_window_delay as actually used delay start duration of the RAR window. Alternatively, the terminal device may determine accurate RAR_window_delay based on the foregoing time parameters. If the network device and the terminal device agree to determine RAR_window_delay in an actual timing manner, the terminal device may use a sum of received RAR_window_delay and TA as the delay start duration of the RAR window, or the terminal device may use received RAR_window_delay, TA, and the adjustment parameter X of the RAR window as the delay start duration of the RAR window.

Embodiment 11

It may be considered that RAR_window_delay in the time parameters in the foregoing embodiments 1 to 10 is determined in the actual timing manner. In the embodiment 11, it may be considered that RAR_window_delay in the time parameter is determined in the logical timing manner. For ease of differentiation, RAR_window_delay sent by the network device may be referred to as RAR_window_delay'. RAR_window_delay' may be determined by the network device based on a delay compensation value performed on a signal from the terminal device. For example, RAR_window_delay' may be equal to the delay compensation value Delay_compensated, or considering impact of a processing delay and a transmission delay on accuracy of data, RAR_window_delay may be obtained by adding an offset value to the delay compensation value. For example, $$RAR\_window\_delay'=\text{delay compensation value.}$$

$$RAR\_window\_delay'=\text{delay compensation value}+\text{offset value.}$$

The offset value is a real number, for example, 1, 1.5, –2, or 0. The offset value may be determined by the network device, and a calculation result of delay compensation value+offset value is sent to the terminal device as RAR_window_delay', or may be configured by the network device for the terminal device, or may be agreed in a protocol. The terminal device receives RAR_window_delay' and adds RAR_window_delay' to the offset value to obtain corrected/updated RAR_window_delay. For example, the terminal device may use the corrected/updated RAR_window_delay as actually used RAR_window_delay.

RAR_window_delay' that may be sent by the network device to the terminal device may also be a quantized value. For example, $$RAR\_window\_delay'=[(\text{delay compensation value}+\text{offset value})/slot\_duration], \text{ or}$$

$$RAR\_window\_delay'=[(\text{delay compensation value})/slot\_duration].$$

slot_duration indicates a quantization unit. After receiving RAR_window_delay', the terminal device multiplies RAR_window_delay' by the quantization unit to obtain RAR_window_delay' sent by the network device to the terminal device.

If RAR_window_delay' sent by the network device to the terminal device is defined to be determined in a logical timing manner, after the terminal device receives RAR_window_delay', when determining the delay start duration of the RAR window to be used by the terminal device, the terminal device may determine, based on different understandings of a start moment of RAR window, corresponding to-be-used delay start duration of the RAR window based on RAR_window_delay' sent by the network device to the terminal device.

(1) The terminal device uses actual timing as the start moment of the RAR window:

$$RAR\_window\_delay1=TA\_cal+TA\_common+RAR\_window\_delay',$$

$$RAR\_window\_delay1=TA\_cal+TA\_common+RAR\_window\_delay'-/+X,$$

$$RAR\_window\_delay1=TA+RAR\_window\_delay', \text{ or}$$

$$RAR\_window\_delay1=TA+RAR\_window\_delay'-/+X.$$

(2) The terminal device uses logical timing as the start moment of the RAR window:

$$RAR\_window\_delay1=RAR\_window\_delay', \text{ or}$$

$$RAR\_window\_delay1=RAR\_window\_delay'-/+X.$$

It should be noted that, if RAR_window_delay' is related to the delay compensation value, a calculation relationship of determining Koffset, K_mac, and the like based on RAR_window_delay' sent by the network device in the cases 1 to 17 needs to be changed.

For example, in the embodiment 4 or 9, the calculation relationship: K_mac=[(RAR_window+RAR_window_delay)/slot_duration]−Koffset can be changed to K_mac=[RAR_window_delay/slot_duration].

For another example, in the embodiment 7, it is determined that the calculation relationship: Koffset=[(RAR_window+RAR_window_delay−Delay_compensated)/slot_duration] cannot be satisfied. Therefore, if RAR_window_delay sent by the network device is determined in the logical timing manner, the calculation relationship cannot be used.

For still another example, in the embodiment 9, it is determined that the calculation relationship: Koffset=[(RAR_window+RAR_window_delay)/slot_duration] cannot be satisfied. Therefore, if RAR_window_delay sent by the network device is determined in the logical timing manner, the calculation relationship cannot be used.

For yet another example, in the embodiment 9, it is determined that the calculation relationship: K_mac=Koffset−[(TA_cal+TA_common)/slot_duration] may be changed to K_mac=[RAR_window_delay/slot_duration].

For embodiments in which the network device sends Delay_compensated to the terminal device in the embodiments 1 to 10, if the terminal device is limited to determine the actually used RAR_window_delay in the logical timing manner, the terminal device may determine RAR_window_delay according to the following formula:

$$RAR\text{\_window\_delay}=Delay\text{\_compensated, or}$$

$$RAR\text{\_window\_delay}=Delay\text{\_compensated}+offset \text{ value.}$$

Optionally, if the network device updates RAR_window_delay', the terminal device or the network device also determines updated K_mac according to the foregoing calculation relationship.

Optionally, when the terminal device or the network device determines, based on K_mac_thresh, whether the condition for updating K_mac is met, if |the updated K_mac−K_mac before update|≥K_mac_thresh is not satisfied, K_mac before update continues to be used. The terminal device may perform a determining operation after RAR_window_delay' is updated.

In addition, in the foregoing method for determining Koffset, K_mac, and the like based on Delay_compensated, Delay_compensated in the formula may be replaced with RAR_window_delay' sent by the network device to the terminal device. For example, in the foregoing embodiments 4, 5, and 7, the calculation relationship: K_mac=⌈Delay_compensated/slot_duration⌉ may be replaced with K_mac=⌈RAR_window_delay'/slot_duration⌉. In other words, the network device does not need to additionally send Delay_compensated to the terminal device, to avoid additional signaling overheads.

In the foregoing technical solution, the reference point may be at any location. For example, the reference point may be on a service link, a feeder link, a satellite, or a gateway station.

Figure 17:
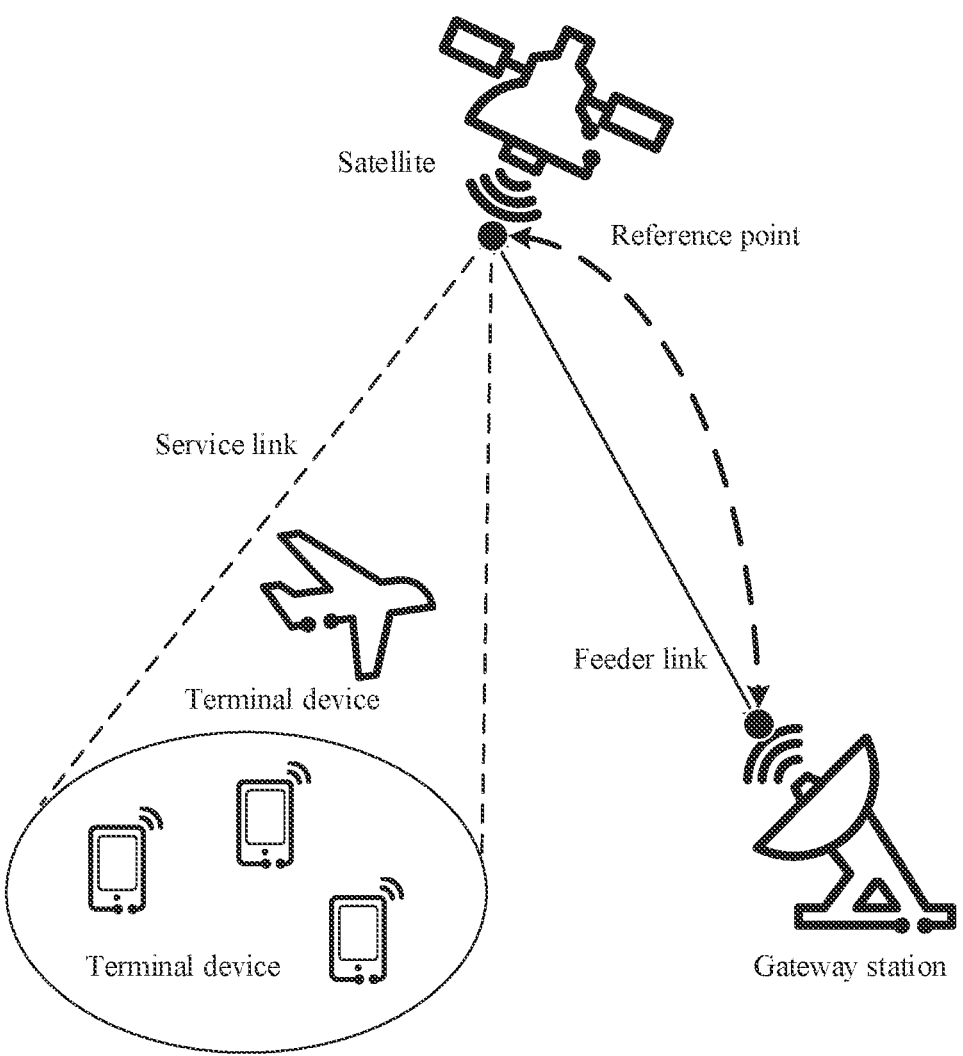
FIG. 17 is a schematic diagram of a location of a reference point according to an embodiment of this application.

In a possible implementation, if the reference point may be on the satellite or gateway station, as shown in FIG. 17, when the reference point is on the satellite or the gateway station, there are the following two possibilities when the terminal device determines a used timing advance value TA.

(1) When the reference point is on the satellite, TA=TA_cal. A TA_common value does not need to be added.

(2) When the reference point is on the gateway station, TA=TA_cal+TA_common. The TA_common value needs to be added.

In other words, when the reference point is on the satellite, the common timing advance value TA_common=0. When the reference point is on the base station, the common timing advance value TA_common=Feeder_RTD.

Therefore, to further reduce signaling overheads, two values: TA_common and Feeder_RTD may be jointly indicated. Timing_common may be introduced. Timing_common may be determined according to a round-trip delay of the feeder link. For example, Timing_common may be equal to Feeder_RTD or a sum of Feeder_RTD and a difference. The difference herein may be set by considering impact of a positioning error, a processing delay, a quantization error, and/or the like.

The network device may send Timing_common and indication information to the terminal device. The indication information herein may be a bit sequence, for example, signaling whose length is a length of a 1-bit sequence. A relationship between a value of the bit sequence and an indication of the indication information may be specified in a communication protocol, or may be sent by the network device to the terminal device. Alternatively, the indication information may be an identifier, and a relationship between the identifier and the indication of the indication information may be specified in a communication protocol, or may be sent by the network device to the terminal device.

In an example, that the indication information is a bit sequence is used as an example. When the value of the bit sequence is "0", the indication information may indicate that the reference point is at or near a satellite, indicate that the network device compensates for the round-trip delay of the feeder link, indicate that Timing_common does not need to be added when the terminal device determines TA, indicate that the round-trip delay of the feeder link does not need to be added when the terminal device determines TA, indicate the terminal device to determine K_mac based on Timing_common, or indicate the terminal device to determine K_mac based on the round-trip delay of the feeder link.

Optionally, the network device may further send another time parameter other than TA_common and Feeder_RTD in the cases 1 to 17 to the terminal device, so that the terminal device determines one or more of Koffset, K_mac, and RAR_window_delay based on the time parameter.

The following uses an example in which the network device sends Timing_common, indication information, and ΔKoffset to the terminal device for description.

The terminal device may determine RAR_window_delay according to the following formula:

$$RAR\text{\_window\_delay1}=TA\text{\_cal}+Timing\text{\_common, or}$$

$$RAR\text{\_window\_delay1}=TA\text{\_cal}+Timing\text{\_common}+/-X, \text{ and}$$

$$RAR\text{\_window\_delay2}=TA\text{\_cal}+Timing\text{\_common}- TA=Timing\text{\_common, or}$$

$$RAR\text{\_window\_delay2}=TA\text{\_cal}+Timing\text{\_common}- TA+/-X=Timing\text{\_common}+/-X.$$

The terminal device may determine K_mac according to the following formula:

$$K\text{\_mac}=⌈Timing\text{\_common/slot\_duration}⌉,$$

$$K\text{\_mac}=⌈Timing\text{\_common/slot\_duration}⌉+/-Y, \text{ or}$$

$$K\text{\_mac}=⌈(Timing\text{\_common}+/-Y)/slot\text{\_duration}⌉.$$

The terminal device may determine Koffset according to the following formula:

$$K\text{offset}=\Delta K\text{offset, or}$$

$$K\text{offset}=\Delta K\text{offset}+/-Z.$$

The terminal device may determine TA according to the following formula:

$$TA=TA\text{\_cal.}$$

In another example, that the indication information is a bit sequence is used as an example. When the value of the bit sequence is "1", the indication information may indicate that the reference point is at a gateway station, indicate that the network device does not compensate for the round-trip delay of the feeder link, indicate that Timing_common needs to be added when the terminal device determines TA, or indicate that a K_mac value is equal to 0 or a small value, for example, a small integer value. When the terminal device receives delay compensation indication signaling TA_indi that indicates the foregoing case, the terminal device may determine K_mac and TA according to the following calculation relationship.

Optionally, the network device may further send another time parameter other than TA_common and Feeder_RTD in the cases 1 to 17 to the terminal device, so that the terminal device determines one or more of Koffset, K_mac, and RAR_window_delay based on the time parameter.

The following uses an example in which the network device sends Timing_common, indication information, and ΔKoffset to the terminal device for description.

The terminal device may determine RAR_window_delay according to the following formula:

$$RAR\_window\_delay1 = TA\_cal + Timing\_common, \text{ or}$$

$$RAR\_window\_delay1 = TA\_cal + Timing\_common +/-X,$$
and $$RAR\_window\_delay2 = TA\_cal + Timing\_common - TA = 0, \text{ or}$$

$$RAR\_window\_delay2 = TA\_cal + Timing\_common - TA +/-X = X.$$

The terminal device may determine K_mac according to the following formula:

$$K\_mac = 0, \text{ or}$$

K_mac is equal to a small value, for example, 1, 2, or 3. For another example, K_mac=Y The terminal device may determine Koffset according to the following formula:

$$Koffset = \lceil Timing\_common/slot\_duration \rceil + \Delta Koffset,$$

$$Koffset = \lceil Timing\_common/slot\_duration \rceil + \Delta Koffset +/-Z, \text{ or}$$

$$Koffset = \lceil (Timing\_common +/-Z)/slot\_duration \rceil + \Delta Koffset.$$

The terminal device may determine TA according to the following formula:

$$TA = TA\_cal + Timing\_common.$$

Based on the foregoing solution, the network device may jointly indicate TA_common and Feeder_RTD based on Timing_common and the indication information, to further reduce signaling overheads.

In addition, it should be noted that information such as the common timing value Timing_common, the indication information, and the time unit/duration unit may be sent together with the time parameter in a manner of being carried in the first information. For related descriptions, refer to the step 1401. Details are not described herein again.

In another possible implementation, the network device may implicitly indicate an indication of the indication information. For example, if Timing_common received by the terminal device from the network device indicates a K_mac value, it may indicate that K_mac is determined based on Timing_common, and implicitly indicates that the network device compensates for the round-trip delay of the feeder link. If Timing_common received by the terminal device from the network device does not indicate K_mac or is not equal to K_mac, it may indicate that K_mac is not determined based on Timing_common, and implicitly indicates that the network device does not compensate for the round-trip delay of the feeder link.

For example, the network device may send Timing_common or K_mac to indicate the foregoing two cases. The network device may send Timing_common to the terminal device, to implicitly indicate that the network device does not compensate for the round-trip delay of the feeder link. The network device may send K_mac to the terminal device, to implicitly indicate that the network device compensates for the round-trip delay of the feeder link. Therefore, if the terminal device receives Timing_common or K_mac from the network device, the terminal device determines whether the network device compensates for the round-trip delay of the feeder link, to determine Koffset, K_mac, and RAR_window_delay.

In an example, the network device may indicate, by using the following two pieces of signaling, whether Timing_common is the same as K_mac.

K_mac INTEGER (0, 127) OPTIONAL, and

Timing_common INTEGER (−1024, 1024) OPTIONAL.

The network device may send K_mac signaling or Timing_common signaling to the terminal device based on actual network deployment and a working mode. The K_mac signaling indicates the second timing offset that resolves an insufficient timing delay for the network device to take effect of a downlink configuration. Timing_common indicates the round-trip delay of the feeder link, or a parameter value determined based on the round-trip delay of the feeder link. The terminal device may determine RAR_window_delay, Koffset, and TA based on Timing_common.

For example, when the network device performs delay compensation on a received signal sent by the terminal device, the network device may send K_mac to the terminal device, and does not send Timing_common signaling. If the network device does not perform delay compensation on the received signal sent by the terminal device, the network device may send Timing_common to the terminal device, and does not send K_mac signaling. After receiving K_mac or the Timing_common signaling, the terminal device may determine whether the network device performs delay compensation on the uplink signal, and determine RAR_window_delay, K_mac, Koffset and a TA parameter value based on different cases and the foregoing method.

The foregoing signaling form is merely an example, and the numbers are merely examples. A representation range of K_mac and a quantity of used information bits may be determined based on an actual network deployment status, such as satellite orbital altitude, a minimum communication elevation angle, and a beam/cell size, and a possible maximum delay compensation value performed by the network device on the received uplink signal. A representation range of Timing_common and a quantity of used information bits may be determined based on a possible maximum round-trip delay between a satellite and the network device.

The following uses an example in which the network device sends ΔKoffset and K_mac to the terminal device but does not send Timing_common signaling for description.

The terminal device may determine RAR_window_delay according to the following formula:

$$RAR\_window\_delay1 = TA\_cal + Timing\_common, \text{ or}$$

$$RAR\_window\_delay1 = TA\_cal + Timing\_common +/-X,$$
and $$RAR\_window\_delay2 = TA\_cal + Timing\_common - TA = Timing\_common, \text{ or}$$

$$RAR\_window\_delay2 = TA\_cal + Timing\_common - TA +/-X = Timing\_common +/-X.$$

The terminal device may determine K_mac according to the following formula:

$$K\_mac=\lceil Timing\_common/slot\_duration \rceil,$$

$$K\_mac=\lceil Timing\_common/slot\_duration \rceil+/-Y, \text{ or}$$

$$K\_mac=\lceil (Timing\_common+/-Y)/slot\_duration \rceil.$$

The terminal device may determine Koffset according to the following formula:

$$Koffset=\Delta Koffset, \text{ or}$$

$$Koffset=\Delta Koffset+/-Z.$$

The terminal device may determine TA according to the following formula:

$$TA=TA\_cal.$$

The following uses an example in which the network device sends ΔKoffset and Timing_common to the terminal device but does not send K_mac signaling for description.

The terminal device may determine RAR_window_delay according to the following formula:

$$RAR\_window\_delay1=TA\_cal+Timing\_common, \text{ or}$$

$$RAR\_window\_delay1=TA\_cal+Timing\_common+/-X,$$
and $$RAR\_window\_delay2=TA\_cal+Timing\_common-TA=0, \text{ or}$$

$$RAR\_window\_delay2=TA\_cal+Timing\_common-TA+/-X=X.$$

The terminal device may determine K_mac according to the following formula:

$$K\_mac=0, \text{ or}$$

K_mac is equal to a small value, for example, 1, 2, or 3. For another example, K_mac=Y The terminal device may determine Koffset according to the following formula:

$$Koffset=\lceil Timing\_common/slot\_duration \rceil+\Delta Koffset,$$

$$Koffset=\lceil Timing\_common/slot\_duration \rceil+\Delta Koffset+/-Z, \text{ or}$$

$$Koffset=\lceil (Timing\_common+/-Z)/slot\_duration \rceil+\Delta Koffset.$$

The terminal device may determine TA according to the following formula:

$$TA=TA\_cal+Timing\_common.$$

Based on the foregoing solution, the network device can implicitly indicate, to the terminal device, whether to compensate for the feeder link, to save transmission resources.

Figure 18:
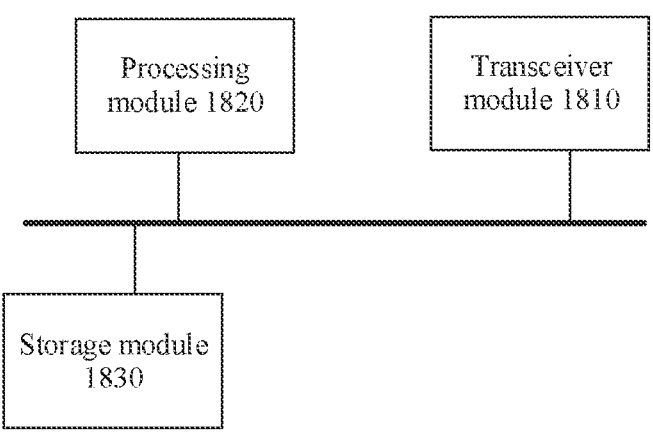
FIG. 18 is a schematic diagram of a communication apparatus according to an embodiment of this application.

Based on a same technical concept as the foregoing method, as shown in FIG. 18, an apparatus 1800 is provided. The apparatus 1800 can perform the steps performed by the terminal device side and the network device side in the foregoing method. To avoid repetition, details are not described herein again.

The apparatus 1800 includes a transceiver module 1810 and a processing module 1820, and optionally, further includes a storage module 1830. The processing module 1820 may be separately connected to the storage module 1830 and the transceiver module 1810. The storage module 1830 may also be connected to the transceiver module 1810. The processing module 1820 may be integrated with the storage module 1830. The transceiver module 1810 may also be referred to as a transceiver, a transceiver machine, a transceiver apparatus, or the like. The processing module 1820 may also be referred to as a processor, a processing board, a processing module, a processing apparatus, or the like. Optionally, a component that is in the transceiver module 1810 and that is configured to implement a receiving function may be considered as a receiving unit, and a component that is in the transceiver module 1810 and that is configured to implement a sending function may be considered as a sending unit. In other words, the transceiver module 1810 includes the receiving unit and the sending unit. The transceiver module sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver module 1810 is configured to perform sending and receiving operations on the terminal device side and the network device side in the foregoing method embodiment, and the processing module 1820 is configured to perform an operation other than the sending and receiving operations on the terminal device side and the network device side in the foregoing method embodiment. For example, in an implementation, the transceiver module 1810 is configured to perform the receiving operation on the terminal device side or the sending operation on the network device side in the step 1401 in FIG. 14, and/or the transceiver module 1810 is further configured to perform other receiving and sending steps on the terminal device side and the network device side in embodiments of this application. The processing module 1820 is configured to perform the processing step on the terminal device side in the step 1402 in FIG. 14, and/or the processing module 1820 is configured to perform other processing steps on the terminal device side and the network device side in embodiments of this application.

The storage module 1830 is configured to store a computer program.

For example, when the apparatus 1800 performs the steps performed by the terminal device in the foregoing method, the transceiver module 1810 is configured to receive first information. The first information may include a time parameter. For related descriptions, refer to the method embodiment shown in FIG. 14. Details are not described herein again.

In a design, the processing module 1820 is configured to determine a timing offset based on the time parameter. Specifically, the processing module 1820 may be configured to determine at least one of a first timing offset and a second timing offset. Optionally, the processing module 1820 may be further configured to determine delay start duration of a RAR window.

In a design, the time parameter includes a difference of the first timing offset and a common timing advance value TA_common, and the TA_common is a parameter determined based on a round-trip delay between a satellite and a reference point. The processing module 1820 is specifically configured to determine the first timing offset based on the difference of the first timing offset and the TA_common.

In a design, the time parameter includes a minimum round-trip delay parameter Service_RTD_min of a service link between a satellite and an area covered by the satellite, a common timing advance value TA_common, and duration of the RAR window, and the TA_common is a parameter determined based on a round-trip delay between the satellite and a reference point. The processing module 1820 is specifically configured to determine the first timing offset based on the Service_RTD_min, the TA_common, and the duration of the RAR window.

In a design, the time parameter includes a maximum round-trip delay parameter Service_RTD_max of a service link between a satellite and an area covered by the satellite and a common timing advance value TA_common, and the TA_common is a parameter determined based on a round-trip delay between the satellite and a reference point. The processing module 1820 is specifically configured to determine the first timing offset based on the Service_RTD_max and the TA_common.

In a design, the time parameter includes duration of the RAR window, the delay start duration of the RAR window, and a round-trip delay parameter Delay_compensated between a reference point and a network device. The processing module 1820 is specifically configured to determine the first timing offset based on the duration of the RAR window, the delay start duration of the RAR window, and the Delay_compensated.

In a design, the time parameter includes duration of the RAR window and the delay start duration of the RAR window. The processing module 1820 is specifically configured to determine the first timing offset based on the duration of the RAR window and the delay start duration of the RAR window.

In a design, the time parameter includes duration of the RAR window, the delay start duration of the RAR window, and the second timing offset. The processing module 1820 is specifically configured to determine the first timing offset based on the duration of the RAR window, the delay start duration of the RAR window, and the second timing offset.

In a design, the processing module 1820 is specifically configured to determine the first timing offset based on the time parameter and an adjustment parameter of the first timing offset. The adjustment parameter of the first timing offset is preset or is indicated by the network device.

In a design, the time parameter includes a round-trip delay parameter Delay_compensated between a reference point and a network device. The processing module 1820 is specifically configured to determine the second timing offset based on the Delay_compensated.

In a design, the time parameter includes a round-trip delay parameter Feeder_RTD between a satellite and a network device and a common timing advance TA_common, and the TA_common is determined based on a round-trip delay parameter between the satellite and a reference point. The processing module 1820 is specifically configured to determine the second timing offset based on the Feeder_RTD and the TA_common.

In a design, the time parameter includes duration of the RAR window, the delay start duration of the RAR window, and the first timing offset. The processing module 1820 is specifically configured to determine the second timing offset based on the duration of the RAR window, the delay start duration of the RAR window, and the first timing offset.

In a design, the time parameter includes the first timing offset and a common timing advance value TA_common, and the TA_common is determined based on a round-trip delay parameter between a satellite and a reference point. The processing module 1820 is further configured to determine a round-trip delay parameter TA_cal of a service link based on location information of the satellite. The processing module 1820 is specifically configured to determine the second timing offset based on the first timing offset, the TA_cal, and the TA_common.

In a design, the time parameter includes duration of the RAR window, the delay start duration of the RAR window, and a common timing advance value TA_common, and the TA_common is determined based on a round-trip delay parameter between a satellite and a reference point. The processing module 1820 is further configured to determine a round-trip delay parameter TA_cal of a service link based on location information of the satellite. The processing module 1820 is specifically configured to determine the second timing offset based on the duration of the RAR window, the delay start duration of the RAR window, the TA_cal, and the TA_common.

In a design, the processing module 1820 is further configured to determine the second timing offset based on the time parameter and an adjustment parameter of the second timing offset. The adjustment parameter of the second timing offset is preset or is indicated by the network device.

In a design, the delay start duration of the RAR window includes first delay start duration of the RAR window. The time parameter includes the round-trip delay parameter Delay_compensated between the reference point and the network device and the common timing advance value TA_common, and the TA_common is determined based on the round-trip delay parameter between the satellite and the reference point. The processing module 1820 is further configured to determine the round-trip delay parameter TA_cal of the service link based on the location information of the satellite. The processing module 1820 is specifically configured to determine the first delay start duration of the RAR window based on the TA_cal, the TA_common, and the Delay_compensated.

In a design, the delay start duration of the RAR window includes first delay start duration of the RAR window. The time parameter includes the second timing offset and the common timing advance value TA_common, and the TA_common is determined based on the round-trip delay parameter between the satellite and the reference point. The processing module 1820 is further configured to determine the round-trip delay parameter TA_cal of the service link based on the location information of the satellite. The processing module 1820 is specifically configured to determine the first delay start duration of the RAR window based on the TA_cal, the TA_common, and the second timing offset.

In a design, the delay start duration of the RAR window includes first delay start duration of the RAR window. The time parameter includes the round-trip delay parameter Feeder_RTD between the satellite and the network device. The processing module 1820 is further configured to determine the round-trip delay parameter TA_cal of the service link based on the location information of the satellite. The processing module 1820 is specifically configured to determine the first delay start duration of the RAR window based on the TA_cal and the Feeder_RTD.

In a design, the delay start duration of the RAR window includes first delay start duration of the RAR window. The time parameter includes the first timing offset and the duration of the RAR window. The processing module 1820 is further configured to determine the first delay start duration of the RAR window based on the first timing offset and the duration of the RAR window.

In a design, the delay start duration of the RAR window includes first delay start duration of the RAR window. The time parameter includes the minimum round-trip delay parameter Service_RTD_min of the service link between the satellite and the area covered by the satellite and the round-trip delay parameter Delay_compensated between the reference point and the network device. The processing module 1820 is specifically configured to determine the first delay start duration of the RAR window based on the Service_RTD_min and the Delay_compensated.

In a design, the processing module 1820 is specifically configured to determine the first delay start duration of the RAR window based on the time parameter and an adjustment parameter of the delay start duration of the RAR window. The adjustment parameter of the delay start duration of the RAR window is preset or is indicated by the network device.

In a design, the delay start duration of the RAR window includes second delay start duration of the RAR window. The processing module 1820 is specifically configured to determine the second delay start duration of the RAR window based on the first delay start duration of the RAR window and a timing advance value used by the terminal device. Alternatively, the processing module 1820 is specifically configured to determine the second delay start duration of the RAR window based on the first delay start duration of the RAR window, a used timing advance value, and the adjustment parameter of the delay start duration of the RAR window. The adjustment parameter of the delay start duration of the RAR window is preset or is indicated by the network device.

In a design, the delay start duration of the RAR window includes second delay start duration of the RAR window. The time parameter includes the first delay start duration of the RAR window. The processing module 1820 is specifically configured to determine the second delay start duration of the RAR window based on the first delay start duration of the RAR window and a used timing advance value. Alternatively, the processing module 1820 is specifically configured to determine the second delay start duration of the RAR window based on the first delay start duration of the RAR window, a used timing advance value, and the adjustment parameter of the delay start duration of the RAR window. The adjustment parameter of the delay start duration of the RAR window is preset or is indicated by the network device.

In a design, the transceiver module 1810 is further configured to receive indication information. The indication information indicates that the network device compensates for a round-trip delay of a feeder link, or the indication information indicates that the network device does not compensate for a round-trip delay of a feeder link.

In a design, the time parameter includes a common timing value and a difference of the first timing offset, and the common timing value is determined based on a round-trip delay of a feeder link. When the indication information indicates that the network device compensates for the round-trip delay of the feeder link, the processing module 1820 is specifically configured to determine the first timing offset based on the difference of the first timing offset but not based on the common timing value. When the indication information indicates that the network device does not compensate for the round-trip delay of the feeder link, the processing module 1820 is specifically configured to determine the first timing offset based on the difference of the first timing offset and the common timing value.

In a design, the time parameter includes a common timing value. When the indication information indicates that the network device compensates for a round-trip delay of a feeder link, the processing module 1820 is specifically configured to determine the second timing offset based on the common timing value. When the indication information indicates that the network device does not compensate for a round-trip delay of a feeder link, the processing module

1820 is specifically configured to determine the second timing offset based on 0 but not based on the common timing value.

In a design, the delay start duration of the RAR window includes the first delay start duration of the RAR window. The time parameter includes the common timing value, and the common timing value is determined based on the round-trip delay of the feeder link. The processing module 1820 is further configured to determine the round-trip delay parameter TA_cal of the service link based on the location information of the satellite. When the indication information indicates that the network device compensates for the round-trip delay of the feeder link, the processing module 1820 is specifically configured to determine the first delay start duration of the RAR window based on the TA_cal and the common timing value. When the indication information indicates that the network device does not compensate for the round-trip delay of the feeder link, the processing module 1820 is specifically configured to determine the first delay start duration of the RAR window based on the TA_cal and the common timing value.

In a design, the delay start duration of the RAR window includes the second delay start duration of the RAR window. The time parameter includes the common timing value, and the common timing value is determined based on the round-trip delay of the feeder link. When the indication information indicates that the network device compensates for the round-trip delay of the feeder link, the processing module 1820 is specifically configured to determine the second delay start duration of the RAR window based on the common timing value. When the indication information indicates that the network device does not compensate for the round-trip delay of the feeder link, the processing module 1820 is specifically configured to determine the second delay start duration of the RAR window based on the common timing value.

In a design, the time parameter includes the common timing value, and the common timing value is determined based on the round-trip delay of the feeder link. The processing module 1820 is further configured to determine the round-trip delay parameter TA_cal of the service link based on the location information of the satellite. When the indication information indicates that the network device compensates for the round-trip delay of the feeder link, the processing module 1820 is specifically configured to determine the used timing advance value based on the TA_cal but not based on the common timing value. When the indication information indicates that the network device compensates for the round-trip delay of the feeder link, the processing module 1820 is specifically configured to determine the used timing advance value based on the TA_cal and the common timing value.

In a design, the time parameter includes the difference of the first timing offset and the second timing offset. The processing module 1820 is specifically configured to determine the first timing offset based on the difference of the first timing offset but not based on the second timing offset. Alternatively, the delay start duration of the RAR window includes the first delay start duration of the RAR window. The time parameter includes the second timing offset. The processing module 1820 is further configured to determine the round-trip delay parameter TA_cal of the service link based on the location information of the satellite. The processing module 1820 is specifically configured to determine the first delay start duration of the RAR window based on the TA_cal and the second timing offset. Alternatively, the delay start duration of the RAR window includes the second delay start duration of the RAR window. The time parameter includes the second timing offset. The processing module 1820 is specifically configured to determine the first delay start duration of the RAR window based on the second timing offset. Alternatively, the time parameter includes the difference of the first timing offset and the common timing value, and the common timing value is determined based on the round-trip delay of the feeder link. The processing module 1820 is specifically configured to determine the first timing offset based on the difference of the first timing offset and the common timing value. Alternatively, the time parameter includes the common timing value, and the common timing value is determined based on the round-trip delay of the feeder link. The processing module 1820 is specifically configured to determine the second timing offset based on 0 but not based on the common timing value. Alternatively, the delay start duration of the RAR window includes the first delay start duration of the RAR window. The time parameter includes the common timing value, and the common timing value is determined based on the round-trip delay of the feeder link. The processing module 1820 is further configured to determine the round-trip delay parameter TA_cal of the service link based on the location information of the satellite. The processing module 1820 is specifically configured to determine the first delay start duration of the RAR window based on the TA_cal and the common timing value. Alternatively, the delay start duration of the RAR window includes the second delay start duration of the RAR window. The time parameter includes the common timing value, and the common timing value is determined based on the round-trip delay of the feeder link. The processing module 1820 is specifically configured to determine the second delay start duration of the RAR window based on the common timing value.

In a design, the delay start duration of the RAR window includes the first delay start duration of the RAR window and the second delay start duration of the RAR window. The second delay start duration of the RAR window is determined based on the round-trip delay parameter Delay_compensated between the reference point and the network device. The time parameter includes the second delay start duration of the RAR window. The processing module 1820 is specifically configured to determine the second timing offset based on the second delay start duration of the RAR window. Alternatively, the processing module 1820 is specifically configured to determine the first delay start duration of the RAR window based on the second delay start duration of the RAR window and the used timing advance value.

When the apparatus is a chip-type apparatus or a circuit, the apparatus may include a transceiver module and a processing module. The transceiver module may be an input/output circuit and/or a communication interface. The processing module is an integrated processor, a microprocessor, or an integrated circuit. The transceiver module may input data and output data, and the processing module may determine output data based on input data. For example, the transceiver module inputs first information. The processing module may determine output data, for example, a timing offset, based on input data.

For example, when the apparatus 1800 performs the steps performed by the network device in the foregoing method, the processing module 1820 is configured to generate first information. The first information may include a time parameter. For related descriptions, refer to the method embodiment shown in FIG. 14. Details are not described herein again. The transceiver module 1810 is configured to send the first information.

In a design, the transceiver module 1810 is further configured to send indication information. The indication information indicates that the network device compensates for a round-trip delay of a feeder link, or the indication information indicates that the network device does not compensate for a round-trip delay of a feeder link. For related descriptions, refer to the method embodiment shown in FIG. 14.

In a design, the transceiver module 1810 is further configured to send at least one of the adjustment parameter of the first timing offset, the adjustment parameter of the second timing offset, and the adjustment parameter of the delay start duration of the RAR window. For related descriptions, refer to the method embodiment shown in FIG. 14.

When the apparatus is a chip-type apparatus or a circuit, the apparatus may include a transceiver module and a processing module. The transceiver module may be an input/output circuit and/or a communication interface. The processing module is an integrated processor, a microprocessor, or an integrated circuit. The transceiver module may input data and output data, and the processing module may determine output data. For example, the processing module may generate first information. The transceiver module may output the first information.

An apparatus 1900 includes at least one processor 1920, configured to implement functions of the network device side and the terminal device side in the method provided in embodiments of this application. The apparatus 1900 may further include a communication interface 1910. In this embodiment of this application, the communication interface may be a transceiver, a circuit, a bus, a module, or a communication interface of another type, and is configured to communicate with another device by using a transmission medium. For example, the communication interface 1910 is used by an apparatus in the apparatus 1900 to communicate with another device. The processor 1920 may implement a function of the processing module 1820 shown in FIG. 18, and the communication interface 1910 may implement a function of the transceiver module 1810 shown in FIG. 18.

The apparatus 1900 may further include at least one memory 1930, configured to store program instructions and/or data. The memory 1930 is coupled to the processor 1920. Couplings in this embodiment of this application are indirect couplings or communication connections between apparatuses, units, or modules, may be in an electrical form, a mechanical form, or another form, and are used for information exchange between the apparatuses, the units, or the modules. The processor 1920 may cooperate with the memory 1930. The processor 1920 may execute the program instructions stored in the memory 1930. At least one of the at least one memory may be included in the processor.

Figure 19:
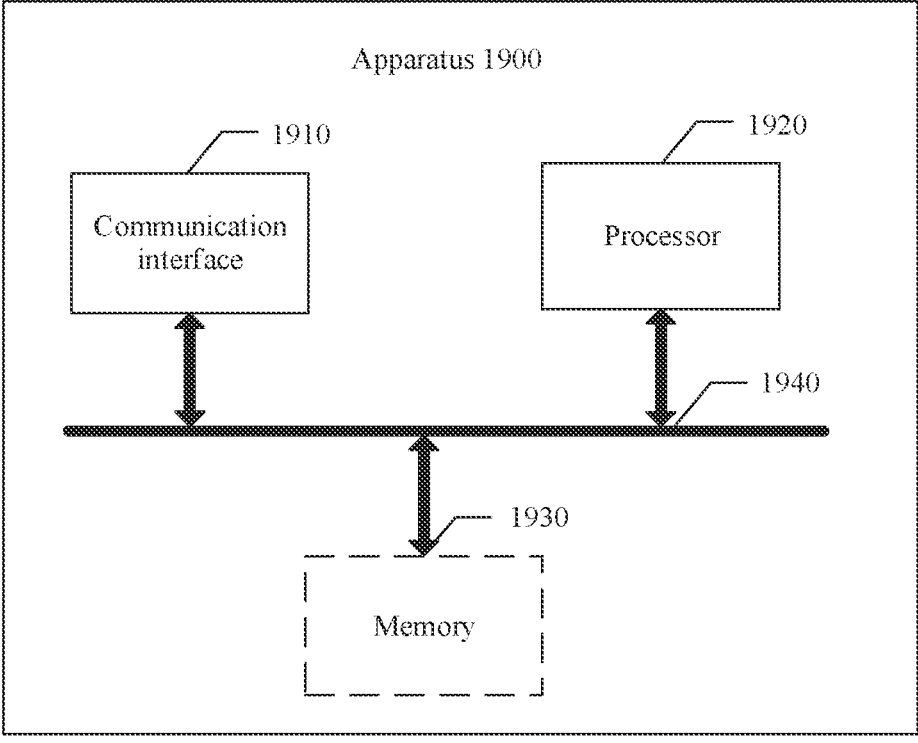
FIG. 19 is another schematic diagram of a communication apparatus according to an embodiment of this application.

A specific connection medium between the communication interface 1910, the processor 1920, and the memory 1930 is not limited in this embodiment of this application. In this embodiment of this application, the memory 1930, the processor 1920, and the communication interface 1910 are connected through a bus 1940 in FIG. 19, and the bus is represented by using a bold line in FIG. 19. A connection manner between other components is merely an example for description, and is not limited thereto. The bus may be classified into an address bus, a data bus, a control bus, and the like. For ease of representation, only one bold line is used to represent the bus in FIG. 19, but this does not mean that there is only one bus or only one type of bus.

Figure 20:
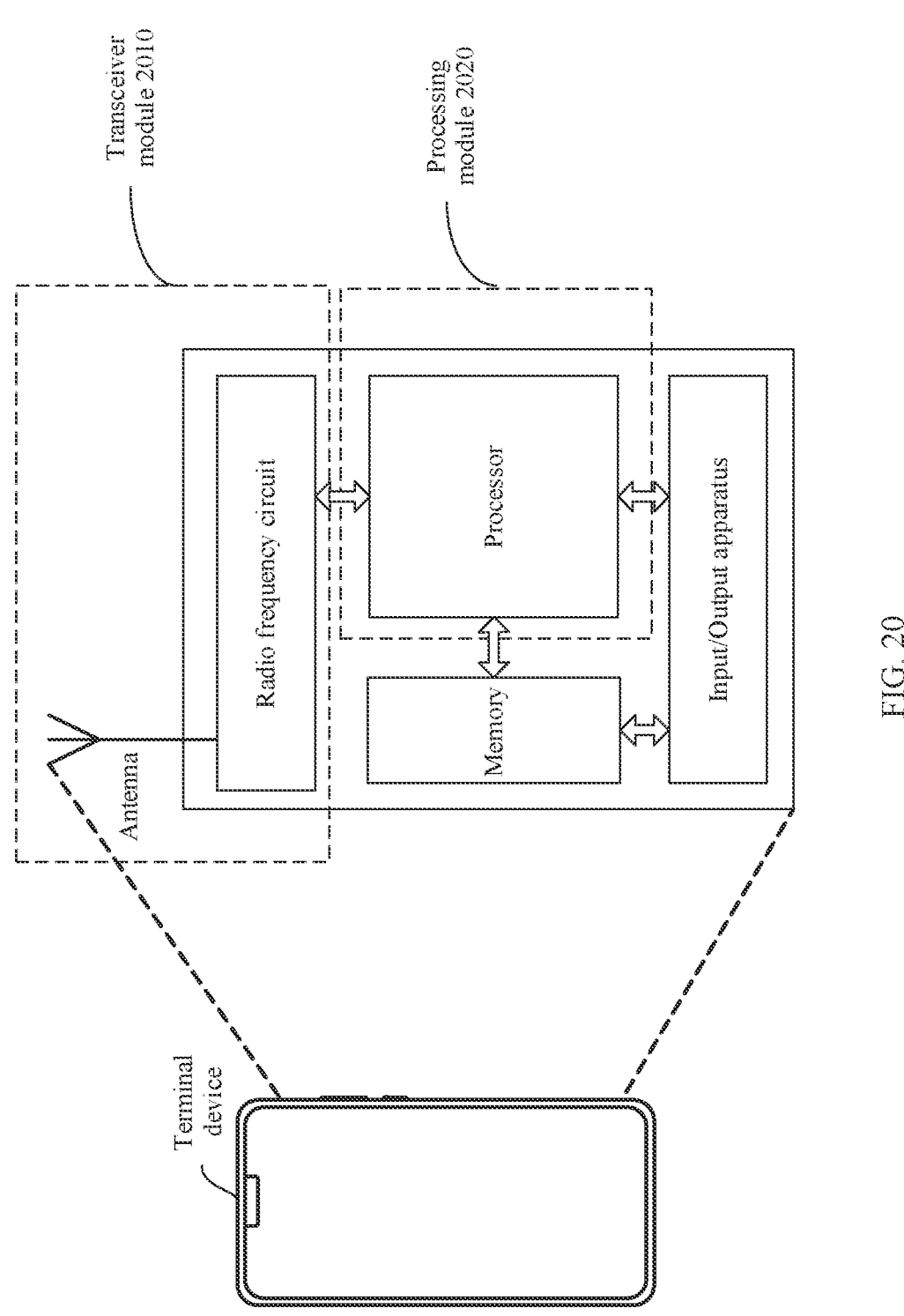
FIG. 20 is a schematic diagram of a terminal device according to an embodiment of this application.

FIG. 20 is a simplified schematic diagram of a structure of a terminal device. For ease of understanding and figure illustration, an example in which the terminal device is a mobile phone is used in FIG. 20. As shown in FIG. 20, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The processor may execute the software program stored in the memory, so that the terminal device performs the steps performed by the terminal device in the foregoing method embodiment. Details are not described again. The antenna is mainly configured to receive/send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 20 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited this embodiment of this application.

In this embodiment of this application, the antenna and the radio frequency circuit that have receiving and sending functions may be considered as a transceiver module of the terminal device. A transceiver module 2010 shown in FIG. 20 considers a processor having a processing function as a processing module of the terminal device, for example, a processing module 2020 shown in FIG. 20.

In another form of this embodiment, a computer-readable storage medium is provided. The computer-readable storage medium stores instructions, and when the instructions are executed, the methods on the network device side and the terminal device side in the foregoing method embodiment are performed.

In another form of this embodiment, a computer program product including instructions is provided. When the instructions are executed by an electronic apparatus (for example, a computer, a processor, or an apparatus on which a processor is installed), the electronic apparatus is enabled to perform the methods on the network device side and the terminal device side in the foregoing method embodiment.

In another form of this embodiment, a communication system is provided. The system may include a terminal device, the at least one terminal device, and the at least one network device.

It should be understood that the processor mentioned in embodiments of the present invention may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (dynamic RAM, DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a DSP, an ASIC, an FPGA or another programmable logic device, a discrete gate, a transistor logic device, or a discrete hardware component, the memory (storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on implementation processes of embodiments of the present invention.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiment. Details are not described herein again.

In the several embodiments provided in this application, it should be understood that the disclosed system, apparatus, and method may be implemented in other manners. For example, the foregoing described apparatus embodiments are merely examples. For example, division of the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or a part contributing to the conventional technology, or some of the technical solutions may be implemented in a form of a software product. The computer software product is stored in a storage medium, and includes a plurality of instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A parameter transmission method, comprising:
receiving, by a first communication apparatus, first information, wherein the first information comprises a time parameter, the time parameter comprises a timing offset, and the timing offset indicates a delay of activation of configuration information received by the first communication apparatus;
determining, by the first communication apparatus, a delaying duration of starting of a random access response (RAR) window based on the timing offset;
detecting, by the first communication apparatus, in response to transmission of a msg1 or a msgA, a physical downlink control channel (PDCCH) in the RAR window based on the delaying duration of starting of the RAR window; and
receiving, by the first communication apparatus, a random access response (RAR) based on the PDCCH.

2. The method according to claim 1, wherein the delaying duration of starting of the RAR window is determined based on the timing offset and a timing advance value.

3. The method according to claim 2, wherein the delaying duration of starting of the RAR window satisfies the following formula:

RAR_window_delay=TA+K_mac, wherein
RAR window_delay indicates delaying duration of starting of the RAR window, TA indicates the timing advance value, and K_mac indicates the timing offset.

4. The method according to claim 2, wherein the timing advance value is a sum of a common timing advance value, a round-trip delay between a satellite and a terminal device, an offset, and a correction value, wherein the offset and the correction value are indicated by a second communication apparatus, or are specified in a communication protocol.

5. The method according to claim 1, wherein the first information is carried in at least one of: a broadcast message, a radio resource control (RRC) message, a system information block (SIB) 1 or other system information (OSI).

6. The method according to claim 1, further comprising:
starting, by the first communication apparatus, a random access contention resolution timer based on the delaying duration of starting of the RAR window.

7. The method according to claim 1, wherein the RAR window starts at an additional duration after a first symbol of an earliest CORESET the first communication apparatus is configured to receive PDCCH that is after a last symbol of a physical random access channel (PRACH) occasion or physical uplink shared channel (PUSCH) occasion corresponding to a PRACH transmission; wherein the additional duration is the delaying duration of starting of the RAR window.

8. The method according to claim 1, wherein the timing offset is related to a round-trip delay between a reference point and a gateway station.

9. The method according to claim 1, wherein the configuration information is a media access control (MAC) signaling.

10. A parameter transmission method, comprising:
determining, by a second communication apparatus, first information; and
sending, by the second communication apparatus, the first information to a first communication apparatus, wherein the first information comprises a time parameter, the time parameter comprises a timing offset, the timing offset is used to determine a delay of activation of configuration information sent by the second communication apparatus, and the timing offset is used to determine a delaying duration of starting of a random access response (RAR) window, wherein the RAR window is usable for detecting a physical downlink control channel (PDCCH), that is usable for receiving a random access response (RAR).

11. The method according to claim 10, wherein the time parameter further comprises a common timing advance value, wherein the common timing advance value is used to determine the delaying duration of starting of the RAR window together with the timing offset.

12. The method according to claim 10, wherein the first information is carried in at least one of: a broadcast message, a radio resource control (RRC) message, a system information block (SIB) 1 or other system information (OSI).

13. The method according to claim 10, wherein the delaying duration of starting of the RAR window is used to start a random access contention resolution timer.

14. The method according to claim 10, wherein the configuration information is a media access control (MAC) signaling.

15. A first communication apparatus, comprising a communication interface and at least one processor, wherein the communication interface is configured to receive first information, the first information comprises a time parameter, the time parameter comprises a timing off-set, and the timing offset indicates a delay of activation of configuration information received by the first communication apparatus;

the at least one processor is configured to determine a delaying duration of starting of a random access response (RAR) window based on the timing offset;

detecting, in response to transmission of a msg1 or a msgA, a physical downlink control channel (PDCCH) in the RAR window based on the delaying duration of starting of the RAR window; and receiving a random access response (RAR) based on the PDCCH.

16. The first communication apparatus according to claim 15, wherein the delaying duration of starting of the RAR window is determined based on the timing offset and a timing advance value.

17. The first communication apparatus according to claim 16, wherein the delaying duration of starting of the RAR window satisfies the following formula:

RAR window_delay=TA+K_mac, wherein

RAR window_delay indicates the delaying duration of starting of the RAR window, TA indicates the timing advance value, and K_mac indicates the timing offset.

18. The first communication apparatus according to claim 16, wherein the timing advance value is a sum of a common timing advance value, a round-trip delay between a satellite and a terminal device, an offset, and a correction value, wherein the offset and the correction value are indicated by a second communication apparatus, or are specified in a communication protocol.

19. The first communication apparatus according to claim 15, wherein the first information is carried in at least one of a broadcast message, a radio resource control (RRC) message, a system information block (SIB) 1 or other system information (OSI).

20. The first communication apparatus according to claim 15, the at least one processor is configured to:

start, based on the delaying duration of starting of the RAR window, a random access contention resolution timer.

21. The first communication apparatus according to claim 15, wherein the RAR window starts at an additional duration after a first symbol of an earliest CORESET the first communication apparatus is configured to receive PDCCH that is after a last symbol of a physical random access channel (PRACH) occasion or physical uplink shared channel (PUSCH) occasion corresponding to a PRACH transmission; wherein the additional duration is the delaying duration of starting of the RAR window.

22. The first communication apparatus according to claim 15, wherein the timing offset is round-trip delay between a gateway and a reference point.

23. The first communication apparatus according to claim 15, wherein the configuration information is a media access control (MAC) signaling.

24. A non-transitory computer-readable storage medium, wherein the non-transitory computer-readable storage medium stores computer-executable instructions, and when the computer-executable instructions are invoked by an electronic apparatus, cause the electronic apparatus to:

receive first information, wherein the first information comprises a time parameter, the time parameter comprises a timing offset, and the timing offset indicates a delay of activation of configuration information received by the electronic apparatus;

determine a delaying duration of starting of a random access response (RAR) window based on the timing offset;

detecting, in response to transmission of a msg1 or a msgA, a physical downlink control channel (PDCCH) in the RAR window based on the delaying duration of starting of the RAR window; and receiving a random access response (RAR) based on the PDCCH.

25. The non-transitory computer-readable storage medium according to claim 24, wherein the delaying duration of starting of the RAR window is determined based on the timing offset and a timing advance value.

26. The non-transitory computer-readable storage medium according to claim 25, wherein the delaying duration of starting of the RAR window satisfies the following formula:

RAR window_delay=TA+K mac, wherein

RAR window_delay indicates the delaying duration of starting of the RAR window, TA indicates the timing advance value, and K_mac indicates the timing offset.

27. The non-transitory computer-readable storage medium according to claim 24, wherein the computer-executable instructions further cause the electronic apparatus to:

start, based on the delaying duration of starting of the RAR window, a random access contention resolution timer.

28. The non-transitory computer-readable storage medium according to claim 24, wherein the configuration information is a media access control (MAC) signaling.

29. The non-transitory computer-readable storage medium according to claim 24, wherein the RAR window starts at an additional duration after a first symbol of an earliest CORESET the first communication apparatus is configured to receive PDCCH that is after a last symbol of a physical random access channel (PRACH) occasion or physical uplink shared channel (PUSCH) occasion corresponding to a PRACH transmission; wherein the additional duration is the delaying duration of starting of the RAR window.

* * * * *